US 8,774,557 B2

(12) United States Patent
Masuko

(10) Patent No.: US 8,774,557 B2
(45) Date of Patent: Jul. 8, 2014

(54) MOSAIC IMAGE GENERATION DEVICE, MOSAIC IMAGE GENERATION METHOD AND MOSAIC IMAGE RECORDING MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/518,694

(22) PCT Filed: Dec. 27, 2010

(86) PCT No.: PCT/JP2010/073547
§ 371 (c)(1),
(2), (4) Date: Jun. 22, 2012

(87) PCT Pub. No.: WO2011/078377
PCT Pub. Date: Jun. 30, 2011

(65) Prior Publication Data
US 2012/0250986 A1 Oct. 4, 2012

(30) Foreign Application Priority Data

Dec. 25, 2009 (JP) .................................. 2009-295748
Dec. 25, 2009 (JP) .................................. 2009-295749
Dec. 25, 2009 (JP) .................................. 2009-295750

(51) Int. Cl.
*G06K 9/36* (2006.01)
*G09G 5/00* (2006.01)
*H04N 9/74* (2006.01)

(52) U.S. Cl.
USPC ............................ 382/284; 345/634; 348/586

(58) Field of Classification Search
CPC ............................... G06T 3/4038; H04N 5/272
USPC ................... 382/162, 164, 284; 348/584, 588
See application file for complete search history.

(56) References Cited

U.S. PATENT DOCUMENTS 6,137,498 A * 10/2000 Silvers ........................ 345/629
6,556,210 B1 * 4/2003 Yamamoto et al. .......... 345/582
(Continued)

FOREIGN PATENT DOCUMENTS

EP 0 852 363 A2 7/1998
JP 10269353 A 10/1998
(Continued)

OTHER PUBLICATIONS

Yang et al. ("Tile Image Mosaic," First International Conference on Communications and Networking in China, 2006).*

(Continued)

*Primary Examiner* — Yubin Hung
(74) *Attorney, Agent, or Firm* — Sughrue Mion, PLLC

(57) ABSTRACT

A mosaic image which encourages users' motivation of continuously browsing mosaic images is generated. An image generation device which generates a mosaic image using as a source image a material image divided into a plurality of divided areas, has: an acquiring means that acquires an image from a terminal device through a network; and a mosaic image generating means that generates a mosaic image by allocating the image acquired by the acquiring means, to one of the divided areas based on color information of the image acquired by the acquiring means and color information of each of the divided areas of the material image used as the source image. After generating the mosaic image, the mosaic image generating means generates a new mosaic image by changing at least one of a number of the divided areas and the material image in response to an increase in a number of images acquired by the acquiring means.

20 Claims, 49 Drawing Sheets

(56) References Cited

U.S. PATENT DOCUMENTS

| | | |
|---|---|---|
| 6,665,451 B1 | 12/2003 | Kusama et al. |
| 6,720,971 B1 | 4/2004 | Yamamoto et al. |
| 2005/0047651 A1* | 3/2005 | Zheng .................. 382/162 |
| 2005/0147322 A1* | 7/2005 | Saed .................... 382/284 |
| 2008/0133258 A1* | 6/2008 | Kontogouris ............. 705/1 |
| 2008/0205790 A1* | 8/2008 | Wear et al. ............ 382/284 |
| 2010/0277754 A1 | 11/2010 | Arimura et al. |
| 2010/0322521 A1* | 12/2010 | Tal et al. .............. 382/199 |

FOREIGN PATENT DOCUMENTS

| | | |
|---|---|---|
| JP | 11-341266 A | 12/1999 |
| JP | 11-345311 A | 12/1999 |
| JP | 11-345313 A | 12/1999 |
| JP | 2000-187670 A | 7/2000 |
| JP | 2003-78767 A | 3/2003 |
| JP | 200430076 A | 1/2004 |
| JP | 2004-157578 A | 6/2004 |
| JP | 2004-334467 A | 11/2004 |
| JP | 2006-39800 A | 2/2006 |
| JP | 2006-221253 A | 8/2006 |
| JP | 2008-108027 A | 5/2008 |
| JP | 4191791 B1 | 9/2008 |
| JP | 2009-80828 A | 4/2009 |
| JP | 4359687 B1 | 8/2009 |
| JP | 4359688 B1 | 8/2009 |
| JP | 2010-4166 A | 1/2010 |
| WO | 2009/090901 A | 7/2009 |

OTHER PUBLICATIONS

Extended European Search Report dated Jun. 11, 2013, issued in European Patent Application No. 10839605.2.
Decision of Allowance for JP 2011-547688 dated Nov. 13, 2012 and English-language translation thereof.
Natsuki Shibata et al., "A communications Function for Community-induced in mosaic-R System~Photo mosaic art and network communications~", IEICE Technical Report, Sep. 2008, pp. 49-54, vol. 108, No. 226.
International Search Report for PCT/JP2010/073547 dated Mar. 15, 2011.
Chinese Office Action dated Jul. 15, 2013, issued in Chinese Patent Application No. 201080059133.6.

* cited by examiner

| POSTING IMAGE DB |
|---|
| POSTING IMAGE |
| INFORMATION RELATED TO ASSOCIATION OF POSTING IMAGE AND INFORMATION RELATED TO POSTING IMAGE |
| INFORMATION RELATED TO ASSOCIATION OF POSTING IMAGE AND COLOR INFORMATION |
| . . . . . |

| MATERIAL IMAGE DB |
|---|
| MATERIAL IMAGE |
| INFORMATION RELATED TO ASSOCIATION OF QUANTITY OF POSTING-IMAGES-TO-BE-STORED, AND MATERIAL IMAGE DIVIDED INTO A PLURALITY OF DIVIDED AREAS HAVING SIZE MATCHING QUANTITY |
| . . . . . |

| MOSAIC IMAGE DB |
|---|
| MOSAIC IMAGE |
| . . . . . |

FIG.4A

POSTING IMAGE DB

| POSTING IMAGE NUMBER |
|---|
| POSTING IMAGE |
| USER ID |
| COLOR INFORMATION |

FIG.4B

MATERIAL IMAGE DB

| MATERIAL IMAGE ID |
|---|
| MATERIAL IMAGE |

FIG.4C

MOSAIC IMAGE DB

| MOSAIC IMAGE ID |
|---|
| MOSAIC IMAGE (TABLE PART DATA) |

FIG.4C

USER INFORMATION DB

| USER ID |
|---|
| PASSWORD |
| NAME |
| DATE OF BIRTH |
| SEX |
| HOMETOWN |
| TELEPHONE NUMBER |
| ELECTRONIC MAIL ADDRESS |
| NUMBER OF HOLDING POINTS |
| HOBBY |
| PROFILE URL |
| . . . |

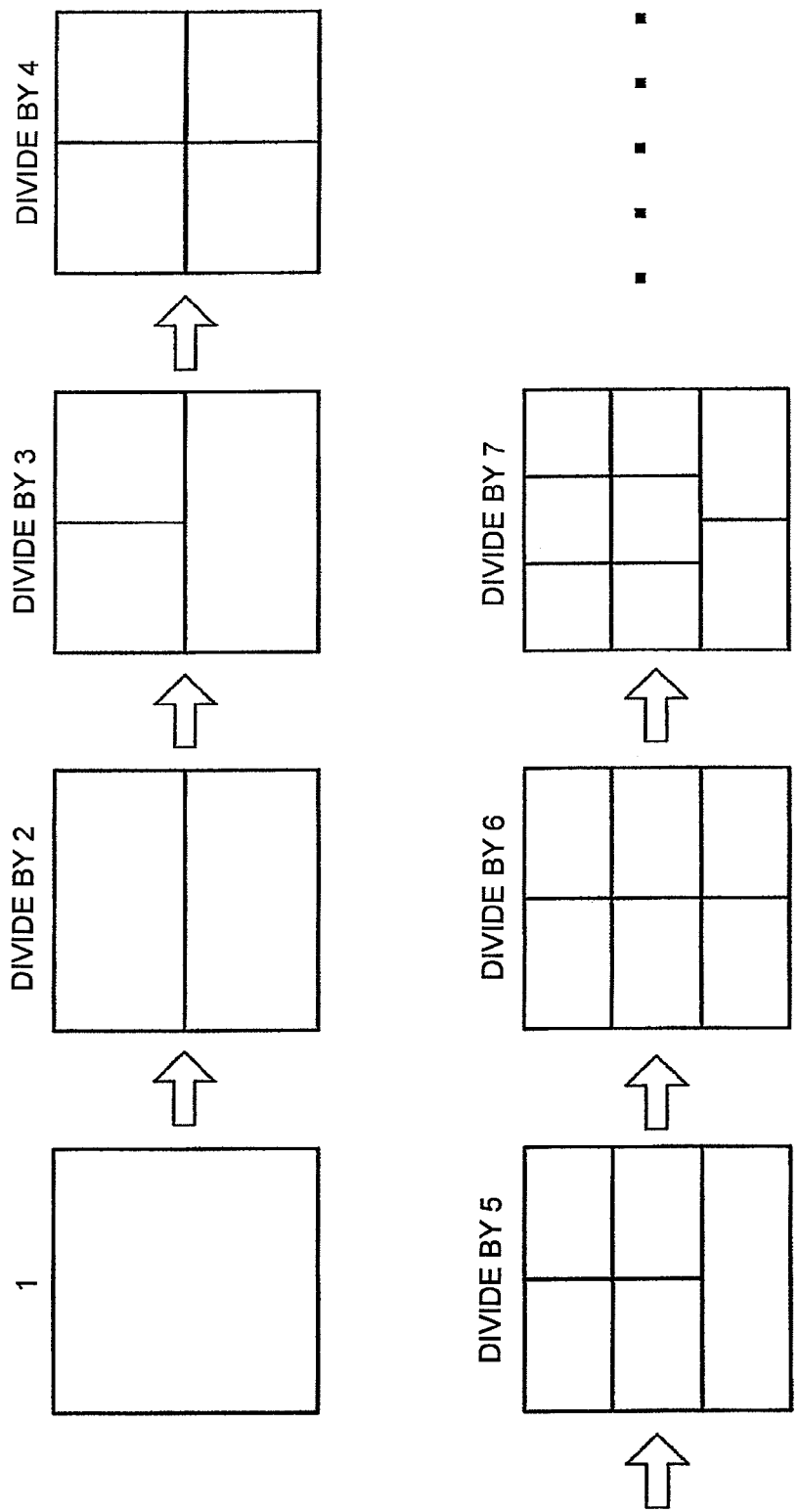

FIG.10A

MATERIAL IMAGE DB

| MATERIAL IMAGE ID |
|---|
| MATERIAL IMAGE |
| NUMBER OF DIVISION PATTERNS |
| MATERIAL IMAGE INFORMATION 1 |
| MATERIAL IMAGE INFORMATION 2 |
| . . . |

FIG.10B

MATERIAL IMAGE INFORMATION

| NUMBER OF DIVISIONS |
|---|
| COLOR INFORMATION OF DIVIDED AREA 1 |
| COLOR INFORMATION OF DIVIDED AREA 2 |
| . . . |

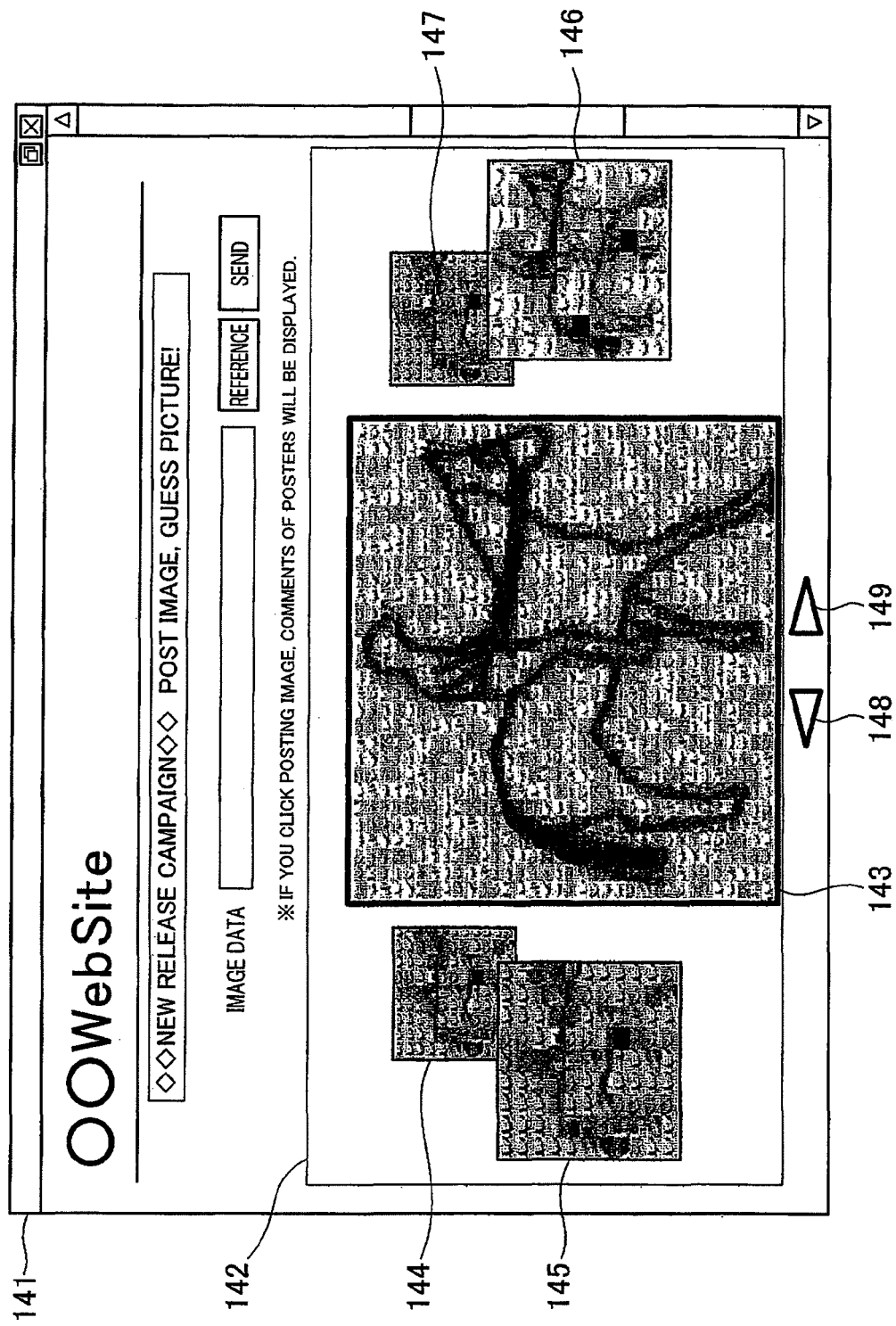

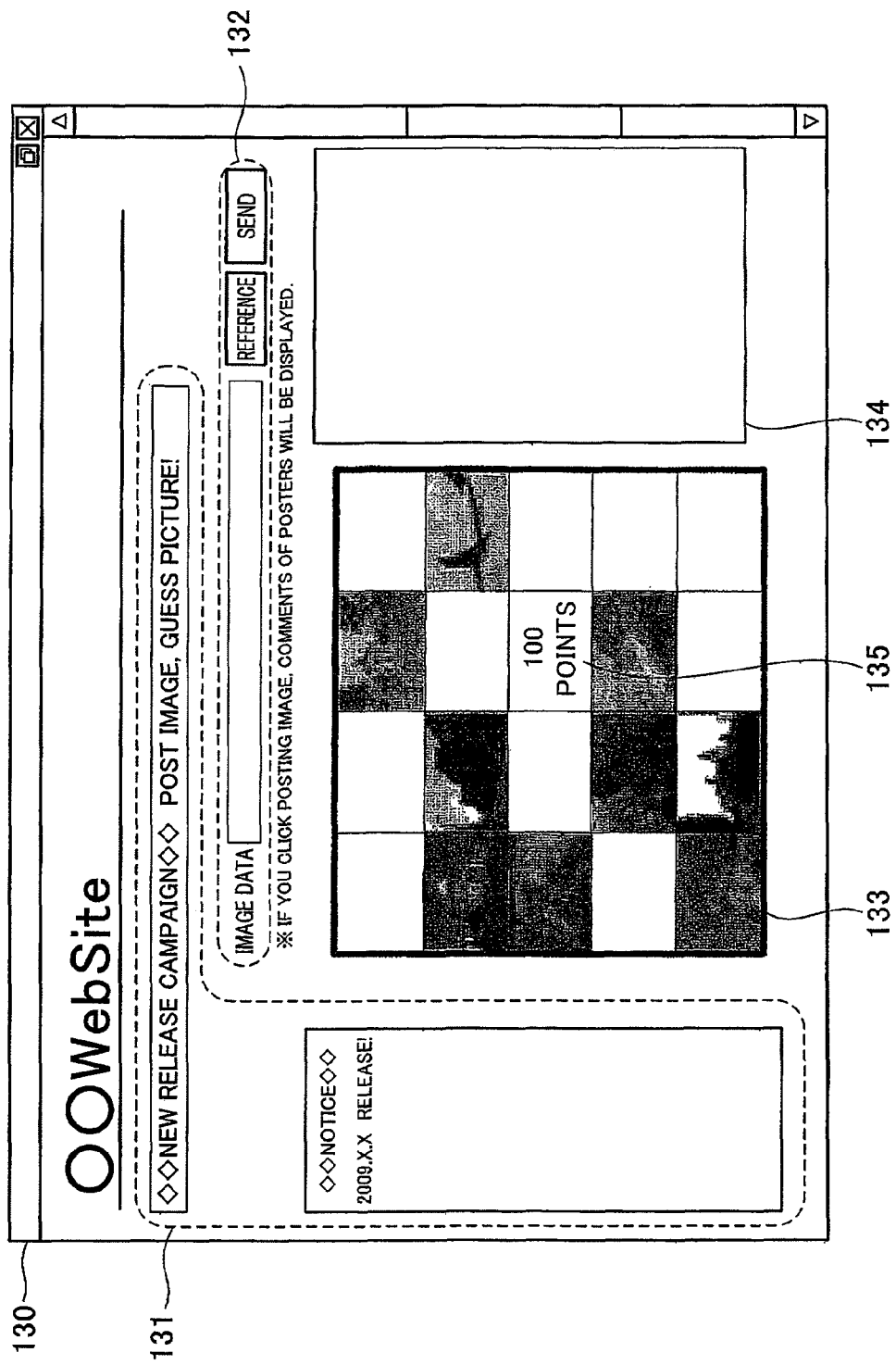

FIG.20A

POSTING IMAGE DB — 141

| POSTING IMAGE DB |
|---|
| POSTING IMAGE |
| INFORMATION RELATED TO ASSOCIATION OF POSTING IMAGE AND INFORMATION RELATED TO POSTING IMAGE |
| INFORMATION RELATED TO ASSOCIATION OF POSTING IMAGE AND COLOR INFORMATION |
| INFORMATION RELATED TO ASSOCIATION OF POSTING IMAGE AND REPRESENTATIVE COLOR INFORMATION |
| ..... |

| MATERIAL IMAGE DB |
|---|
| A PLURALITY OF MATERIAL IMAGES OF DIFFERENT TYPES |
| INFORMATION RELATED TO ASSOCIATION OF QUANTITY OF POSTING-IMAGES-TO-BE-STORED, AND MATERIAL IMAGE DIVIDED INTO A PLURALITY OF DIVIDED AREAS HAVING SIZE ASSOCIATED WITH QUANTITY |
| INFORMATION RELATED TO ASSOCIATION OF QUANTITY OF POSTING-IMAGES-TO-BE-STORED, REPRESENTATIVE COLOR INFORMATION OF MATERIAL IMAGE, AND MATERIAL IMAGE DIVIDED INTO A PLURALITY OF DIVIDED AREAS HAVING SIZE ASSOCIATED WITH QUANTITY |
| ..... |

| MOSAIC IMAGE DB |
|---|
| MOSAIC IMAGE |
| ..... |

FIG.21A

POSTING IMAGE DB

| POSTING IMAGE NUMBER |
|---|
| POSTING IMAGE |
| USER ID |
| COLOR INFORMATION |
| REPRESENTATIVE COLOR INFORMATION |

FIG.21B

MATERIAL IMAGE DB

| MATERIAL IMAGE ID |
|---|
| MATERIAL IMAGE |
| NUMBER OF DIVISIONS |
| REPRESENTATIVE COLOR INFORMATION OF MATERIAL IMAGE |
| OUTLINE INFORMATION |
| COLOR INFORMATION OF DIVIDED AREA 1 |
| COLOR INFORMATION OF DIVIDED AREA 2 |
| ... |
| REPRESENTATIVE COLOR INFORMATION OF DIVIDED AREA 1 |
| REPRESENTATIVE COLOR INFORMATION OF DIVIDED AREA 2 |
| ... |
| POINT ASSIGNING AREA INFORMATION |

FIG.34

MATERIAL IMAGE DB

| |
|---|
| MATERIAL IMAGE ID |
| MATERIAL IMAGE |
| DISPLAY ORDER |
| NUMBER OF DIVISIONS |
| REPRESENTATIVE COLOR INFORMATION OF MATERIAL IMAGE |
| OUTLINE INFORMATION |
| COLOR INFORMATION OF DIVIDED AREA 1 |
| COLOR INFORMATION OF DIVIDED AREA 2 |
| . . . |
| REPRESENTATIVE COLOR INFORMATION OF DIVIDED AREA 1 |
| REPRESENTATIVE COLOR INFORMATION OF DIVIDED AREA 2 |
| . . . |
| POINT ASSIGNING AREA INFORMATION |

FIG.35A

POSTING IMAGE DB — 141

| POSTING IMAGE |
|---|
| INFORMATION |
| INFORMATION RELATED TO ASSOCIATION OF POSTING IMAGE AND COLOR INFORMATION |
| INFORMATION RELATED TO ASSOCIATION OF POSTING IMAGE AND REPRESENTATIVE COLOR INFORMATION |
| ..... |

FIG.35B

MATERIAL IMAGE DB — 142

| INFORMATION RELATED TO ASSOCIATION OF MATERIAL IMAGE AND SECOND MATERIAL IMAGE |
|---|
| INFORMATION RELATED TO ASSOCIATION OF QUANTITY OF POSTING-IMAGES-TO-BE-STORED, AND MATERIAL IMAGE DIVIDED INTO A PLURALITY OF DIVISION AREAS HAVING SIZE MATCHING QUANTITY |
| INFORMATION RELATED TO ASSOCIATION OF QUANTITY OF POSTING-IMAGES-TO-BE-STORED, REPRESENTATIVE COLOR INFORMATION OF COLOR SHOWN IN MATERIAL IMAGE, AND MATERIAL IMAGE DIVIDED INTO A PLURALITY OF DIVIDED AREAS HAVING SIZE MATCHING QUANTITY |
| ..... |

FIG.35C

MOSAIC IMAGE DB — 143

| MOSAIC IMAGE |
|---|
| ..... |

FIG.36A

MATERIAL IMAGE DB

| |
|---|
| MATERIAL IMAGE ID |
| MATERIAL IMAGE (FIRST MATERIAL IMAGE) |
| DISPLAY ORDER = 1 |
| NUMBER OF DIVISIONS |
| REPRESENTATIVE COLOR INFORMATION OF MATERIAL IMAGE |
| OUTLINE INFORMATION |
| COLOR INFORMATION OF DIVIDED AREA 1 |
| COLOR INFORMATION OF DIVIDED AREA 2 |
| . . . |
| POINT ASSIGNING AREA INFORMATION |
| SECOND MATERIAL IMAGE INFORMATION |

FIG.36B

MATERIAL IMAGE DB

| |
|---|
| MATERIAL IMAGE ID |
| MATERIAL IMAGE (SECOND MATERIAL IMAGE) |
| DISPLAY ORDER = 2 OR MORE |
| NUMBER OF DIVISIONS |
| REPRESENTATIVE COLOR INFORMATION OF DIFFERENCE AREA |
| OUTLINE INFORMATION |
| COLOR INFORMATION OF DIVIDED AREA 1 |
| COLOR INFORMATION OF DIVIDED AREA 2 |
| . . . |
| POINT ASSIGNING AREA INFORMATION |

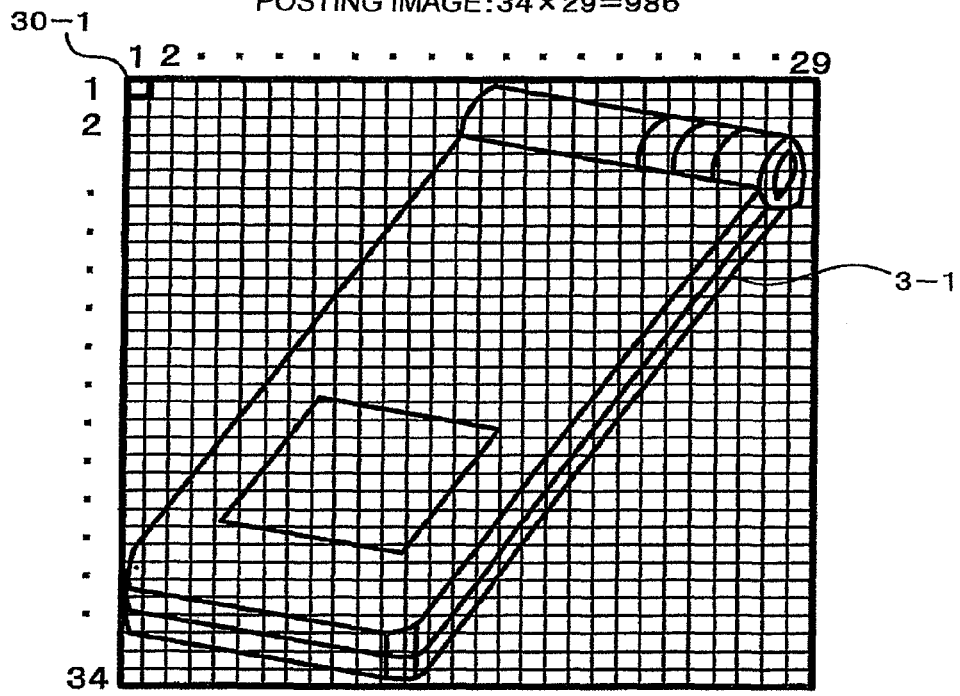

MOSAIC IMAGE GENERATION DEVICE, MOSAIC IMAGE GENERATION METHOD AND MOSAIC IMAGE RECORDING MEDIUM

CROSS REFERENCE TO RELATED APPLICATIONS

This application is a National Stage of International Application No. PCT/JP2010/073547 filed Dec. 27, 2010, claiming priority based on Japanese Patent Application Nos. 2009-295748 filed Dec. 25, 2009, 2009-295749 filed Dec. 25, 2009, and 2009-295750 filed Dec. 25, 2009 the contents of all of which are incorporated herein by reference in their entirety.

TECHNICAL FIELD

The present invention relates to a technical field of, for example, an information providing device which provides pages (web pages) listing predetermined information, to terminal devices such as personal computers connected through a network such as Internet and, more particularly, relates to a technique of creating and providing pages listing information related to posted images.

BACKGROUND ART

Synthetic images which are referred to as "mosaic art" (mosaic images and photo mosaics) are known as expression methods for posters, web pages and the like used for advertising new products or announcing events.

For example, the mosaic art can be made by selecting in advance an image showing a picture (design) based on which the mosaic image is made and generating divided areas by dividing the image into a plurality of areas. Further, this method includes generating a mosaic image by extracting a plurality of images which are similar to color information (such as chromaticity data such as RGB) of the divided areas and match the divided areas, and combining the extracted images (hereinafter, divided images) in a tile pattern.

Patent Literature 1 discloses a technique of generating a mosaic image provided to a mobile terminal, using an image posted by a user for divided images. More specifically, with the technique disclosed in Patent Literature 1, the posted image is corrected to approximate color information of the posted image to color information shown by divided areas of the image which is the source of the mosaic image.

CITATION LIST

Patent Literature

Patent Literature 1: Japanese Patent Application Laid-Open No. 2010-4166

SUMMARY OF INVENTION

Problem to be Solved by the Invention

When the above mosaic image is used in, for example, a web page, uniqueness of the mosaic image attracts the user's attention at a first glance. However, a mosaic image which is completed once does not change afterward, and therefore the same mosaic image as the mosaic image which the user previously sees is displayed every time the user browses, for example, the web page at a different time. Hence, it is difficult to keep user's motivation of browsing a mosaic image as the time passes.

The present invention is made in light of the above problem, and an example of the object of the present invention is to provide an image generation device, an image generation method, an image generation program and a recording medium which can generate a mosaic image which keeps user's motivation of continuously browsing the mosaic image.

Means for Solving the Problem

In order to solve the above problem, the invention according to claim 1 is an image generation device which generates a mosaic image using as a source image a material image divided into a plurality of divided areas, the image generation device comprising:
an acquiring means that acquires an image from a terminal device through a network; and
a mosaic image generating means that generates a mosaic image by allocating the image acquired by the acquiring means, to one of the divided areas based on color information of the image acquired by the acquiring means and color information of each of the divided areas of the material image used as the source image,
wherein, after generating the mosaic image, the mosaic image generating means generates a new mosaic image by changing at least one of a number of the divided areas and the material image in response to an increase in a number of images acquired by the acquiring means.

According to the present invention, the mosaic image is generated based on the image acquired from the terminal device, and further images are acquired from the terminal device, so that the number of acquired images then increases. Further, a new mosaic image is generated by changing at least one of the number of divided areas and the material image of the previously generated image in response to an increase in the number of acquired images. By this means, the resolution of the newly generated mosaic image and the material image imitated by the newly generated mosaic image change from the previously generated mosaic image. Consequently, it is possible to encourage user's motivation of continuously browsing the mosaic image.

The invention according to claim 2 is the image generation device according to claim 1,
wherein the mosaic image generating means generates a mosaic image by allocating the image acquired by the acquiring means to the divided areas of the material image divided into the divided areas corresponding to a number matching a number of images acquired by the acquiring means, and generates a mosaic image by increasing the number of the divided areas in response to an increase in the number of images acquired by the acquiring means.

According to the present invention, the resolution of the generated mosaic image improves in proportion to an increase in the number of the acquired images. Consequently, a mosaic image which more faithfully imitates the material image is generated in proportion to an increase in the number of acquired images, so that it is possible to encourage user's motivation of continuously browsing the mosaic image.

The invention according to claim 3 is the image generation device according to claim 1 or claim 2,
further comprising a color information acquiring means that acquires color information of the divided areas of a plurality of material images,
wherein the mosaic image generating means generates a mosaic image by allocating the image acquired by the acquiring means, to the divided areas of one of the material images based on color information of the image acquired by the acquiring means and color information acquired by the color information acquiring means, and using one of the material images as a source image, and after generating the mosaic image, the mosaic image generating means further generates a mosaic image by using as a new source image the material image different from the material image used as the source image, in response to an increase in a number of images acquired by the acquiring means.

According to the present invention, the material image imitated by the mosaic image changes to another material image in response to an increase in the number of acquired images. Consequently, it is possible to encourage user's motivation of continuously browsing the mosaic image.

The invention according to claim 4 is the image generation device according to claim 3, wherein the mosaic image generating means generates a mosaic image using as a source image the material image in which images are allocated to all of the divided areas, in response to an increase in a number of images acquired by the acquiring means.

According to the present invention, when the material image imitated by the mosaic image changes to another material image, it is possible to generate a mosaic image without defect portions. Consequently, it is possible to encourage user's motivation of continuously browsing the mosaic image.

The invention according to claim 5 is the image generation device according to claim 3 or claim 4, wherein the color information acquiring means acquires color information of differing areas which are the divided areas comprising a difference in color between a non-source image which is the material image which is not used as the source image among the plurality of material images, and the source image, and the mosaic image generating means generates a mosaic image for which the non-source image is used as a new source image by allocating the image acquired by the acquiring means to one of the differing areas of one of the non-source images based on color information of the image acquired by the acquiring means and color information of the differing areas acquired by the color information acquiring means, and using images allocated to the differing areas of the non-source image in which images are allocated to all of the differing areas and images allocated to the divided areas other than the differing areas in the source image.

According to the present invention, images allocated to all divided areas having different colors between material images which are not currently source images of mosaic images and a material image which is used as a source image of a mosaic image, so that a mosaic image is generated using images allocated thereto and the image used to generate the mosaic image which imitates the material image which is currently used as the source image. Hence, it is not necessary to allocate images to all divided areas of the material image when the material which is the source image of the mosaic image is changed. Consequently, it is possible to more quickly change a mosaic image than when images are allocated to all divided areas of the material image, so that it is possible to encourage user's motivation of continuously browsing the mosaic image.

The invention according to claim 6 is the image generation device according to one of claims 3 to 5, further comprising:

an order information acquiring means that acquires order information indicating a display order of each of the material images; and a mosaic image transmitting means that transmits display information for displaying the mosaic image generated by the mosaic image generating means, to the terminal device through the network according to an order matching the display order of the material images which are used as source images of mosaic images displayed based on the display information.

According to the present invention, the material image imitated by the mosaic image displayed on the terminal device changes according to the order indicated by order information. Consequently, it is possible to change the material image imitated by the mosaic image, based on an intension of a person who provides a mosaic image.

The invention according to claim 7 is the image generation device according to one of claims 1 to 6, further comprising a deciding means that decides whether or not there are the divided areas which are suitable to allocate the image acquired by the acquiring means, based on color information of the image acquired by the acquiring means and color information of each of the divided areas, wherein the mosaic image generating means does not use an image for which the deciding means decides that there is no suitable divided area to allocate to generate a mosaic image, and does not include a number of images for which the deciding means decides that there is no suitable divided area to allocate, in the number of images acquired by the acquiring means.

According to the present invention, even when the image acquired from the terminal device is not suitable for any divided area, this image is not used to generate a mosaic image. Consequently, a mosaic image which more faithfully imitates the material image is generated, so that it is possible to encourage user's motivation of continuously browsing the mosaic image.

The invention according to claim 8 is the image generation device according to one of claims 1 to 7, wherein the mosaic image generating means preferentially allocates an image to the divided areas comprising an outline image showing an outline of the material image.

According to the present invention, the images acquired from the terminal device are preferentially allocated to divided areas including images showing the outline of the material image. Consequently, the user can learn the material image imitated by the mosaic image at a comparatively early stage.

The invention according to claim 9 is the image generation device according to one of claims 1 to 8, wherein the acquiring means acquires an image to be posted, and identification information of a user who posts the image, from the terminal device, and the image generation device further comprises an assigning means that, when the mosaic image generating means allocates the image acquired by the acquiring means, to the divided area through which a point is set to be assigned, updates point count information by adding a number of assigning points to a number of points indicated by the point count information matching the identification information acquired by the acquiring means among the point count information stored in a point count information memory means that associates and stores the point count information indicating a number of points held by the user, and the identification information of the user.

According to the present invention, when images are allocated to divided areas set in advance, points are assigned to users who have posted these images. Consequently, it is possible to encourage user's motivation of posting images. Consequently, the resolution of a mosaic image and a material image imitated by the mosaic image are expected to change quickly, so that it is possible to encourage user's motivation of continuously browsing the mosaic image.

The invention according to claim 10 is the image generation device according to one of claims 1 to 9, wherein the acquiring means acquires an image to be posted by a user from a terminal device, and the image generation device further comprises:

a mosaic image transmitting means that transmits display information for displaying the mosaic image generated by the mosaic image generating means, to the terminal device through a network, a receiving means that receives request information which is transmitted from the terminal device when the user selects an image included in a mosaic image displayed on the terminal device based on the display information, and which indicates a request of a profile of the user who posts the selected image, and a profile information transmitting means that transmits profile information which shows the profile of the user matching the request information received by the receiving means, to the terminal device which is a transmission source of the request information.

According to the present invention, the user who browses the mosaic image can acquire a profile of a user who has posted the image included in the displayed mosaic image. Consequently, it is possible to encourage user's motivation of browsing the mosaic image.

The invention according to claim 11 is the image generation device according to one of claims 1 to 10, further comprising a memory means that stores the image acquired by the acquiring means, wherein, after generating the mosaic image, the mosaic image generating means generates a new mosaic image by changing at least one of a number of the divided areas and the material image in response to an increase in a number of images stored by the memory means.

The invention according to claim 12 is an image generation method in an image generation device which generates a mosaic image using as a source image a material image divided into a plurality of divided areas, the image generation method comprising:

an acquiring step of acquiring an image from a terminal device through a network;

a first mosaic image generating step of generating a mosaic image by allocating the image acquired in the acquiring step, to one of the divided areas based on color information of the image acquired in the acquiring step and color information of each of the divided areas of the material image used as the source image; and a second mosaic image generating step of, after the mosaic image is generated in the first mosaic image generating step, generating a new mosaic image by changing at least one of a number of the divided areas and the material image in response to an increase in a number of images acquired in the acquiring step.

The invention according to claim 13 is an image generation program causing a computer included in an image generation device which generates a mosaic image using as a source image a material image divided into a plurality of divided areas, to execute:

an acquiring step of acquiring an image from a terminal device through a network;

a first mosaic image generating step of generating a mosaic image by allocating the image acquired in the acquiring step, to one of the divided areas based on color information of the image acquired in the acquiring step and color information of each of the divided areas of the material image used as the source image; and a second mosaic image generating step of, after the mosaic image is generated in the first mosaic image generating step, generating a new mosaic image by changing at least one of a number of the divided areas and the material image in response to an increase in a number of images acquired in the acquiring step.

The invention according to claim 14 is a recording medium having a computer-readable image generation program recorded therein which causes a computer included in an image generation device which generates a mosaic image using as a source image a material image divided into a plurality of divided areas, to execute:

an acquiring step of acquiring an image from a terminal device through a network;

a first mosaic image generating step of generating a mosaic image by allocating the image acquired in the acquiring step, to one of the divided areas based on color information of the image acquired in the acquiring step and color information of each of the divided areas of the material image used as the source image; and a second mosaic image generating step of, after the mosaic image is generated in the first mosaic image generating step, generating a new mosaic image by changing at least one of a number of the divided areas and the material image in response to an increase in a number of images acquired in the acquiring step.

Effects of Invention

According to the present invention, the mosaic image is generated based on images acquired from the terminal device, and the terminal device further acquires images, so that the number of acquired images increases afterward. Further, a new mosaic image is generated by changing at least one of the number of divided areas and the material image of the previously generated image in response to an increase in the number of acquired images. By this means, the resolution of the newly generated mosaic image and the material image imitated by the newly generated mosaic image change from the previously generated mosaic image. Consequently, it is possible to encourage user's motivation of continuously browsing the mosaic image.

BRIEF DESCRIPTION OF DRAWINGS

FIG. 3A to FIG. 3C illustrate tables indicating information stored in a posting image DB 141, a material image DB 142 and a mosaic image DB 143 constructed in a memory unit 14.

FIG. 4A illustrates a specific example of information stored in the posting image DB 141, FIG. 4B illustrates a specific example of information stored in the material image DB 142 and FIG. 4C illustrates a specific example of information stored in the mosaic image DB 143.

FIG. 5 is a view illustrating an example of a method of dividing a material image.

FIG. 10A illustrates a specific example of information stored in the material image DB 142, and FIG. 10B is a view illustrating an example of information set to material image information.

FIG. 18 is a view illustrating a screen example displayed in a window screen which shows on the display of the display unit 22 a web page which displays mosaic images generated immediately before and mosaic images of a low resolution generated in the past based on the same material image as the mosaic images.

FIG. 19 is a view illustrating a mosaic image shown on the display of the display unit 22.

FIG. 20A to FIG. 20C illustrate tables illustrating information stored in the posting image DB 141, the material image DB 142 and the mosaic image DB 143 constructed in the memory unit 14.

FIG. 21A illustrates a specific example of information stored in the posting image DB 141, and FIG. 21B illustrates a specific example of information stored in the material image DB 142.

FIG. 34 illustrates a specific example of information stored in the material image DB 142.

FIG. 35A to FIG. 35C illustrate tables indicating information stored in the posting image DB 141, the material image DB 142 and the mosaic image DB 143 constructed in the memory unit 14.

FIG. 36A illustrates a specific example of information stored in the material image DB 142 when a display order of a material image is the first, and FIG. 36B illustrates a specific example of information stored in the material image DB 142 when the display order of the material image is the second or below.

FIG. 37 is a schematic diagram illustrating a mode where a first material image is divided into 986 divided areas when the first material image shows "a closed state of a flip mobile telephone".

FIG. 38 is a schematic diagram illustrating a mode where one of second material images is divided into 986 divided areas when the second material image shows "a closed state of a flip mobile telephone changes to a slightly opened state".

MODE FOR CARRYING OUT THE INVENTION

Hereinafter, embodiments of the present invention will be described with reference to the drawings. In addition, the embodiments will be described below where the present invention is applied to an information providing device 1.

First Embodiment

First, a configuration and an outline of a function of an information providing device 1 according to an embodiment of the present invention will be described using FIG. 1.

Figure 1:
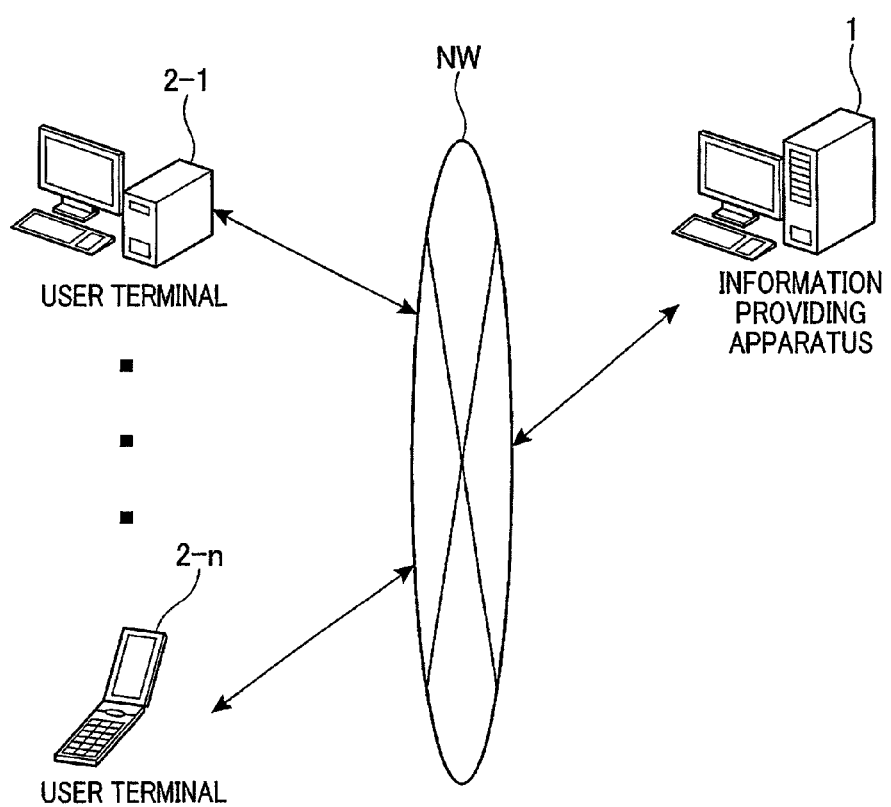
FIG. 1 is a view illustrating an example of a schematic configuration of an information providing system including an information providing device 1 according to an embodiment.

FIG. 1 is a view illustrating an example of an outline of configuration of an information providing system including the information providing device 1 according to the present embodiment.

As illustrated in FIG. 1, the information providing device 1 and a plurality of user terminals 2-*k* (k=1 and 2 to n) (an example of a terminal device) can transmit and receive data to and from each other using, for example, TCP/IP for a communication protocol through a network NW. In addition, the network NW is constructed with, for example, Internet, a dedicated communication line (for example, CATV (Community Antenna Television) line), a mobile communication network (including, for example, base stations) and a gateway.

With this configuration, the information providing device 1 is, for example, a web server which is installed to run an information providing site which provides various pieces of information and services. This information providing device 1 transmits to a user terminal 2-*k* a web page according to a HTTP (Hyper Text Transfer Protocol) request from the user terminal 2-*k*. Further, the user terminal 2-*k* displays, for example, the received web page on a window screen shown on a display by means of a web browser. On the web page displayed in this way, content information is displayed which shows, for example, an outline of a product or service or announces a campaign of this product or service.

Further, a mosaic image is displayed together with or in association with the content information (for example, displayed on a web page of a link source of the content information).

Although a mosaic image belongs to a common technique and will not be described in detail, such a mosaic image is generated by selecting a material image (hereinafter, simply "material image") of a picture (design) based on which the mosaic image is generated, dividing the material image into a plurality of areas, extracting a plurality of divided areas which approximate (are similar) to color information (for example, chromaticity data such as RGB) of the divided areas (hereinafter, simply "divided areas") and allocating the divided images to the divided areas. This mosaic image is a synthetic image which imitates a material image (which is generated based on a material image). In addition, a material image based on which a mosaic image is generated (which is a source of a mosaic image) is referred to as a "source image".

The mosaic image displayed on a web page is generated by acquiring a material image from the user terminal 2-*k*, dividing the material image into predetermined divided areas according to a quantity (hereinafter, "the number of posts) of a plurality of items of stored image data (hereinafter, simply "posting image"), and allocating the posting images to the divided areas based on color information of each of the posting images and color information of each of the divided areas of the material image. A mosaic image is generated from, for example, posting images posted by a plurality of users. Meanwhile, posting a posting image includes that a user operates the user terminal 2-*k* to transmit the posting image provided by the user from the user terminal 2-*k* to the information providing device 1.

In addition, although one information providing device 1 is illustrated with an example in FIG. 1 for ease of description, there may be multiple information providing devices 1. Further, there are a plurality of user terminals 2-*k* per user.

Figure 2:
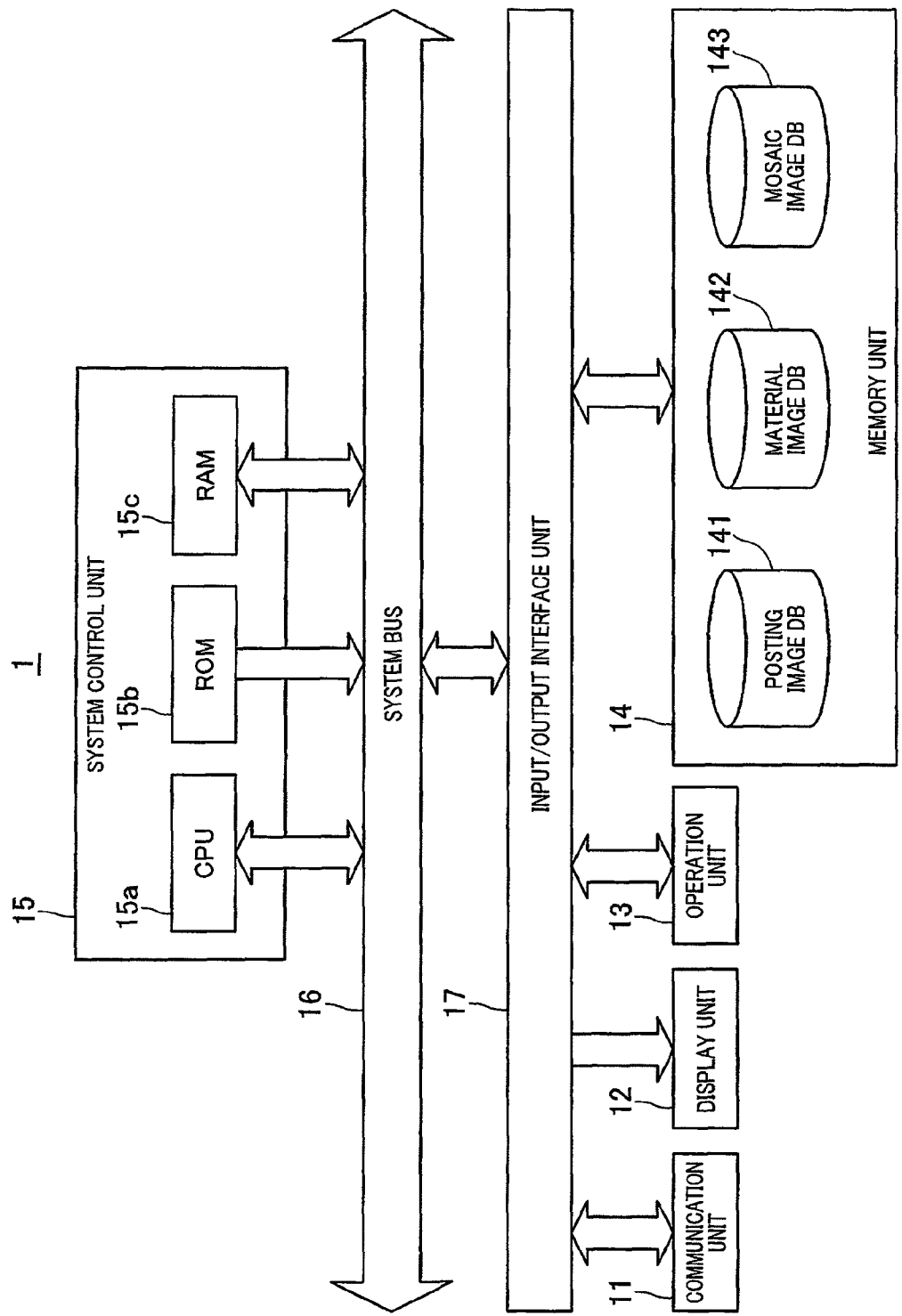
FIG. 2 is a block diagram illustrating an example of a schematic configuration of the information providing device 1 according to an embodiment.

FIG. 2 is a block diagram illustrating an example of an outline of configuration of the information providing device 1 according to the present embodiment.

As illustrated in FIG. 2, the information providing device 1 has a communication unit 11, a display unit 12, an operation unit 13, a memory unit 14 (an example of a memory means and a point count information memory means), an input/output interface unit 17 and a system control unit 15 (an acquiring means, a memory means, a color information acquiring means, a mosaic image generating means, a deciding means, an assigning means, a mosaic image transmitting means, a receiving means and profile information transmitting means). Further, the system control unit 15 and the input/output interface unit 17 are connected through a system bus 16.

The communication unit 11 connects to the network NW, and controls communication with the user terminal 2-*k*.

Further, with the present embodiment, the communication unit 11 functions as an interface of connecting to the network NW, and acquiring a posting image transmitted from the user terminal 2-*k*.

The display unit 12 has a display for displaying, for example, the acquired data.

The operation unit 13 has, for example, a keyboard and a mouse.

The memory unit 14 employs a configuration including, for example, a hard disc drive, and stores various programs such as an operating system and a data extracting program. In addition, the various programs (including an image generation program according to the present invention) may be recorded in a recording medium such as a DVD (Digital Versatile Disc) and read through a drive device.

Further, in the memory unit 14, a posting image DB (database) 141, a material image DB 142 and a mosaic image DB 143 are constructed.

In addition, these databases may be constructed in a database server which manages databases. In this case, the information providing device 1 may be configured as a server group configured to include the database server and other servers.

Meanwhile, the posting image DB 141, the material image DB 142 and the mosaic image DB 143 constructed in the memory unit 14 will be described in association with FIG. 3.

FIG. 3A to FIG. 3C illustrate tables indicating information stored in the posting image DB 141, the material image DB 142 and the mosaic image DB 143 constructed in the memory unit 14.

In the posting image DB 141, the acquired posting images are stored (FIG. 3A), and these posting images are converted into formats such as JPEG (Joint Photographic Experts Group), TIFF (Tagged-Image File Format) or PNG (Portable Network Graphics) and stored.

Further, in the posting image DB 141, the stored posting images and information described below and related to the posting images (for example, a profile of a person who is shown in a posting image such as a name, a hometown and a hobby, and a URL related to the profile) may be associated and stored.

Furthermore, in the posting image DB 141, the stored posting images and color information of the stored posting images may be associated and stored. The color information refers to a value obtained by adopting, for example, known RGB conversion and quantizing a color indicated by the posting image, and is calculated by the system control unit 15 described below.

Although this RGB conversion is a known technique and will not be described in detail, the system control unit 15 dissolves pixel data configuring a posting image, into R (Red), G (Green) and B (Blue) components per pixel, and quantizes each component with 256 tones. The quantized pixel data is represented by, for example, equation 1.

$$(R=0 \text{ to } 255, G=0 \text{ to } 255 \text{ and } B=0 \text{ to } 255) \quad \text{Equation (1)}$$

Further, all items of pixel data configuring a posting image are quantized to calculate RGB conversion results. That is, color information is a set of pieces of information of R, G and B of each pixel of a posting image.

In addition, a method of quantizing a color shown by a posting image is by no means limited to the RGB conversion, and, for example, may adopt CMYK color conversion or Lab color conversion. In addition, depending on a format of image data of a posting image transmitted from the user terminal 2-$k$, information of pixels has in some cases been quantized already. In this case, the system control unit 15 only needs to acquire color information of the image data.

FIG. 4A illustrates a specific example of information stored in the posting image DB 141. In the posting image DB 141, posting images used to generate mosaic images are stored. As illustrated in FIG. 4A, in the posting image DB 141, a posting image number, a posting image, a user ID and color information are associated per posting image and stored. The posting image number indicates an order at which an associated posting image is posted. The posting image number is assigned to each posting image in order from the first. The user ID is identification information of a user who posts a posting image.

In the material image DB 142, material images are stored (FIG. 3B). These material images are image data showing pictures and designs based on which mosaic images are generated, and are converted into formats such as JPEG, TIFF or PNG and stored.

Further, the material images may be stored in the material image DB 142 in advance or read from the material images stored in an information recording medium such as a USB memory through an interface unit which is not illustrated. Furthermore, the material images transmitted from the user terminal 2-$k$ may be acquired through the communication unit 11 and stored. When the user operates the user terminal 2-$k$ to transmit a posting image which is a material image, to the information providing device 1, the user can browse a mosaic image which the user desires.

FIG. 4B illustrates a specific example of information stored in the material image DB 142. As illustrated in FIG. 4B, in the material image DB 142, a material image ID and a material image are associated per material image and stored. The material image ID is identification information of the associated material image.

In the mosaic image DB 143, for example, HTML (Hyper Text Markup Language) document files, XML (Extensible Markup Language) document files and XHTML (Extensible HyperText Markup Language) document files configuring web pages which display, for example, the mosaic images provided to the user terminal 2-$k$ are stored.

The mosaic image displayed on the web page is described in, for example, a tag in a HTML sentence (for example, <div style> to </div> using a common style sheet).

More specifically, a position allocated to which a posting image stored in the posting image DB 141 is specified for each posting image between <div style> and </div> in the range encircled by <TABLE border="1"> to </TABLE>. That is, a mosaic image is represented as a table described using, for example, HTML. Each cell indicated by a td tag set between a table start tag and a table end tag (or between <div style> and </div>) corresponds to each divided area of a material image. Further, a posting image allocated to a divided area is an element of a cell corresponding to this divided area.

Furthermore, an interface for transmitting (uploading) the posting image to the information providing device 1 may be described in the HTML sentence using, for example, a CGI program.

Still further, in the HTML sentence, a link is set for acquiring and displaying a web page which displays the posting image and information (hereinafter, "posting image related information") related to the posting image to, when, for example, the user terminal 2-$k$ performs an operation of selecting a posting image, acquire the web page which displays the posting image and information related to the posting image, from the information providing device 1. The posting image related information includes, for example, a brief profile of a user who has posted a posting image.

This web page is generated by referring to, for example, information related to association of a posting image stored in the posting image DB 141 and information related to the posting image.

Although the posting image selecting operation refers to, for example, clicking a posting image embedded in the mosaic image by a user's operation of a mouse, the posting image selecting operation is by no means limited to this, and refers to, for example, selecting (pressing) the posting image by the finger or a touch pen when the posting image is displayed on, for example, a display having a touch panel. In other words, the posting image selecting operation refers to an operation of selecting one posting image which is part of images in a mosaic image displayed on a web page and configures the mosaic image.

In this case, as illustrated in FIG. 3C, in the mosaic image DB 143, a URL (for example, http://www.yyy.zzz/zzz.html) of the posting image and information (posting image related information) related to the posting image, and a file name indicating the embedded posting image are associated and stored. Further, in the HTML sentence, when the operation of selecting the posting image is performed, the file is acquired, a command for setting a link to display the posting image such as <a href="http://www.yyy.zzz/zzz.html"><img src="file name indicating posting image"></a> is described.

FIG. 4C illustrates a specific example of information stored in the mosaic image DB 143. As illustrated in FIG. 4C, in the mosaic image DB 143, a mosaic image ID and a mosaic image are associated per mosaic image and stored. The mosaic image ID is identification information of the associated mosaic image. A command for setting the link is set between a td start tag and a td end tag indicating cells of the table.

In addition, in the memory unit 14, a user information DB may be constructed. In the user information DB, information related to each user is stored. More specifically, in the user information DB, a user ID, a password, a user name, a date of birth, the sex, a hometown, a telephone number, an electronic mail address, the number of holding points, a hobby and a profile URL are stored per user. The user ID is identification information of the associated user. The number of holding points refers to the total number of points which the user currently holds. The user can utilize points which the user holds, at, for example, a predetermined website. When, for example, a user purchases a product using, for example, a shopping site, the user can pay by points instead of paying money. In addition, the number of holding points is an example of point count information according to the present invention.

The profile URL is a URL of a web page which displays a detailed profile of the user. In addition, posting image related information includes, for example, a brief profile of a user who has posted a posting image. Further, the posting image related information also includes a profile URL. The profile included in posting image related information corresponds to, for example, information stored in the user information DB, and may be, for example, information related to a user or information which introduces the user.

User information registered in the user information DB is, for example, information inputted by the user for user registration. In the user information DB, information of users who only browse mosaic images without posting images may not be registered.

The memory unit 14 stores the current number of posts. A default value of the number of posts is 0.

Back to FIG. 2, the input/output interface unit 17 is a processing unit which performs interface processing between the communication unit 11, the display unit 12, the operation unit 13 and the memory unit 14, and the system control unit 15.

The system control unit 15 has, for example, a CPU (Central Processing Unit) 15a, a ROM (Read Only Memory) 15b and a RAM (Random Access Memory) 15c, and generates a mosaic image.

Hereinafter, an operation of the system control unit 15 according to the present embodiment will be described in detail with reference to FIGS. 6 to 9.

The system control unit 15 according to the present embodiment first divides a material image stored in the material image DB 142 into a plurality of divided areas a size of which is set according to the quantity of posting images (hereinafter, "the number of posts") stored in the posting image DB 141. This division is performed every time the information providing device 1 acquires a new posting image from one of the user terminals 2-k, that is, every time the number of posts increases.

In addition, the divided areas according to the present embodiment are provided such that the material image is divided into the same number of images as the quantity of the posting image and the size of each divided area is equal. That is, the system control unit 15 divides the material image into the same number of divided areas as the number of posting images (hereinafter, "the number of posts") acquired from the user terminal 2-k and stored in the posting image DB 141. Meanwhile, the number of divided areas when a material image is divided into divided areas is "the number of divisions". Hence, the size of these divided areas becomes small in inverse proportion to an increase in the quantity of posting images stored in the posting image DB 141, and, further, the quantity of the divided areas increases in proportion to an increase in the quantity of the posting images stored in the posting image DB 141.

FIG. 5 is a view illustrating an example of a method of dividing a material image. As illustrated in FIG. 5, when the number of posts is 1, one divided area is set. That is, when there is one posting image, a mosaic image is generated using one posting image. In addition, although a mosaic image is configured with a plurality of posting images, an image configured only with one posting image is also referred to as a mosaic image for ease of description.

When the number of posts increases to 2, a material image is, for example, divided into two vertically or horizontally. Next, when the number of posts increases to 3, a material image is divided into three. When the material image is divided into three, the material image cannot be divided into a balanced grid pattern. In this case, when, for example, a material image is divided into two vertically, one of the two divided areas is further divided into two. As described above, there are a case where the number of divisions is a prime number and therefore a material image cannot be divided into a balanced grid pattern or a case where a material image is divided into a balanced grid pattern and therefore the ratio of the number of divided areas in a vertical direction and the number of divided areas in a horizontal direction becomes far from 1 to 1 (for example, when the number of divisions is 22, 2 in the vertical direction×11 in the horizontal direction holds). In this case, division is performed such that the ratio of the number of divided areas in the vertical direction and the number of the divided areas in the horizontal direction becomes close to 1 to 1 and the size of each divided area (display area and the ratio in the longitudinal direction and the horizontal direction) is similar as much as possible.

Next, when the number of posts increases to 4, a material image is divided into four of two in the longitudinal direction and two in the horizontal direction. Subsequently, division is performed in the same manner.

Hereinafter, a relationship between the size and the quantity of the divided areas of the material image will be described using FIGS. 6 and 7.

Figure 6:
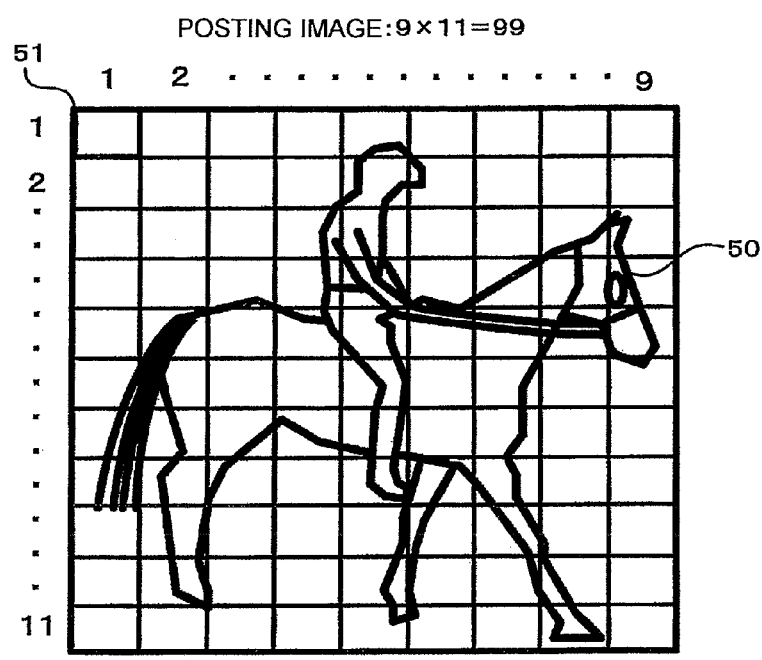
FIG. 6 is a schematic diagram illustrating a mode where, when the quantity of posting images stored in the posting image DB 141 is 99, a material image is divided into a plurality of divided areas a size of which is set according to the quantity of the posting images stored in the posting image DB 141.

FIG. 6 is a schematic diagram illustrating a mode where, when the quantity of posting images stored in the posting image DB 141 is 99, a material image is divided into a plurality of divided areas a size of which is set according to the quantity of the posting images stored in the posting image DB 141.

As illustrated in FIG. 6, when the quantity of posting images stored in the posting image DB 141 is 99, a horse image 50 which is a material image is divided into 99 divided areas 51.

Figure 7:
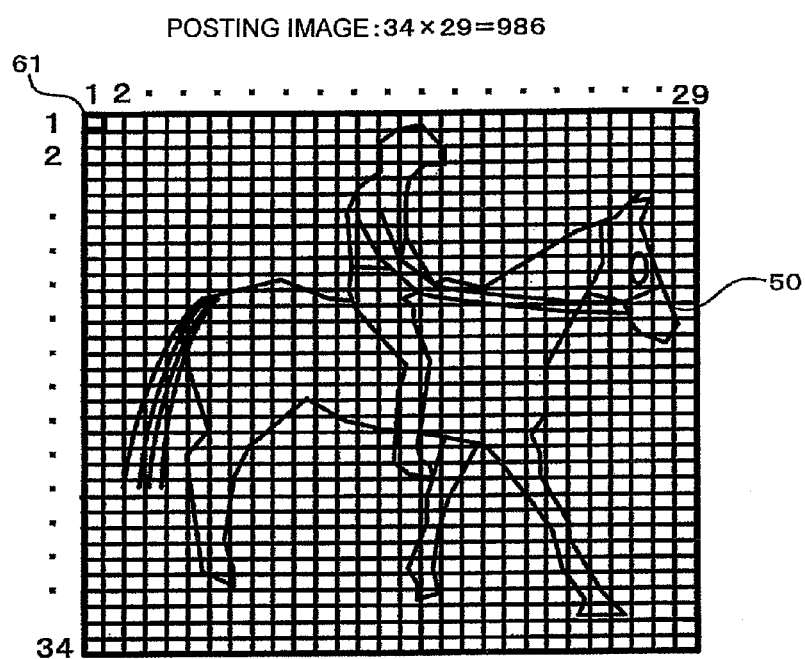
FIG. 7 is a schematic diagram illustrating a mode where, when the quantity of posting images stored in the posting image DB 141 is 986, a material image is divided into a plurality of divided areas a size of which is set according to the quantity of the posting images stored in the posting image DB 141.

Further, FIG. 7 is a schematic diagram illustrating a mode where, when the quantity of posting images stored in the posting image DB 141 is 986, a material image is divided into a plurality of divided areas a size of which is set according to the quantity of the posting images stored in the posting image DB 141.

As illustrated in FIG. 7, when the quantity of posting images stored in the posting image DB 141 is 986, the horse image 50 which is a material image is divided into 986 divided areas 61.

Back to description of FIG. 2, the system control unit 15 next calculates color information of each posting image stored in the posting image DB 141, and each divided area of the material image.

Although, for example, CMYK color conversion or Lab color conversion may be adopted in addition to the above RGB conversion to calculate color information, a case will be described below as an example where RGB conversion is adopted.

To adopt RGB conversion of the posting images, RGB conversion results (FIG. 3A) calculated in advance by the system control unit 15 and associated with posting images and stored in the posting images DB 141 may be used, or may be calculated by the system control unit 15 where necessary. More specifically, the RGB conversion results associated with the posting images and stored are color information illustrated in FIG. 4A.

Color information in the divided areas is calculated by adopting the above RGB conversion for pixel data in the divided areas using the same method as a method of calculating color information of the posting images. Meanwhile, color information of an image is information of a color of each pixel forming an image. Hence, color information is information indicating the image itself. Consequently, it is possible to acquire color information from image data depending on an image format. In this case, it is not necessary to calculate color information. In addition, calculating color information is also an example of acquiring color information.

Next, the system control unit 15 compares a RGB conversion result of each of the posting images and a RGB conversion result in each of the divided areas of the material image, and extracts the RGB conversion result of the posting image indicating a result which approximates to the RGB conversion result of each of the divided areas. For example, the system control unit 15 calculates the similarity between a RGB conversion result of the divided area and a RGB conversion result of the posting image per divided area.

Various decision criteria can be adopted to decide whether or not the RGB conversion result of each of the posting images and the RGB conversion result of each of the divided areas approximate. When, for example, a difference between a value indicated by the RGB conversion result of each of the posting images and a value indicated by the RGB conversion result of each of the divided areas is within a predetermined threshold determined in advance, it may be decided that the RGB conversion result of each of the posting images and the RGB conversion result of each of the divided areas approximate. When, for example, the calculated similarity is the threshold set in advance or more, the system control unit 15 decides that the RGB results approximate. Thus, the system control unit 15 decides that the divided area having color information which approximates to color information of the posting image is a divided area which is suitable to allocate the posting image. Further, when there is no divided area having the calculated similarity which is the threshold or more, the system control unit 15 decides that there is no divided area which is suitable to allocate the posting image. In this case, the system control unit 15 does not register this posting image in the posting image DB 141. Hence, the posting image is not used to generate a mosaic image.

Further, when deciding that the RGB conversion result of each of the divided areas and the RGB conversion result of each of the posting images approximate, the system control unit 15 generates a mosaic image based on the material image by allocating the posting image indicated by the RGB conversion result of the posting image, to the divided area indicated by the RGB conversion result of each of the divided areas. For example, the system control unit 15 allocates a posting image to the divided area of the highest similarity among divided areas having the similarity equal to or more than the threshold. The system control unit 15 allocates each posting image stored in the memory unit 14, to the divided areas. The number of posting images stored in the memory unit 14 and the number of divided areas are the same, and, when all posting images are allocated to the divided areas respectively, the posting images are allocated to all divided areas. Consequently, the system control unit 15 can generate a complete mosaic image by generating the mosaic image based on this allocation result. The complete mosaic image is a mosaic image without portions (defect portions) to which posting images are not allocated.

Hereinafter, mosaic image generation results will be described upon comparison of FIGS. 8 and 9.

Figure 8:
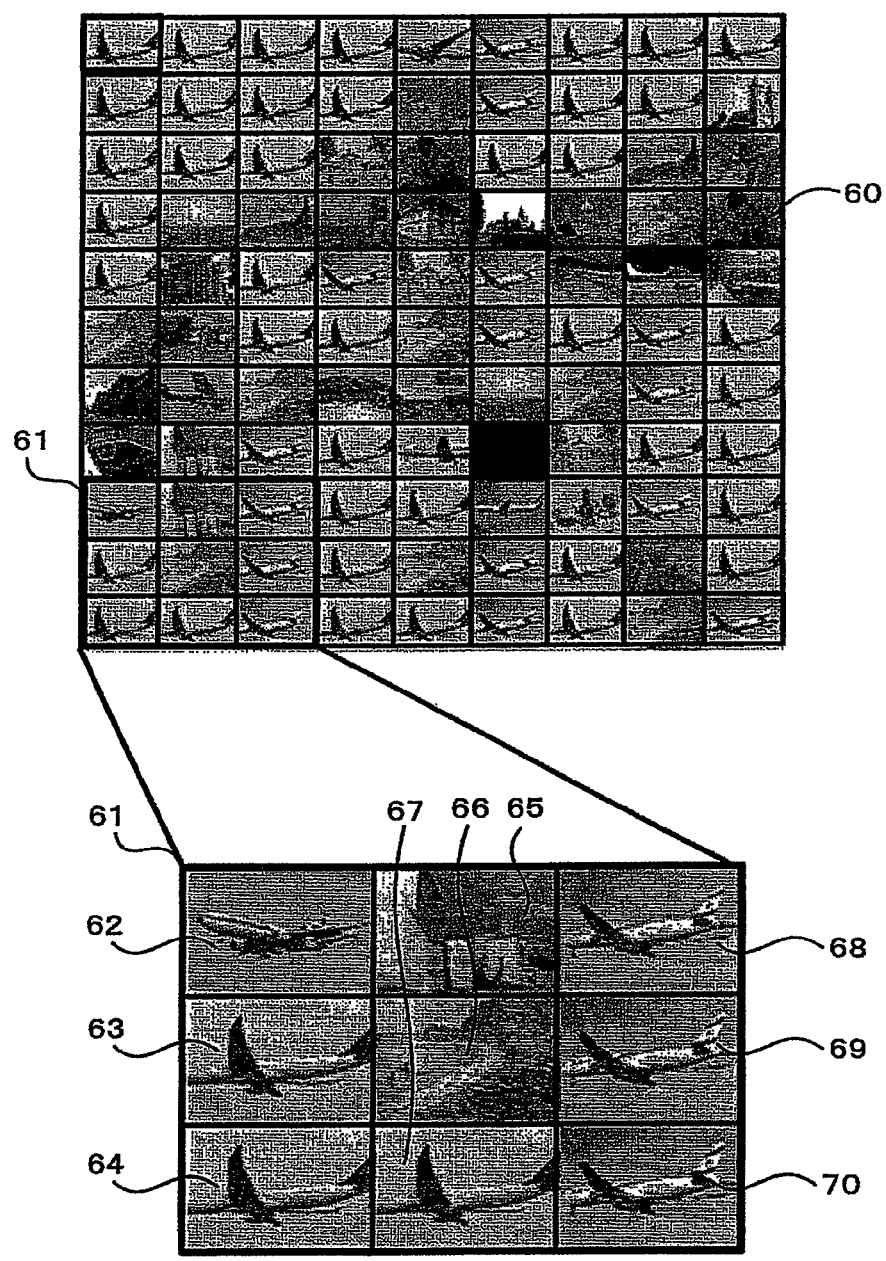
FIG. 8 is a view illustrating a mosaic image generated by a system control unit 15 when the quantity of posting images stored in the posting image DB 141 is 99.

FIG. 8 is a view illustrating a mosaic image generated by the system control unit 15 when the quantity of posting images stored in the posting image DB 141 is 99.

As illustrated in FIG. 8, the posting images which are decided to approximate to each of the divided areas are allocated to 99 divided areas, and a mosaic image 60 based on the horse image 50 is displayed.

Further, to a partially enlarged area 61 of the mosaic image 60, posting images 62 to 70 are allocated.

Figure 9:
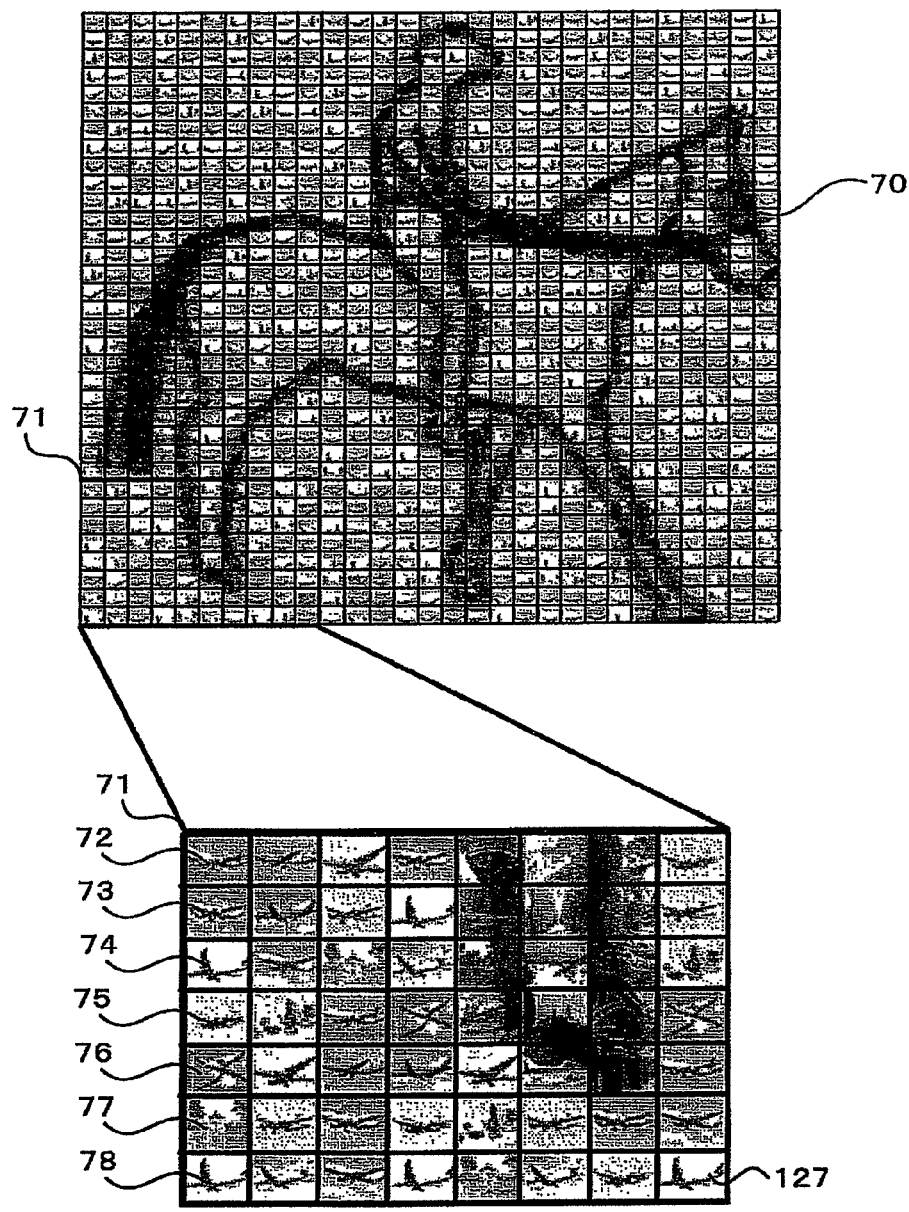
FIG. 9 is a view illustrating a mosaic image generated by the system control unit 15 when the quantity of posting images stored in the posting image DB 141 is 986.

FIG. 9 is a view illustrating a mosaic image generated by the system control unit 15 when the quantity of posting images stored in the posting image DB 141 is 986.

As illustrated in FIG. 9, the posting images which are decided to approximate to each of the divided areas are allocated to 986 divided areas, and a mosaic image 70 which imitates the horse image 50 is displayed.

Further, to a partially enlarged area 71 of the mosaic image 70, posting images 72 to 127 are allocated.

As illustrated in FIGS. 8 and 9, when the quantity of the posting images stored in the posting image DB 141 is greater, a generated mosaic image more faithfully imitates a material image.

More specifically, upon comparison of the mosaic image 60 and the mosaic image 70, the mosaic image 70 more faithfully imitates the horse image 50.

This is because, when the quantity of the posting images stored in the posting image DB 141 is greater, a mosaic image is generated using a greater number of posting images, so that the resolution of the mosaic image becomes higher.

With the mosaic image generated in this way, when the quantity of posting images stored in the posting image DB 141 increases, the resolution of the mosaic image based on the material image improves, so that the material image imitated by the mosaic image is visually learned stepwise.

In addition, the system control unit 15 may generate a mosaic image based on the material image by preferentially allocating the images to divided areas showing the outline of the material image. The divided areas showing an outline include, for example, images showing an outline of a pattern, a figure or an object represented by a material image.

This will be described more specifically using FIG. 7. For example, the system control unit 15 generates a mosaic image by allocating posting images to divided areas showing the outline of the horse illustrated in FIG. 7, allocating posting images to divided areas showing the outline of a person who rides on the horse and then allocating posting images to divided areas inside the outline. Further, although, for example, the system control unit 15 preferentially allocates posting images to divided areas showing the outline of the horse, when color information of the divided areas showing the outline of the horse does not approximate to color information of the posting images, posting images may be allocated to divided areas other than divided areas showing the outline of the horse.

By generating a mosaic image in this way, the user who browses this web page can browse the mosaic image which is completed from specific portions set according to the priority while visually enjoying the mosaic image. A method of extracting an outline from an image includes, for example, a method of acknowledging portions at which a color significantly changes as the outline. In addition, the method of extracting an outline is known, and therefore will not be described in detail.

In addition, points to be assigned to a user who has transmitted a posting image may be associated with each of the divided areas and stored. In this case, when allocating a posting image to a divided area associated with the points and stored, the system control unit 15 assigns points to the user who has transmitted the posting image. That is, when dividing a material image into divided areas, the system control unit 15 determines divided areas through which points are assigned to the user among a plurality of divided areas. Further, when allocating a posting image to divided areas through which points are assigned upon generation of a mosaic image, the system control unit 15 assigns points to a user who has posted the allocated posting image. More specifically, the system control unit 15 updates the number of holding points by adding the number of assigning points such as the number of points set in advance to the number of holding points stored in the user information DB.

With this configuration, it is possible to stimulate motivation of a user who transmits a posting image to transmit more posting images and encourage other users' motivation of repeatedly and continuously browsing a mosaic image, and, consequently, provide an effect of attracting guests.

Further, the system control unit 15 may associate the number (hereinafter, simply "the quantity of posting-images-to-be-stored") set in advance as the number of images-to-be-stored, and a material image divided into a plurality of divided areas having a size matching the quantity, and store the number and the material image in the material image DB 142 in advance (FIG. 3B). Meanwhile, the quantity of posting-images-to-be-stored refers to the number of divisions.

More specifically, the system control unit 15 divides the material image stored in the material image DB 142 such that the number of the divided images is the same as the quantity of posting-images-to-be-stored and the size of each divided area is equal, and associates and stores the material image and the quantity in the material image DB 142.

FIG. 10A illustrates a specific example of information stored in the material image DB 142. As illustrated in FIG. 10A, in the material image DB 142, a material image ID, a material image, the number of division patterns and material image information are associated per material image and stored. The number of division patterns is information how many patterns of the number of divisions there are for the associated material image. For example, the numbers of divisions for a given material image include 99 and 986. In this case, the number of division patterns is set to 2. In addition, the number of division may be set to 3 or more.

The material image information relates to the number of divisions and divided areas per division pattern. A number of pieces of material image information indicated by the number of division pattern are stored. FIG. 10B illustrates an example of information set to material image information. As illustrated in FIG. 10B, for material image information, the number of divisions and color information are set. A number of pieces of color information indicated by the associated number of divisions are set.

The color information is color information of one associated divided area among divided areas divided from a material image. As described above, the color information is information indicating an image itself. Hence, the color information of a divided area is a material image divided into a plurality of divided areas.

Further, the system control unit 15 compares the quantity of posting images stored in the posting image DB 141 and the quantity of posting-images-to-be-stored. Further, the system control unit 15 may generate a mosaic image based on the material image by, when the quantity of posting images stored in the posting image DB 141 approximates to the quantity of posting-images-to-be-stored, extracting a material image stored in the material image DB 142 in association with the quantity of posting-images-to-be-stored, and allocating the stored posting images to a divided area matching the extracted material image. That is, the system control unit 15 extracts color information of each divided area matching the number of divisions which approximates to the current number of posts, from the material image DB 142.

Various decision criteria can be adopted to decide whether or not the quantity of posting images stored in the posting image DB 141 and the quantity of posting-images-to-be-stored approximate. When, for example, the difference between the quantity of posting images stored in the posting image DB 141 and the quantity of posting-images-to-be-stored is within a predetermined threshold set in advance, it may be decided that the quantity of posting images stored in the posting image DB 141 and the quantity of posting-images-to-be-stored approximate.

Further, the system control unit 15 compares the current number of posts and each number of divisions stored in the material image DB 142. Furthermore, the system control unit 15 selects the number of divisions closest to the current number of posts among the numbers of divisions indicating values equal to or more than the current number of posts. For example, the numbers of divisions for a given material image include 99 and 986. In this case, when the number of posts is 1 or more and 99 or less, 99 is selected for the number of divisions. Further, when the number of posts is 100 or more, 986 is selected for the number of divisions.

With this configuration, upon (immediately before) generation of the mosaic image, the system control unit 15 does not need to divide the material image stored in the material image DB 142, into a plurality of divided areas a size of which is set according to the quantity of posting images stored in the posting image DB 141, so that it is possible to improve a processing speed of the entire device.

Further, the system control unit 15 generates a web page which displays the mosaic image according to a HTTP request from the user terminal 2-k, and distributes the web page to the user terminal 2-k.

Next, a configuration and a function of the user terminal 2-k will be described using FIG. 11.

Figure 11:
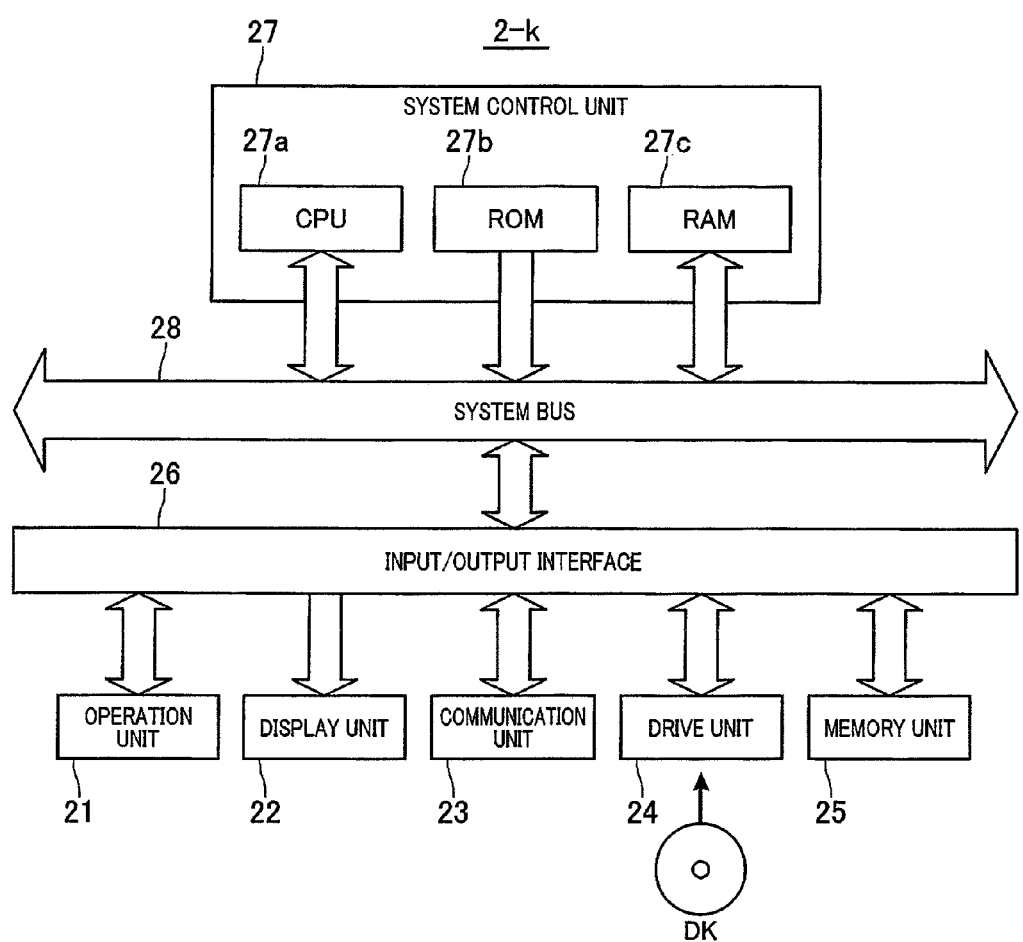
FIG. 11 is a block diagram illustrating a schematic configuration example of a user terminal 2-$k$.

FIG. 11 is a block diagram illustrating a schematic configuration example of the user terminal 2-k.

As illustrated in FIG. 11, the user terminal 2-k has an operation unit 21, a display unit 22, a communication unit 23, a drive unit 24, a memory unit 25, an input/output interface unit 26 and a system control unit 27. Further, the system control unit 27 and the input/output interface unit 26 are connected through a system bus 28. For the user terminal 2-k, for example, a personal computer, a PDA (Personal Digital Assistant) or a mobile telephone is applied.

The operation unit 21 has, for example, a keyboard and a mouse.

The display unit 22 has a display for displaying, for example, web pages.

The communication unit 23 connects to the network NW to control a communication state with, for example, the information providing device 1. The drive unit 24 reads, for example, data from a disc DK(recording medium) such as a CD (Compact Disc) or a DVD (Digital Versatile Disc), and records, for example, data in the disc DK.

The memory unit 25 includes, for example, a hard disc drive, and stores, for example, an operating system (O/S) and a web browser program.

The system control unit 27 has, for example, a CPU 27a, a ROM 27b and a RAM 27c. Further, the system control unit 27 executes the web browser program under execution of the operation system to display the mosaic image on the web browser.

Furthermore, the system control unit 27 transmits the posting images to the information providing device 1 through the communication unit 23. Still further, the system control unit 27 can associate information related to the posting images, with the posting images, and transmit the information.

Next, an operation of an information providing system matching a request of the user terminal 2-k according to the present embodiment will be described using FIGS. 12 to 16.

Figure 12:
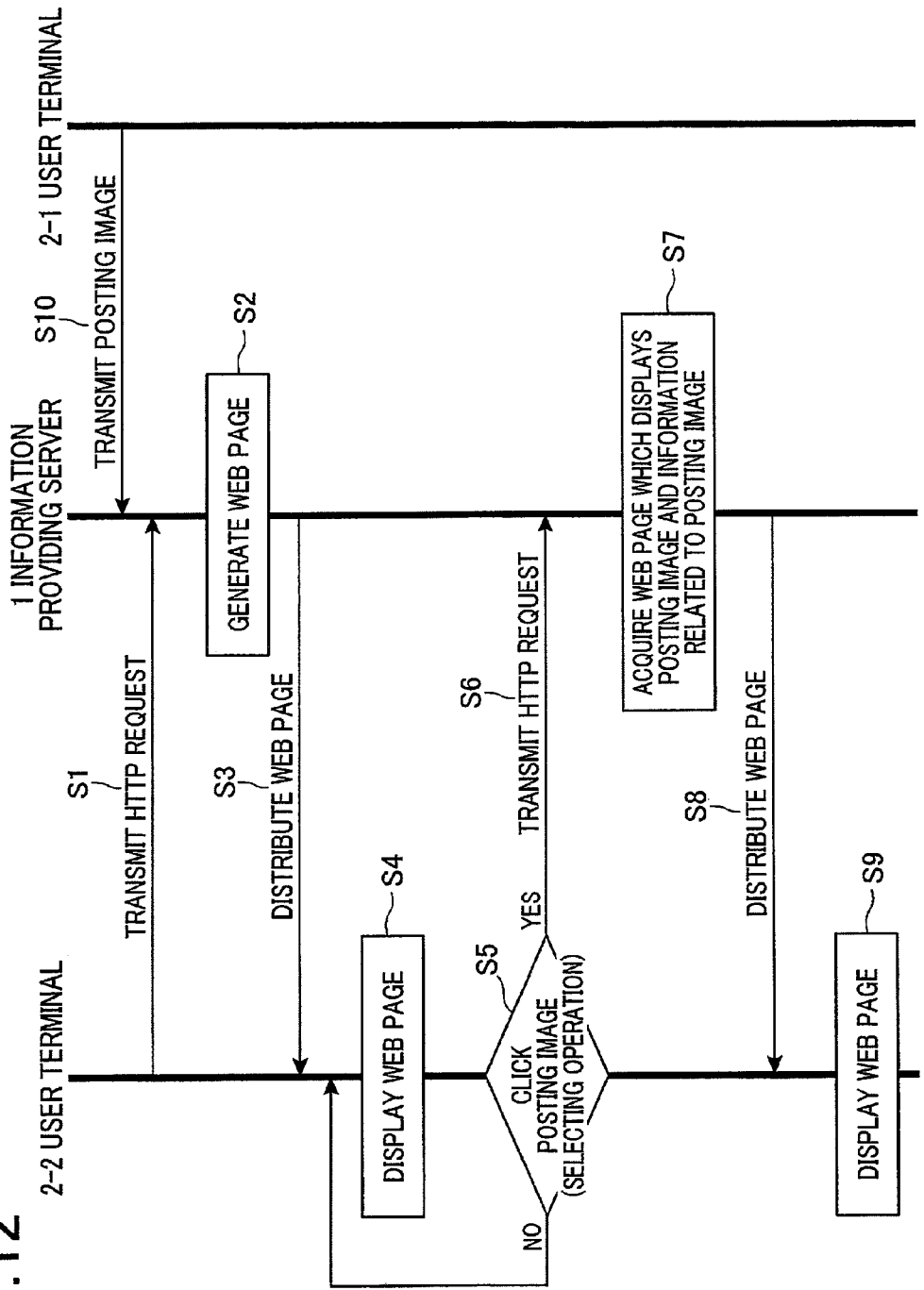
FIG. 12 is a sequence diagram illustrating an operation of the information providing device 1 matching a request of the user terminal 2-$k$ according to an embodiment.

FIG. 12 is a sequence diagram illustrating an operation of the information providing device 1 matching a request of the user terminal 2-k according to the present embodiment.

As illustrated in FIG. 12, a given user terminal 2-k such as a user terminal 2-1 selects an image posted by a user. Then, the user terminal 2-1 transmits the selected image as a posting image to the information providing device 1 (step S10). In this case, the user terminal 2-1 transmits a user ID of the user who has posted the image, to the information providing device 1.

Figure 13:
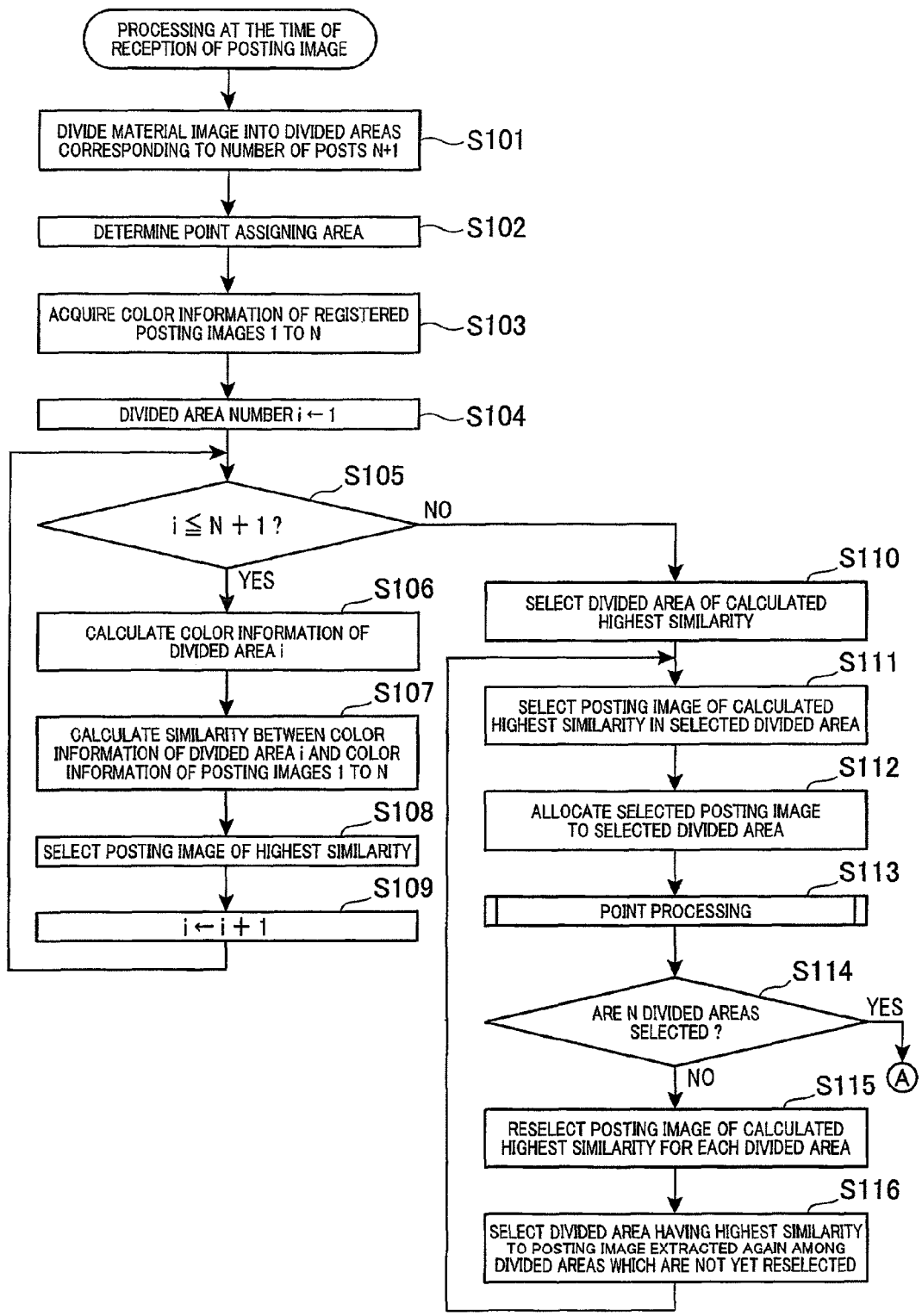
FIG. 13 is a view illustrating a processing example in processing of the system control unit 15 of the information providing device 1 according to an embodiment upon reception of a posting image.
Figure 14:
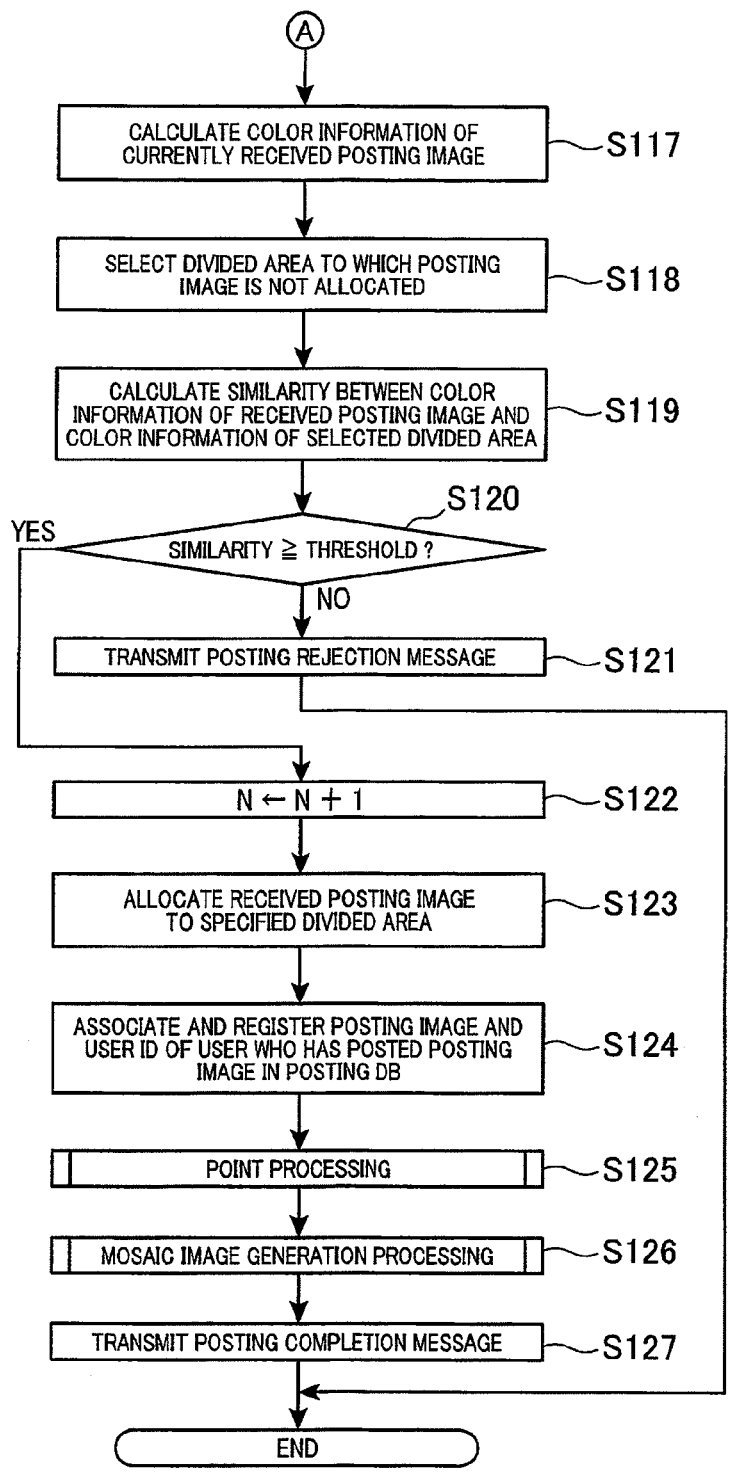
FIG. 14 is a view illustrating a processing example in processing of the system control unit 15 of the information providing device 1 according to an embodiment upon reception of a posting image.

FIGS. 13 and 14 are views illustrating processing examples in processing of the system control unit 15 of the information providing device 1 according to the present embodiment upon reception of a posting image. The processing upon reception of a posting image is started when the information processing device 1 receives a posting image from the user terminal 2-k.

As illustrated in FIG. 13, the system control unit 15 divides a material image stored in the material image DB 142 into divided areas corresponding to a current number of posts N+1 (step S101). In addition, when a plurality of material images are stored in the material image DB 142, the system control unit 15 acquires, for example, a material image set in advance.

Next, the system control unit 15 determines a divided area (hereinafter, "point assigning area") through which points are assigned to the user among the N+1 divided areas (step S102). For example, the system control unit 15 may determine the point assigning area at random. Further, the system control unit 15 may allocate the point assigning area to a plurality of divided areas. In this way, the system control unit 15 sets in advance the divided areas to which points are assigned.

Next, the system control unit 15 allocates each posting image already stored in the posting image DB 141, to the divided areas. First, the system control unit 15 acquires color information of each posting image already stored in the posting image DB 141, from the posting image DB 141 (step S103). Subsequently, a posting image having a posting image number m is referred to as a "posting image m".

Next, the system control unit 15 sets 1 to a divided area number i (step S104). Subsequently, a divided area having a divided area number i is referred to as a "divided area i". Next, the system control unit 15 decides whether or not the divided area number i is N+1 or less (step S105). In this case, when deciding that the divided area number i is N+1 or less (step S105: YES), the system control unit 15 calculates color information of the divided area i (step S106).

Next, the system control unit 15 calculates similarities of color information of the divided area i and color information of posting images 1 to N, respectively (step S107). Next, the system control unit 15 selects a posting image of the highest similarity among the posting images 1 to N (step S108). Next, the system control unit 15 updates the divided area number i by adding 1 to the divided area number i (step S109), and proceeds to step S105.

When deciding in step S105 that the divided area number is not N+1 or less (step S105: NO), the system control unit 15 selects the divided area of the calculated highest similarity among the N+1 divided areas (step S110).

Next, the system control unit 15 selects a posting image of the highest similarity among the selected divided areas (step S111). Next, the system control unit 15 allocates the selected posting image to the selected divided area (step S112). For example, the system control unit 15 associates and stores an image number of the selected posting image and a divided area number of the selected divided area, in the memory unit 14. Next, the system control unit 15 executes point processing described below (step S113).

Next, the system control unit 15 decides whether or not N divided areas are selected (step S114). In this case, when deciding that the N divided areas are not selected (step S114: NO), the system control unit 15 reselects the posting image of the calculated highest similarity for each divided area which is not yet selected (step S115). In this case, the system control unit 15 performs reselection by removing posting images which have been already selected in step S111. Next, the system control unit 15 selects the divided area having the highest similarity with respect to the reselected posting image among divided areas which are not yet selected (step S116). Next, the system control unit 15 proceeds to step S111.

By repeating processings insteps S111 to S116, the system control unit 15 allocates posting images to divided areas prioritizing a combination of higher similarities among possible combinations of divided areas and posting images.

In step S114, when deciding that the N divided areas are selected, (step S114: YES), the system control unit 15 allocates a currently received posting image. As illustrated in FIG. 14, the system control unit 15 calculates color information of the currently received posting image (step S117). Next, the system control unit 15 selects a divided area to which a posting image is not yet allocated among the N+1 divided areas (step S118). Next, the system control unit 15 calculates the similarity between color information of the received posting image and color information of the selected divided area (step S119). Next, the system control unit 15 decides whether or not the calculated similarity is a threshold set in advance or more (step S120).

In this case, when deciding that the calculated similarity is not the threshold or more (step S120: NO), the system control unit 15 transmits a posting rejection message to the user terminal **2-*k* which is the transmission source of a posting image (step S121) and finishes processing upon reception of a posting image. The posting rejection message indicates that posting of a posting image is rejected. The user terminal 2-*k* displays the received posting rejection message on the display unit 22. In this case, the system control unit 15 does not register the currently acquired posting image in the posting image DB 141. Further, in this case, the number of posting images which are not registered in the posting image DB 141 among posing images received from the user terminal 2-*k*** is not included in the number of posts N.

By contrast with this, when deciding that the calculated similarity is a threshold or more (step S120: YES), the system control unit 15 updates the number of posts N by adding 1 to the number of posts N (step S122). Next, the system control unit 15 allocates the currently received posting image to the selected divided area (step S123). Next, the system control unit 15 registers the currently received posting image in the posting image DB 141 (step S124). More specifically, the system control unit 15 associates and stores the updated posting image number N, the currently received posting image, a currently received user ID and color information of the currently received posting image.

Next, the system control unit 15 executes point processing (step S125). Next, the system control unit 15 executes mosaic image generation processing described below (step S126). Next, the system control unit 15 transmits a posting completion message to the user terminal **2-*k* which is the transmission source of the posting image (step S127), and finishes processing upon reception of the posting image. The posting completion message indicates that posting of a posting image is completed. The user terminal 2-*k* displays the received posting completion message on the display unit 22**.

Figure 15:
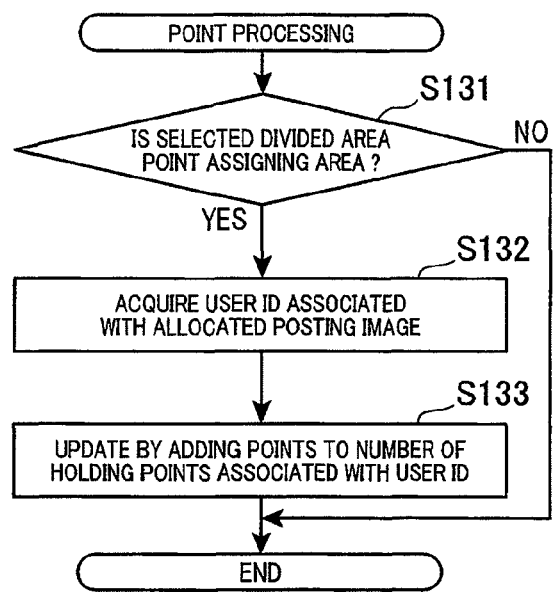
FIG. 15 is a view illustrating a processing example in point processing of the system control unit 15 of the information providing device 1 according to an embodiment.

FIG. 15 is a view illustrating a processing example in point processing of the system control unit 15 of the information providing device 1 according to the present embodiment. As illustrated in FIG. 15, the system control unit 15 decides whether or not the selected divided area is a point assigning area (step S131). In this case, when deciding that the selected divided area is not a point assigning area (step S131: NO), the system control unit 15 finishes point processing.

By contrast with this, when deciding that the selected divided area is a point assigning area (step S131: YES), the system control unit 15 acquires a user ID associated with the posting image allocated to the selected divided area, from the posting image DB (step S132). Next, the system control unit 15 updates the number of holding points associated with the acquired user ID (step S133). More specifically, the system control unit 15 acquires the number of holding points associated with the user ID from the user information DB. Next, the system control unit 15 updates the number of points by adding, for example, the number of points set in advance to the acquired number of holding points. Next, the system control unit 15 rewrites the number of holding points associated with the acquired user ID and stored in the user information DB, to the updated number of points. After finishing processing in step S133, the system control unit 15 finishes the point processing.

In addition, in some cases, a posting image posted by the identical user is allocated to the point assigning area a plurality of times. In this case, the system control unit 15 may perform processing of assigning points to the user only at the first time without assigning points at the second and subsequent times.

Figure 16:
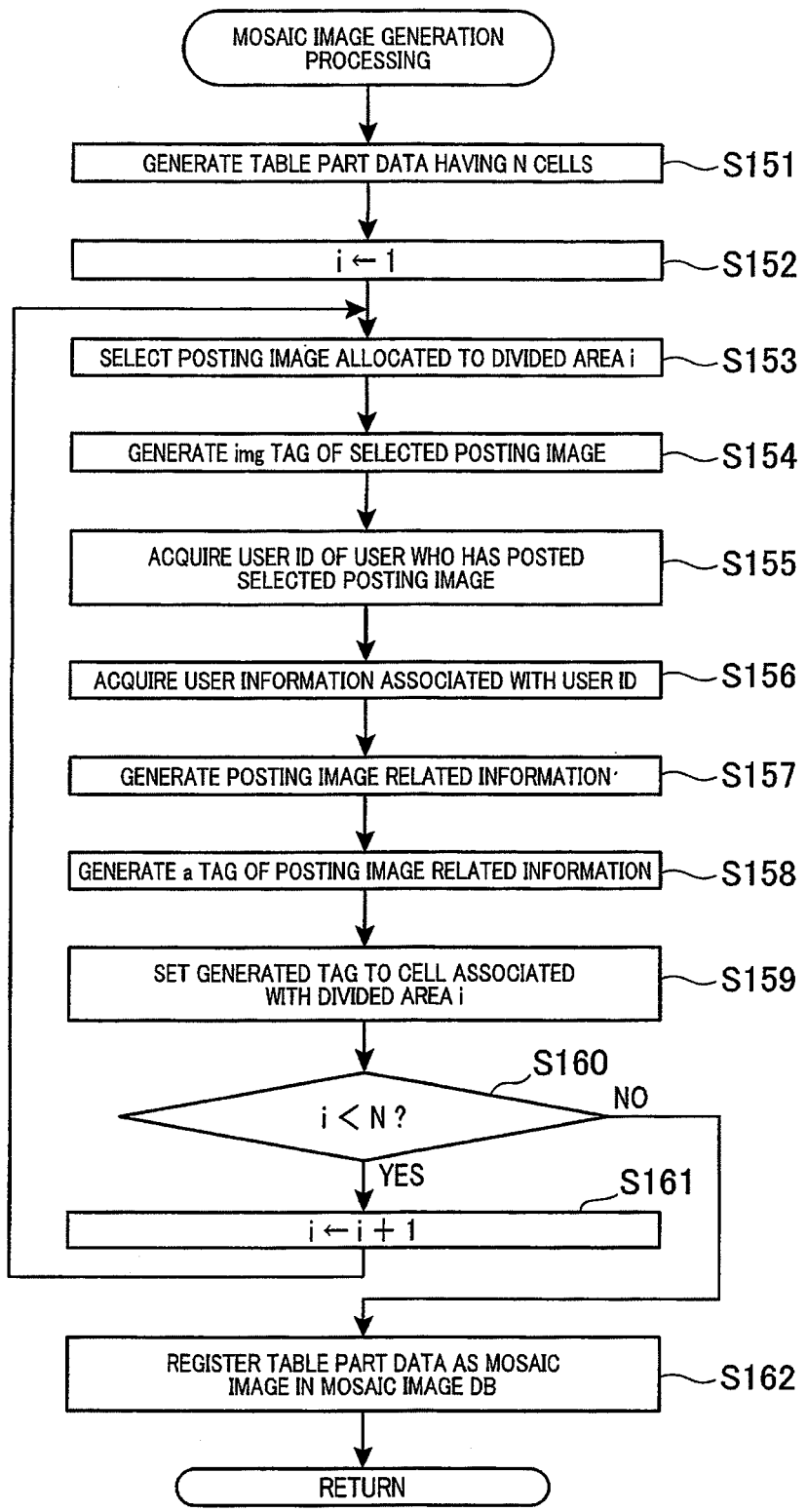
FIG. 16 is a view illustrating a processing example in mosaic image generation processing of the system control unit 15 of the information providing device 1 according to an embodiment.

FIG. 16 is a view illustrating a processing example in mosaic image generation processing of the system control unit 15 of the information providing device 1 according to the present embodiment. As illustrated in FIG. 16, the system control unit 15 generates data (hereinafter, "table part data") in which a table having N cells is described by HTML (step S151). Next, the system control unit 15 sets 1 to the divided area number (step S152).

Next, the system control unit 15 selects the posting image allocated to the divided area i (step S153). Next, the system control unit 15 generates an img tag for in-line displaying the selected posting image in the table in the web page (step S154).

Next, the system control unit 15 acquires the user ID of the user who has posted the selected posting image, from the posting image DB 141 (step S155). Next, the system control unit 15 acquires user information associated with the acquired user ID, from the user information DB (step S156). Next, the system control unit 15 generates HTML document (hereinafter, "posting image related information part data") for displaying posting image related information, based on the acquired user information (step S157). Next, the system control unit 15 generates an a tag including a URL of the posting image related information (step S158).

Next, the system control unit 15 sets the generated img tag and a tag to a cell corresponding to the divided area i among cells in the table part data generated in step S151 (step S159). Next, the system control unit 15 decides whether or not the divided area number i is less than N (step S160). In this case, when deciding that the divided area number i is less than N (step S160: YES), the system control unit 15 updates the divided area number i by adding 1 to the divided area number i (step S161). Next, the system control unit 15 proceeds to step S153.

By contrast with this, when deciding that the divided area number i is not less than N (step S160: NO), the system control unit 15 registers table part data to which a tag is set, in the mosaic image DB as a mosaic image (step S162). After finishing processing in step S162, the system control unit 15 finishes mosaic image generation processing.

Back to description of FIG. 12, when the given user terminal **2-*k* such as a user terminal 2-2 activates a web browser and transmits a HTTP request from the system control unit 27 to the information providing device 1 (step S1), the system control unit 15 generates a web page configuring a mosaic image (a web page which displays the mosaic image) according to this request (step S2) and distributes the web page to the user terminal 2-2 (step S3). More specifically, the system control unit 15 acquires table part data (the latest table part data) which is finally stored among table part data stored in the mosaic image DB 143, from the mosaic image DB 143. Next, the system control unit 15 generates HTML document including the table part data acquired as HTML document of the web page which displays the mosaic image. Further, the system control unit 15 transmits the generated HTML document to the user terminal 2-2**. In addition, the HTTP request transmitted in step S1 is referred to as a "mosaic image page request". A web page configuring a mosaic image (more specifically, HTML document of a web page configuring a mosaic image) is an example of display information according to the present invention.

In addition, as described above, the mosaic image displayed on the web page has an improved resolution of the mosaic image based on the material image when the quantity of posting images stored in the posting image DB 141 increases. Hence, the mosaic image displayed on the web page generated according to a HTTP request from the user terminal 2-2 has a different resolution according to the quantity of posting images stored in the posting image DB 141 when the HTTP request is transmitted. Hence, with this sequence, a posting image transmitted (step S10) from the user terminal 2-*k* such as the user terminal 2-1 is received without limiting the order in particular.

Back to description of FIG. 12, the system control unit 27 of the user terminal 2-1 displays the web page configuring the acquired mosaic image as the mosaic image in a window screen shown on the display of the display unit 22 (step S4).

Hereinafter, a mosaic image shown on the display of the display unit 22 will be described using FIG. 17.

Figure 17:
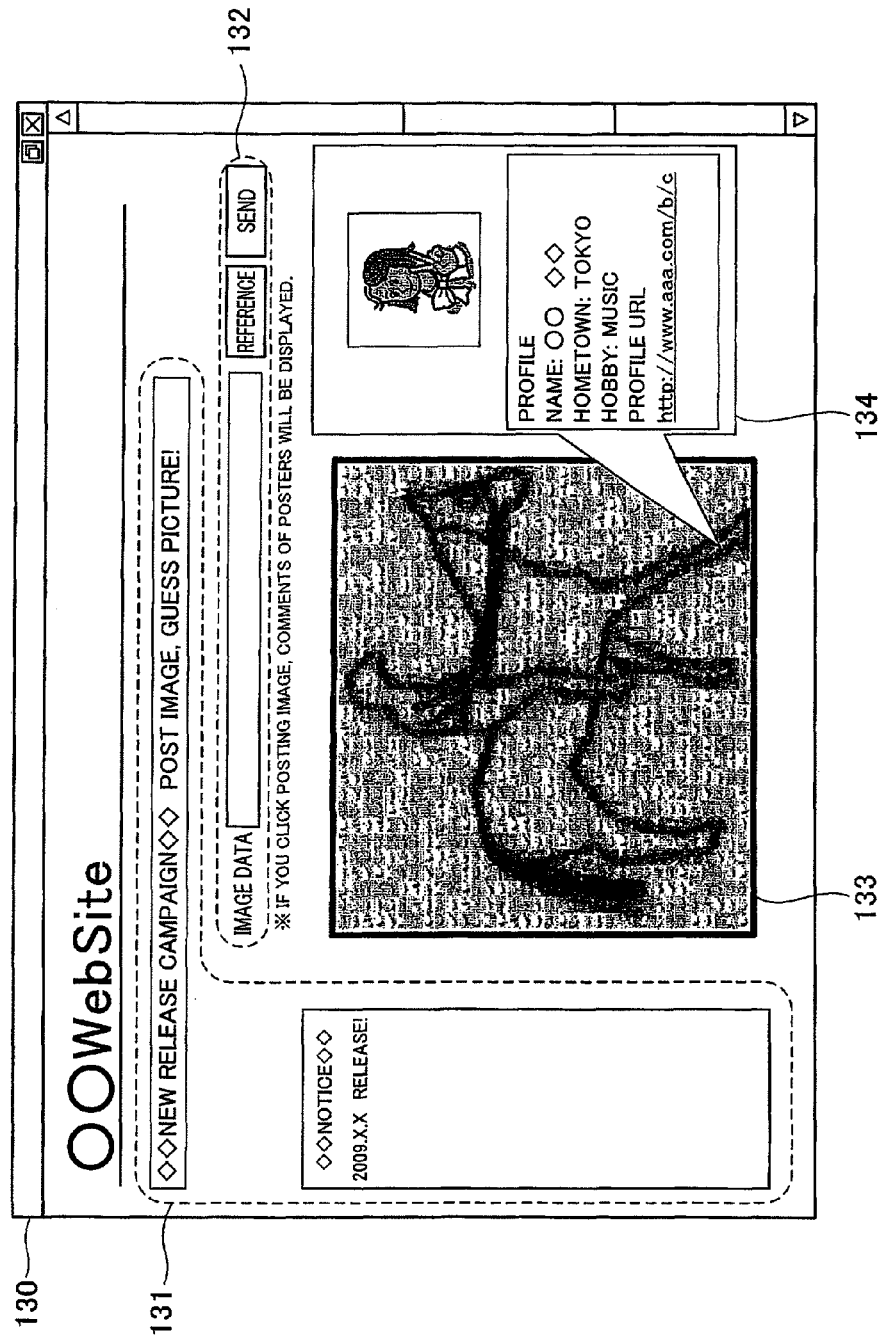
FIG. 17 is a view illustrating a mosaic image shown on a display of a display unit 22.

FIG. 17 is a view illustrating a mosaic image shown on the display of the display unit 22.

As illustrated in FIG. 17, a web page 130 configuring a mosaic image displays an information display portion 131 which displays the content information, a posting image transmitting portion 132 for transmitting a posting image to the information providing device 1, a mosaic image 133 and a posting image related information display portion 134 which displays the posting image and information related to the posting image (posting image related information).

In addition, the posting image transmitting portion 132 is an interface used to transmit a posting image from the user terminal 2-*k* to the information providing device 1, and is realized by, for example, a CGI program installed in the information providing device 1.

Further, the mosaic image 133 shows a mosaic image generated by the system control unit 15. This mosaic image 133 is generated by being embedded with the posting image as described above, and, in this posting image, a link for acquiring the posting image and information related to the posting image is set as described above.

An example of display indicating that such a link is set may include that an outer frame of the posting image is highlighted (for example, the outer frame is displayed with a thick line) in the mosaic image 133. In addition, the display indicating that a link is set is by no means limited to this, and, for example, the outer frame may be displayed with a flash or may be not be displayed at all.

Further, when the operation unit 21 of the user terminal 2-*k* performs an operation of selecting the posting image in the mosaic image 133 (for example, the posting image is clicked by the mouse of the operation unit 21), the system control unit 15 distributes to the user terminal 2-*k* a web page which displays the posting image and information associated with the posting image and related to the posting image.

In the posting image related information display portion 134, the posting image and information related to the posting image are displayed on a so-called pop-up window as an example of the web page which displays information related to the posting image.

More specifically, in the posting image related information display portion 134, for example, a name, a hometown, a hobby and a URL which is a hyperlink destination indicating a profile of a person shown by the posting image are displayed. In addition, when, for example, the web page 130 is displayed and the user does not perform an operation of selecting any posting image in the mosaic image 133, the posting image related information display portion 134 is not displayed.

Similarly, when another posting image in the mosaic image 133 is selected, the system control unit 15 distributes to the user terminal 2-*k* a web page which displays the posting image and information associated with the posting image and related to the posting image.

Back to description of FIG. 12, when the operation unit 21 of the user terminal 2-*k* performs an operation of selecting a predetermined posting image in the mosaic image 133 (this posting image is clicked) (step S5: YES), the system control unit 27 transmits a HTTP request to the information providing device 1 (step S6). This HTTP request requests distribution of a web page which displays the posting image and information associated with the posting image and related to the posting image, to a user terminal.

The system control unit 15 which receives this HTTP request acquires the web page which displays the posting image and information associated with the posting image and related to the posting image (step S7), and distributes the web page to the user terminal 2-*k* (step S8). More specifically, the system control unit 15 acquires posting image related information part data associated with a URL included in the HTTP request, from the memory unit 14. Next, the system control unit 15 generates HTML document including the latest table part data stored in the mosaic image DB 143 and the acquired posting image related information part data as HTML document of a web page configuring a mosaic image. Further, the system control unit 15 transmits the generated HTML document to the user terminal 2-*k*. In addition, when the number of posts is 0, a mosaic image, that is, table part data, is not generated. Hence, in this case, the system control unit 15 transmits HTML document of a web page which does not display a mosaic image. A web page which displays information related to a posting image (more specifically, posting image related information part data) is an example of profile information according to the present invention.

In addition, when acquiring a posting image from the user terminal 2-*k*, the system control unit 15 may acquire information of a profile of a user who has posted an image, from the user terminal 2-*k*. That is, the system control unit 15 receives an input of the profile of the user when the user posts an image. In this case, the system control unit 15 generates posting image related information part data based on information of the received profile.

Further, the system control unit 27 of the user terminal 2-*k* displays the web page which displays the posting image and information associated with the posting image and related to the posting image, in the window (the above posting image related information display portion 134) shown on the display of the display unit 22 (step S9). In addition, the system control unit 15 may transmit only posting image related information part data to the user terminal 2-*k*. In this case, the user terminal 2-*k* displays posting image related information in the currently displayed web page based on the received posting image related information part data.

In addition, although a configuration has been employed with the above embodiment where a web page which displays a mosaic image generated immediately before (when a HTTP request is transmitted from the system control unit 27 to the information providing device 1) is displayed as a display screen, a web page which displays the above mosaic image of a low resolution generated in the past based on the same material image as the mosaic image may be displayed as the display screen in the window to be compared.

In this case, in the material image DB 142, for example, a mosaic image generated in the past is associated with a material image and stored. Further, when the user terminal 2-*k* activates the web browser and transmits a HTTP request from the system control unit 27 to the information providing device 1, the system control unit 15 distributes to the user terminal 2-*k* according to the request a mosaic image which is generated according to the quantity of posting images stored in the posting image DB 141 when the HTTP request is transmitted, and a web page which displays a mosaic image generated in the past.

Furthermore, the system control unit 37 of the user terminal **2-*k* displays the acquired web page in the window screen shown on the display of the display unit 22**.

Hereinafter, a screen example displayed in a window screen which shows on the display of the display unit 22 a web page which displays mosaic images generated immediately before and mosaic images of a low resolution generated in the past based on the same material image as the mosaic images will be described using FIG. 18.

FIG. 18 is a view illustrating a screen example displayed in a window screen which shows on the display of the display unit 22 a web page which displays mosaic images generated immediately before and mosaic images of a low resolution generated in the past based on the same material image as the mosaic images.

As illustrated in FIG. 18, in a mosaic image display portion 142 of a web page 141 configuring a mosaic image, a mosaic image 143 generated immediately before and mosaic images 144 to 147 of the low resolution generated in the past based on the same material image as the mosaic image 143 generated immediately before are displayed. Further, the mosaic images 143 to 147 are rotatably displayed by switch buttons 148 and 149. Meanwhile, rotation means that the mosaic images 143 to 147 move on a web page along a virtual circular orbit set on the web page. When, for example, the user performs an operation of selecting the switch button 148, the mosaic images 143 to 147 move on the virtual circular orbit clockwise. By contrast with this, when the user performs an operation of selecting the switch button 149, the mosaic images 143 to 147 move on the virtual circular orbit counterclockwise.

The user who browses this web page can visually learn the material image imitated by the mosaic image stepwise comparing mosaic images.

As described above, according to the present embodiment, the system control unit 15 of the information providing device 1 generates a mosaic image by acquiring a posting image from the user terminal **2-*k* through the network, storing the acquired posting image in the posting image DB 141**, and allocating the acquired posting image to one divided area based on color information of the acquired posting image and color information of each divided area of a material image which is used as a source image, and generates a new mosaic image by, after generating the mosaic image, changing the number of divided areas in response to an increase in the number of posts.

Hence, the resolution of the newly generated mosaic image changes from the previously generated mosaic image. Consequently, it is possible to encourage user's motivation of continuously browsing the mosaic image.

Further, the system control unit 15 generates a mosaic image by allocating acquired posting images to divided areas of a material image divided into a number corresponding to the number of posting images stored in the posting image DB 141, and generates a mosaic image by increasing the number of divided areas of the material image in proportion to an increase in the number of posting images stored in the posting image DB 141.

Consequently, the resolution of a mosaic image to be generated improves in proportion to an increase in the number of posts. Consequently, a mosaic image which more faithfully imitates the material image is generated in proportion to an increase in the number of posts, so that it is possible to encourage user's motivation of continuously browsing the mosaic image.

Further, it is possible to display in real time how a mosaic image to be displayed dynamically changes in response to an increase in the number of posting images, and encourage not only the same user but also other users to continuously post images.

Furthermore, the system control unit 15 generates a mosaic image by allocating posting images to divided areas of a material image divided into the same number of divided areas as the number of posts.

Consequently, it is possible to generate a complete mosaic image without defect portions while improving the resolution in proportion to an increase in the number of posts.

Further, the system control unit 15 decides whether or not there is a divided area which is suitable to allocate an acquired posting image, based on color information of the acquired posting image and color information of each divided area, and the posting image DB 141 does not use the posting image for which it is decided that there is no divided area which is suitable to allocate to generate a mosaic image and does not include in the number of posts the number of posting images for which it is decided that there is no divided area which is suitable to allocate.

Consequently, even when the posting image acquired by the user terminal **2-*k*** is not suitable for any divided area, this image is not used to generate a mosaic image. Consequently, a mosaic image which more faithfully imitates the material image is generated, so that it is possible to encourage user's motivation of continuously browsing the mosaic image.

Further, when acquiring a posting image and a user ID of a user who posts the posting image from the user terminal **2-*k*, and allocating the posting image acquired from the user terminal 2-*k* to a point assigning area, the system control unit 15** updates the number of holding points by adding the number of assigning target points to the number of holding points stored in the user information DB.

Consequently, when a posting image is allocated to the point assigning area, points are assigned to a user who has posted this image. Consequently, it is possible to encourage user's motivation of posting images. Consequently, the resolution of a mosaic image and a material image imitated by the mosaic image are expected to change quickly, so that it is possible to encourage user's motivation of continuously browsing the mosaic image.

Further, the system control unit 15 acquires a posting image posted by a user, from the user terminal **2-*k*, transmits HTML document for displaying a generated mosaic image to the user terminal 2-*k*, receives a HTTP request transmitted from the user terminal 2-*k* when the user selects a posting image included in the mosaic image displayed on the user terminal 2-*k* based on the HTML document, and transmitting posting image related information part data including a profile of the user associated with a URL of the received HTTP request, to the user terminal 2-*k*** which is the transmission source of the HTTP request.

Consequently, the user who browses the mosaic image can acquire a profile of a user who has posted the posting image included in the displayed mosaic image. Consequently, it is possible to encourage user's motivation of browsing the mosaic image.

Further, the system control unit 15 acquires a plurality of posting images from a plurality of user terminals **2-*k* connected through the network, stores a plurality of acquired posting images in the posting image DB 141, divides a material image stored in the material image DB 142, into a plurality of divided areas a size of which is set according to the quantity of posting images stored in the posting image DB 141, applies RGB conversion to each posting image stored in the posting image DB 141 and to the interior of each divided area of the material image, compares a RGB conversion result of each posting image and a RGB conversion result in each divided area of the material image, when deciding that the RGB conversion result of the divided areas and the RGB conversion result of the posting images approximate, allocates posting images indicated by the RGB conversion result of the posting images, to the divided areas indicated by the RGB conversion result of the divided areas, generates a mosaic image based on the material image, generates a web page which displays the mosaic image, and distributes the generated web page to, for example, the user terminal 2-***k* which made an access request, so that the resolution of the mosaic image based on the material image improves in proportion to an increase in the quantity of posting images to acquire, and the material image imitated by the mosaic image is visually learned stepwise.

Consequently, it is possible to encourage user's motivation of repeatedly and continuously browsing a mosaic image, and provide an effect of attracting guests. By this means, it is possible to secure a lot of unique users and repeaters. Further, it is possible to expect a sufficient effect of attracting guests at, for example, events.

With a conventional technique, although a mosaic image attracts user's attention at a first glance for its uniqueness when the mosaic image is used for an event or advertisement of a product, the mosaic image represents an existing material image and does not have remarkable uniqueness, and therefore it is difficult to acquire lots of unique users and repeaters and expect a sufficient effect of attracting guests and cost-benefit performance. Further, even when a mosaic image having high visibility for a poster, a web page and the like is used, it is difficult to encourage user's motivation of continuously browsing a mosaic image and it is not possible to expect a high effect of attracting guests.

Furthermore, the system control unit 15 divides a material image stored in the material image DB 142 such that the number of material images is the same as the number set in advance for the number of images-to-be-stored and the size of each divided area is equal, associates and stores the material image and the quantity in advance in the mosaic image DB 143, when the quantity of posting images stored in the posting image DB 141 approximates to the number set in advance as the number of number images-to-be-stored, extracts the material image stored in advance in the posting image DB 141 in association with the number set in advance as the number of images-to-be-stored, allocates the stored posting image to an associated divided area of the extracted material image, and generates the mosaic image based on the material image, so that it is not necessary to divide the material stored in the material image DB 142 into a plurality of divided areas a size of which is set according to the quantity of posting images stored in the posting image DB 141 to generate the mosaic image, and it is possible to improve a processing speed of an entire device.

Further, the system control unit 15 may allocate the posting images to the divided areas according to a predetermined priority set in advance, and generate the mosaic image based on the material image.

With this configuration, the user who browses this web page can browse the mosaic image which is completed from specific portions set according to the priority while visually enjoying the mosaic image.

In addition, instead of generating a mosaic image when the number of posts is 1, the system control unit 15 may generate a mosaic image after, for example, the number of posts becomes the number set in advance or more. That is, the minimum number of divisions may be higher than 1.

Further, when the quantity of posting-images-to-be-stored, that is, the number of divisions of a material image, is set in advance, the number of posts does not satisfy the number of divisions set in advance in some cases (when, for example, the number of divisions is 99, the number of posts is 98 or less). In this case, when, for example, receiving the first posting image from the user terminal 2-*k*, the system control unit 15 selects the number of divisions having a minimum value among the numbers of divisions set in advance. Further, the system control unit 15 generates table part data having a number of cells indicated by the selected number of divisions. Furthermore, the system control unit 15 allocates the received posting image to one divided area, and sets, for example, an img tag for displaying the posting image to cells corresponding to the divided areas to which the posting images are allocated. Still further, the system control unit 15 generates HTML document of a web page configuring a mosaic image using the table part data to which a tag is set. Similarly, the system control unit 15 updates the HTML document every time a posting image is received. Further, the system control unit 15 transmits HTML document at the current point of time when receiving a request of the web page configuring the mosaic image from the user terminal 2-*k*.

FIG. 19 is a view illustrating a mosaic image shown on the display of the display unit 22. The mosaic image 133 in the web page illustrated in FIG. 19 is a mosaic image when the number of divisions of a material image is 20. Further, nine posting images have been posted so far. As illustrated in FIG. 19, posting images are embedded in 9 cells of 20 cells in the mosaic image 133. Cells in which posting images are not embedded are blank. Further, point information 135 is displayed in a cell corresponding to a point assigning area among cells in which posting images are not embedded. The point information 135 indicates the number of points to be assigned. When a posting image is embedded in the cell which displays the point information 135, points are assigned to a user who has posted the posting image. The user can select as a posting image an image which fits to a cell which displays the point information 135 while predicting a material image (design) imitated by a mosaic image from the mosaic image 133. In addition, the system control unit 15 sets a text indicating the number of assigning points to a cell corresponding to the point assigning area in, for example, mosaic image generation processing to display the point information 135.

The system control unit 15 selects the number of divisions having the second smallest value compared to the current number of divisions when the number of posts exceeds the current number of divisions. Next, the system control unit 15 generates table part data having a number of cells indicated by the selected number of divisions. Next, the system control unit 15 allocates each posting image already stored in the posting image DB 141, to each the divided area. Further, the system control unit 15 allocates the received posting image to one divided area to which a posting image is not yet allocated every time a posting image is received.

Furthermore, in this case, the system control unit 15 may allocate a posting image preferentially to divided areas from which an outline is extracted. Consequently, the user can learn the material image imitated by the mosaic image at a comparatively early stage.

Although the number of posts and the number of divisions of a material image are the same with the above embodiment, the number of posts and the number of divisions may not be the same. The number of divisions of a material image may increase in proportion to an increase in the number of posts.

Further, when the number of divisions of a material image is set in advance and the number of divisions is changed, the system control unit 15 may not reallocate posting images (posting images already stored in the posting image DB 141) allocated to divided areas formed by dividing a material image by the number of divisions before the change, to divided areas formed by dividing a material image by the number of divisions after the change. For example, the numbers of divisions includes 99 and 986. In this case, 100th to 1085th posting images are allocated to 986 divided areas formed by dividing a material image by 986.

Further, in this case, the system control unit 15 may generate a web page such that, after the number of divisions is changed, a mosaic image matching the number of divisions before the change and a mosaic image matching the number of divisions after the change are overlaid and displayed as the mosaic image 133 displayed on the web page. In this case, the mosaic image matching the number of divisions before the change is a background, and the mosaic image matching the number of divisions after the change is a foreground. That is, in portions at which posting images are yet not embedded in the mosaic image matching the number of divisions after the change, the mosaic image matching the number of divisions after the change is displayed. Further, the mosaic image matching the number of divisions after the change comes closer to completion in proportion to an increase in the number of posts, so that the mosaic image matching the number of divisions before the change gradually hides. In addition, the mosaic image matching the number of divisions after the change may have reduced color (become semi-transparent) and be displayed.

Second Embodiment

With a first aspect of the present embodiment, a mosaic image displayed on a web page is generated by allocating posting images to divided areas of the material image extracted according to the quantity of a plurality of items of image data (hereinafter, simply "posting images") acquired from a terminal device 2-*k* and stored or representative color information of a color shown in the posting image, from the material image divided into predetermined divided areas according to a type of the material image and stored. Further, with a second aspect of the present embodiment, a mosaic image displayed on a web page is generated by allocating an image to one divided area of one material image from a plurality of material images according to representative color information of a posting image. Furthermore, a corresponding mosaic image is displayed on a web page in order of material images for which posting images are allocated to all divided areas (based on which a mosaic image is completed) among a plurality of material images.

In addition, a configuration of a system, a configuration of an information providing device 1 and a configuration of a user terminal 2-*k* according to the present embodiment are basically the same as in the first embodiment.

FIG. 20A to FIG. 20C illustrate tables illustrating information stored in a posting image DB 141, a material image DB 142 and a mosaic image DB 143 constructed in a memory unit 14. Content of information stored in the mosaic image DB 143 may be the same as in the first embodiment.

In the posting image DB 141, the acquired posting images are stored (FIG. 20A).

Further, in the posting image DB 141, the stored posting images and information described below and related to the posting images (for example, a profile of a person who is shown in a posting image such as a name, a hometown and a hobby, and a URL related to the profile) may be associated and stored.

Furthermore, in the posting image DB 141, the stored posting images and color information of the stored posting images may be associated and stored.

Still further, in the posting image DB 141, the stored posting images and representative color information of the stored posting images may be associated and stored.

Meanwhile, representative color information of a posting image is directed to defining an impression of a color given by one posting image as a whole by a specific color.

More specifically, representative color information of a posting image is directed to, when, for example, a difference between a given specific color component (for example, one of R, G and B) and other color components in pixel data configuring the RGB-converted posting image is a threshold set in advance or more, defining an impression of a color given by the posting image as a whole as the specific color component. Hence, the representative color information of the posting image is a color indicated by the given specific color component.

More specifically, a case will be described as an example where only a red apple picture is enlarged and displayed as a posting image. When all items of pixel data configuring this posting image is RGB-converted, the RGB-converted pixel data has a R value much higher than G and B values. In this case, when the difference between the R value, and the G and B values is a threshold set in advance or more, the representative color information of the posting image is defined as R. In addition, representative color information is an example of color information according to the present invention. In addition, the system control unit 15 may use information indicating a color obtained by averaging colors of pixels in a posting image as representative color information. Further, the system control unit 15 may use information indicating a color which is the most frequently used in a posting image as representative color information.

FIG. 21A illustrates a specific example of information stored in the posting image DB 141. As illustrated in FIG. 21A, in the posting image DB 141, a posting image number, a posting image, a user ID, color information and representative color information are associated per posting image and stored.

In the material image DB 142, a plurality of material images of different types are stored (FIG. 20B). Meanwhile, different types of material images mean that, for example, images which are content of the material images are different. That is, a plurality of material images of different types mean, for example, a plurality of material images of different images. Further, different types of material images may mean that, for example, types of a pattern, a figure and an object expressed in material images are different.

Furthermore, the material images may be stored in the material image DB 142 in advance or read from the material images stored in an information recording medium such as a USB memory through an interface unit which is not illustrated. Still further, the material images transmitted from the user terminal 2-*k* may be acquired through a communication unit 11 and stored.

Moreover, although described below, in the material image DB 142, the number set in advance as the number of imagesto-be-stored (hereinafter, simply "the quantity of posting-images-to-be-stored"), and the material image divided into predetermined divided areas according to the type of the material image are associated and stored (FIG. 20B). Meanwhile, the quantity of posting-images-to-be-stored refers to the number of divisions.

In addition, although described below, in the material image DB 142, representative color information of the material image is associated with the quantity of posting-images-to-be-stored and the material image divided into predetermined divided areas according to the type of the material image, and stored (FIG. 20B).

The representative color information of a material image may be directed to, when, for example, a difference between a given specific color component and other color components in pixel data configuring the RGB-converted posting image is a threshold set in advance or more, defining an impression of a color given by the posting image as a whole as the specific color component. Further, a user of the information providing device 1 may define random representative color information.

FIG. 21B illustrates a specific example of information stored in the material image DB 142. As illustrated in FIG. 21B, in the material image DB 142, a material image ID, a material image, the number of divisions, representative color information of the material image, outline information, color information of each divided area and representative color information of each divided area are associated per material image and stored.

The number of divisions refers to the number of divided areas matching the associated material image. The number of divisions is set in advance by, for example, an administrator. The representative color information of a material image indicates a representative color of the entire associated material image. The outline information indicates divided areas from which an outline is extracted among divided areas of the associated material image. For the outline information, a divided area number of, for example, each divided area from which an outline is extracted is set. The numbers of pieces of color information of divided areas and representative color information of the divided areas indicated by the number of divisions are stored. The representative color information of the divided areas indicates a representative color of the divided areas. Further, in the material image DB 142, a point assigning area information may be stored. The point assigning area information indicates a divided area which is set as a point assigning area among divided areas of the associated material image. In addition, for example, a point assigning area may be selected by an administrator in advance, or may be selected by the system control unit 15.

Hereinafter, an operation of a system control unit 15 according to the present embodiment will be described with reference to FIGS. 22 to 25.

The system control unit 15 according to the present embodiment first divides a plurality of material images of different types stored in the material image DB 142 into a plurality of divided areas a size of which is set according to the type of the material image.

In addition, the divided areas according to the present embodiment are provided such that the material image is divided by the quantity matching the type of the material image and the size of each divided area is equal. Hence, the size of these divided areas decreases in proportion to an increase in the quantity matching the type of the material image. Further, the quantity of the divided areas increases in proportion to an increase of the quantity matching the type of the material image. For example, this quantity is indicated by the number of divisions stored in the material image DB 142.

Hereinafter, a relationship between the size and the quantity of the divided areas of the material image will be described using FIGS. 22 and 23.

Figure 22:
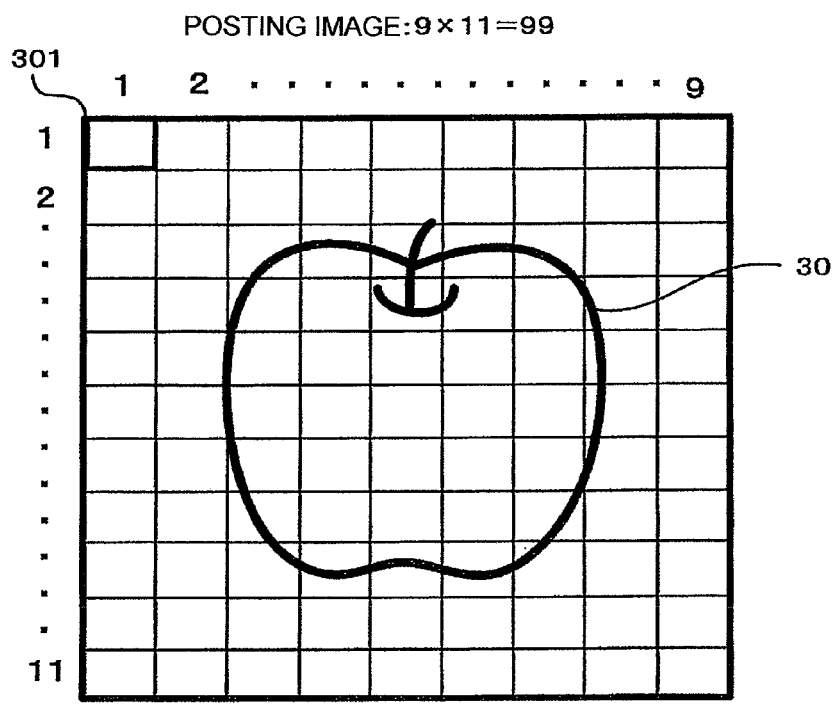
FIG. 22 is a schematic diagram illustrating a mode where the material image is divided into 99 divided areas when a type of the material image is "apple".

FIG. 22 is a schematic diagram illustrating a mode where the material image is divided into 99 divided areas when a type of the material image is "apple".

As illustrated in FIG. 22, an apple image 30 which is a material image is divided into 99 divided areas 301.

Figure 23:
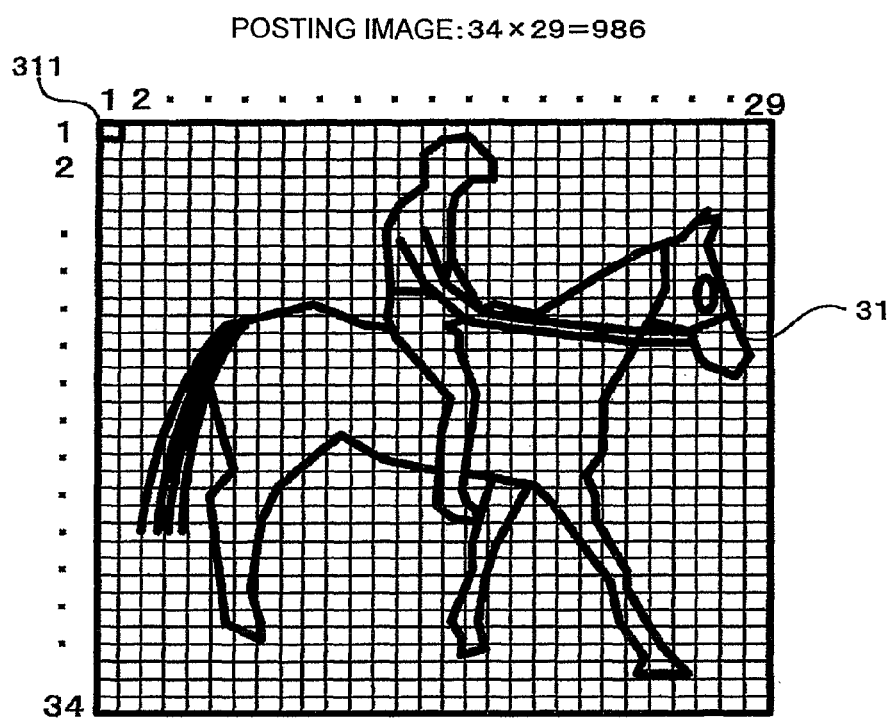
FIG. 23 is a schematic diagram illustrating a mode where the material image is divided into 986 divided areas when the type of the material image is "horse".

Further, FIG. 23 is a schematic diagram illustrating a mode where the material image is divided into 986 divided areas when the type of the material image is "horse".

As illustrated in FIG. 23, a horse image 31 which is a material image is divided into 986 divided areas 311.

In addition, processing of this system control unit 15 is performed to assume in advance the quantity of posting-images-to-be-stored and prepare in advance the divided areas in which the posting images are embedded.

Hence, the system control unit 15 prepares 99 divided areas in which posting images need to be embedded when the type of the material image is "apple", and 986 divided areas in which the posting images need to be embedded when the type of the material image is "horse".

Further, the system control unit 15 associates and stores the quantity of posting-images-to-be-stored (the number of divisions) and the divided material images of different types (see FIGS. 22 and 23) in the material image DB 142 (FIG. 20B).

More specifically, the system control unit 15 associates and stores 99 which is the quantity of posting-images-to-be-stored and "apple" which is the type of the material image when the type of the material image is "apple". Further, the system control unit 15 associates and stores 986 which is the quantity of posting-images-to-be-stored and "horse" which is the type of the material image when the type of the material image is "horse".

In addition, the system control unit 15 may associate and store the representative color information of a color shown in each material image, and the divided material images of different types with the quantity of posting-images-to-be-stored which is associated and stored in the material image DB 142.

More specifically, when the type of the material image is "apple", if this material image is RGB-converted, the RGB-converted pixel data has a R value much higher than G and B values. In this case, when the difference between the R value, and the G and B values is a threshold set in advance or more, the representative color information of the material image is defined as R. In this case, "red" is defined and stored as representative color information of "apple" which is the material image.

Similarly, when the type of the material image is "horse", "black" is defined and stored as a result of the RGB conversion.

Further, a user of the information providing device 1 may define random representative color information.

In addition, there may be a plurality of material images having the same quantity of posting-images-to-be-stored, that is, the same number of divisions, among material images stored in the material image DB 142. Further, there may be a plurality of material images having the same content of representative color information.

Furthermore, the system control unit 15 may calculate representative color information of each divided area of a material image, and associate and store the material image and representative color information of each divided area in the material image DB 142.

Still further, an information providing device other than the information providing device 1 may, for example, divide each material image, calculate representative color information of each material image and calculate representative color information of each divided area of each material image in advance. Moreover, in the material image DB 142 of the information providing device 1, representative color information of a material image and representative color information of divided areas calculated by another information providing device may be stored.

Next, with the first aspect of the present embodiment, the system control unit 15 extracts a material image (hereinafter, simply "stored material image") stored in the material image DB 142 according to the quantity of posting images (hereinafter, simply "stored posting images") stored in the posting image DB 141.

More specifically, the system control unit 15 compares the quantity of stored posting images and the quantity of posting-images-to-be-stored which is associated with the material image and stored.

Further, when the quantity of stored posting images and the quantity of posting-images-to-be-stored which is associated with the material image and stored approximate, the system control unit 15 extracts the material image associated with the quantity of posting-images-to-be-stored.

An example will be described using the stored material image (FIGS. 20 to 23) where, when deciding that the quantity of stored posting images approximates to 99 which is the quantity of posting-images-to-be-stored which is associated with the material image and stored, the system control unit 15 extracts "apple" as a material image. Further, when deciding that the quantity of stored posting images approximates to 986 which is the quantity of posting-images-to-be-stored which is associated with the material image and stored, the system control unit 15 extracts "horse" as a material image.

Various decision criteria can be adopted to decide whether or not the quantity of stored posting images stored and the quantity of posting-images-to-be-stored approximate. When, for example, the difference between the quantity of stored posting images and the quantity of posting-images-to-be-stored is within a predetermined threshold set in advance, it may be decided that the quantity of stored posting images and the quantity of posting-images-to-be-stored approximate.

Further, the system control unit 15 may extract a stored material image according to the quantity of posting images showing specific representative color information among the stored posting images, and the quantity and representative color information of specific posting-images-to-be-stored which is associated with the material image and stored.

More specifically, the system control unit 15 first calculates the quantity of posting images per representative color information from the stored posting image and representative color information of the posting images.

Further, when the quantity of posting images calculated per representative color information approximates to the quantity of posting-images-to-be-stored which is associated with a material image and stored, and representative color information shown by the posting image and representative color information shown by the material image match, the system control unit 15 extracts the stored material image associated with the representative color information and the quantity of posting-images-to-be-stored.

An example will be described using the stored material image (FIGS. 20 to 23) where, when the quantity of posting images shown by specific representative color information among the stored posting images approximates to 99 which is the quantity of posting-images-to-be-stored which is associated with the material image and stored, and specific representative color information shown by the posting image indicates "red" which is representative color information shown by the material image, the system control unit 15 extracts "apple" as a material image.

Further, when the quantity of posting images shown by specific representative color information among the stored posting images approximates to 986 which is the quantity of posting-images-to-be-stored which is associated with the material image and stored, and specific representative color information shown by the posting image indicates "black" which is representative color information shown by the material image, the system control unit 15 extracts "horse" as a material image.

The system control unit 15 next calculates color information of each posting image stored in the posting image DB 141, and each divided area of the extracted material image. Further, the system control unit 15 generates a mosaic image by allocating a posting image to one divided area based on color information of the posting image and color information of divided areas of a material image. In addition, these processings are the same as in the first embodiment.

Hereinafter, mosaic image generation results will be described upon comparison of FIGS. 24 and 25.

Figure 24:
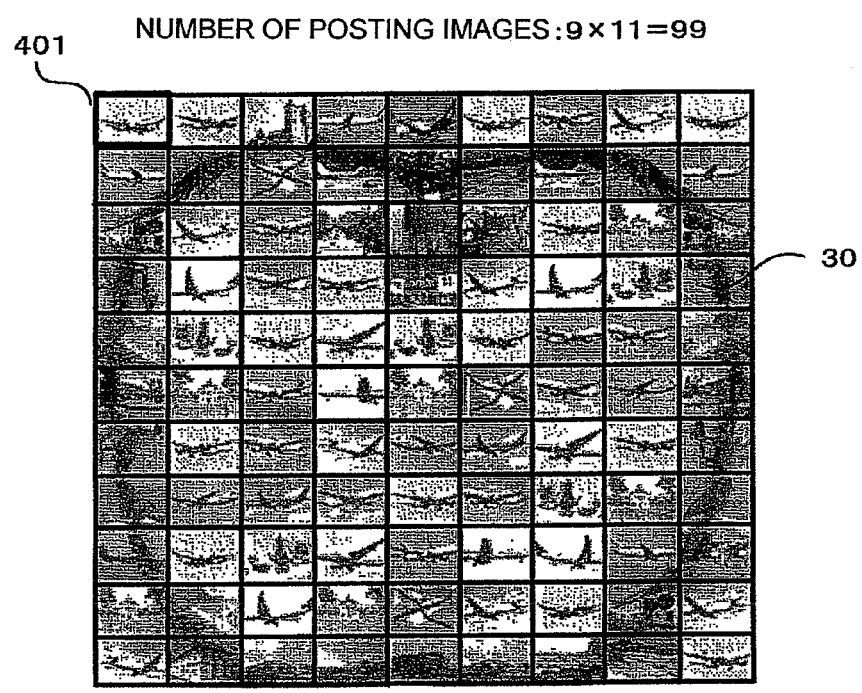
FIG. 24 is a view illustrating a mosaic image generated by the system control unit 15 when the quantity of posting images stored in the posting image DB 141 is 99.

FIG. 24 is a view illustrating a mosaic image generated by the system control unit 15 when the quantity of posting images stored in the posting image DB 141 is 99.

As illustrated in FIG. 24, the posting images which are decided to approximate to each of the divided areas are allocated to 99 divided areas, and a mosaic image 401 based on the apple image 30 which is the material image is displayed.

Figure 25:
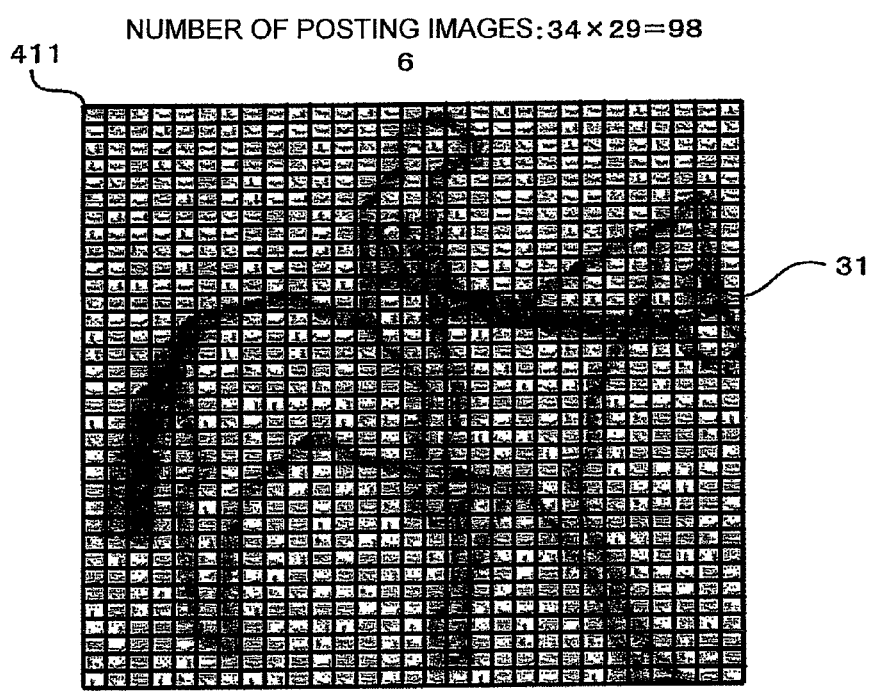
FIG. 25 is a view illustrating a mosaic image generated by the system control unit 15 when the quantity of posting images stored in the posting image DB 141 is 986.

FIG. 25 is a view illustrating a mosaic image generated by the system control unit 15 when the quantity of posting images stored in the posting image DB 141 is 986.

As illustrated in FIG. 25, the posting images which are decided to approximate to each of the divided areas are allocated to 986 divided areas, and a mosaic image 411 based on the horse image 31 is displayed.

With the mosaic image generated in this way, the type of the mosaic image based on the material image changes according to the quantity of posting images stored in the posting image DB 141, and a material image imitated by various mosaic images is visually learned, so that it is possible to encourage user's motivation of repeatedly and continuously browsing a mosaic image and provide an effect of attracting guests.

With the second aspect of the present embodiment, the system control unit 15 allocates a posting image to one divided area of one or a plurality of material images based on representative color information of posting images and representative color information of each divided area of a plurality of material images. Further, the system control unit 15 generates a mosaic image using as a source image the material image in which posting images are allocated to all divided areas. Further, the system control unit 15 displays the generated mosaic image on a web page in the generation order.

More specifically, the system control unit 15 compares representative color information of posting images and representative color information of each divided area of the material image, and decides divided areas of representative color information which approximates to representative color information the posting images. Further, the system control unit 15 allocates the posting images to the divided areas of representative color information which approximates to the representative color information of the posting images. The system control unit 15 performs such allocation for each material image. Hence, while one posting image is not allocated to one of material images in some cases, one posting image is allocated to a plurality of material images in some cases. The system control unit 15 can more easily allocate posting images to divided areas by using representative color information than by using color information. Further, the system control unit 15 may allocate the posting images to divided areas using color information instead of representative color information.

The system control unit 15 allocates posting images to divided areas every time a posting image is received from the user terminal 2-*k*. By this means, when posting images are allocated to all divided areas for one of a plurality of material images, a mosaic image is generated using the material image as a source image. That is, the system control unit 15 generates a mosaic image using a posting image allocated to each divided area of the material image in which posting images are allocated to all divided areas. Further, the system control unit 15 displays the generated mosaic image on the web page transmitted to the user terminal 2-*k*.

The system control unit 15 subsequently allocates posting images to divided areas every time a posting image is received from the user terminal 2-*k*. By this means, when posting images are allocated to all divided areas for another material image, the system control unit 15 generates a mosaic image using the material image as a source image. Further, the system control unit 15 displays a newly generated mosaic image on the web page transmitted to the user terminal 2-*k*.

Next, an operation of an information providing system matching a request of the user terminal 2-*k* according to the first aspect of the present embodiment will be described using FIG. 26.

Figure 26:
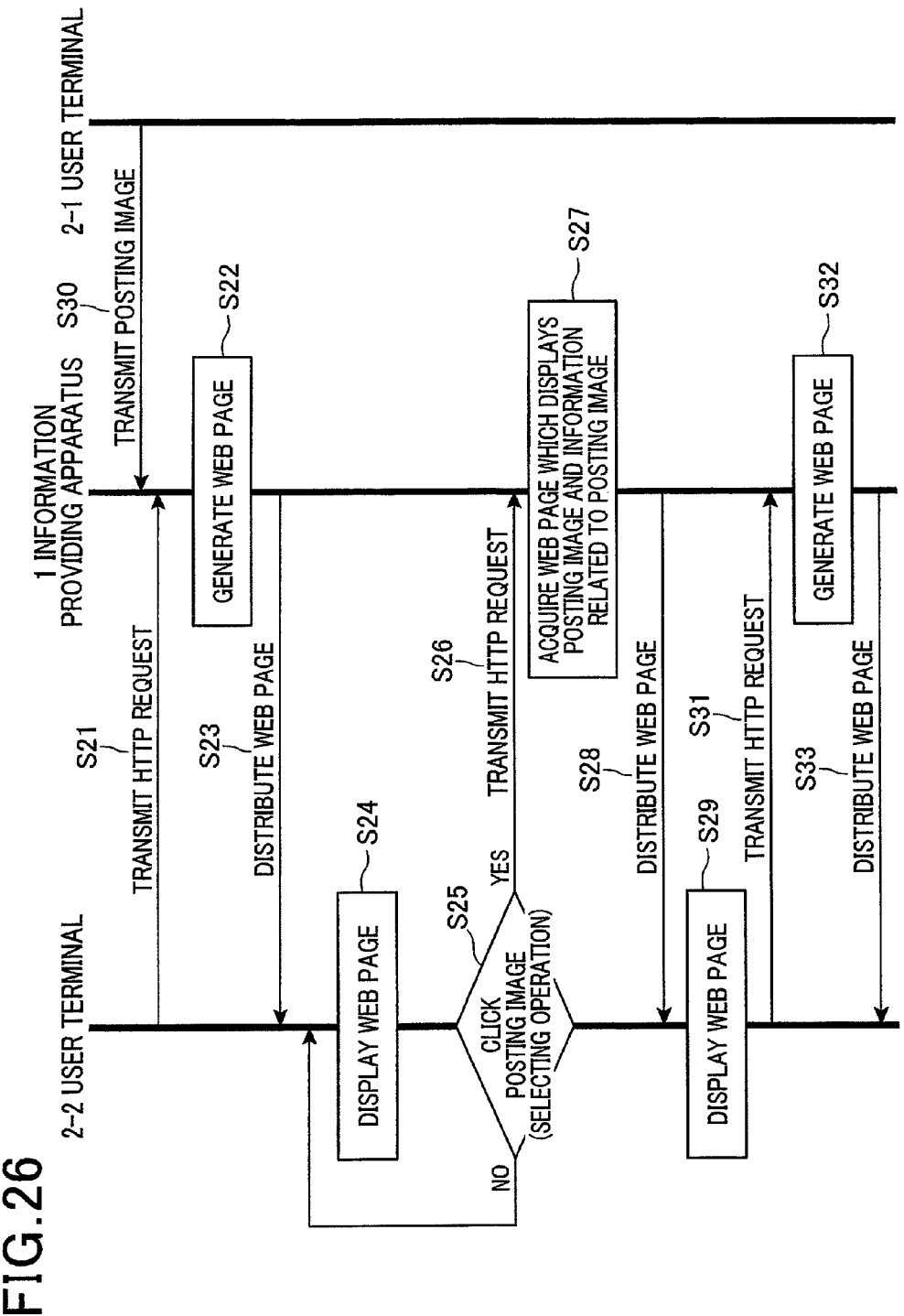
FIG. 26 is a sequence diagram illustrating an operation of the information providing device 1 matching a request of the user terminal 2-$k$ according to an embodiment.

FIG. 26 is a sequence diagram illustrating an operation of the information providing device 1 matching a request of the user terminal 2-*k* according to the present embodiment.

As illustrated in FIG. 26, when the given user terminal 2-*k* such as a user terminal 2-2 activates a web browser and transmits a HTTP request from a system control unit 27 to the information providing server 1 (mosaic image page request) (step S21), and the system control unit 15 generates a web page configuring a mosaic image according to the request (step S22), and distributes the web page to the user terminal 2-*k* (step S23).

In addition, with the first aspect of the present embodiment, the mosaic image displayed on the web page changes the type of the mosaic image based on a material according to the quantity of posting images stored in the posting image DB 141 (or representative color information of the posting images). Hence, the type of the mosaic image displayed on the web page generated according to a HTTP request from the user terminal 2-2 becomes different according to the quantity of posting images stored in the posting image DB 141 when the HTTP request is transmitted. Hence, with this sequence, a posting image transmitted (step S30) from the user terminal 2-*k* such as a user terminal 2-1 is received without limiting the order in particular.

Back to description of FIG. 26, the system control unit 27 of the user terminal 2-*k* displays the web page configuring the acquired mosaic image as the mosaic image in a window screen shown on a display of a display unit 22 (step S24).

Hereinafter, a mosaic image shown on the display of the display unit 22 will be described using FIG. 27.

Figure 27:
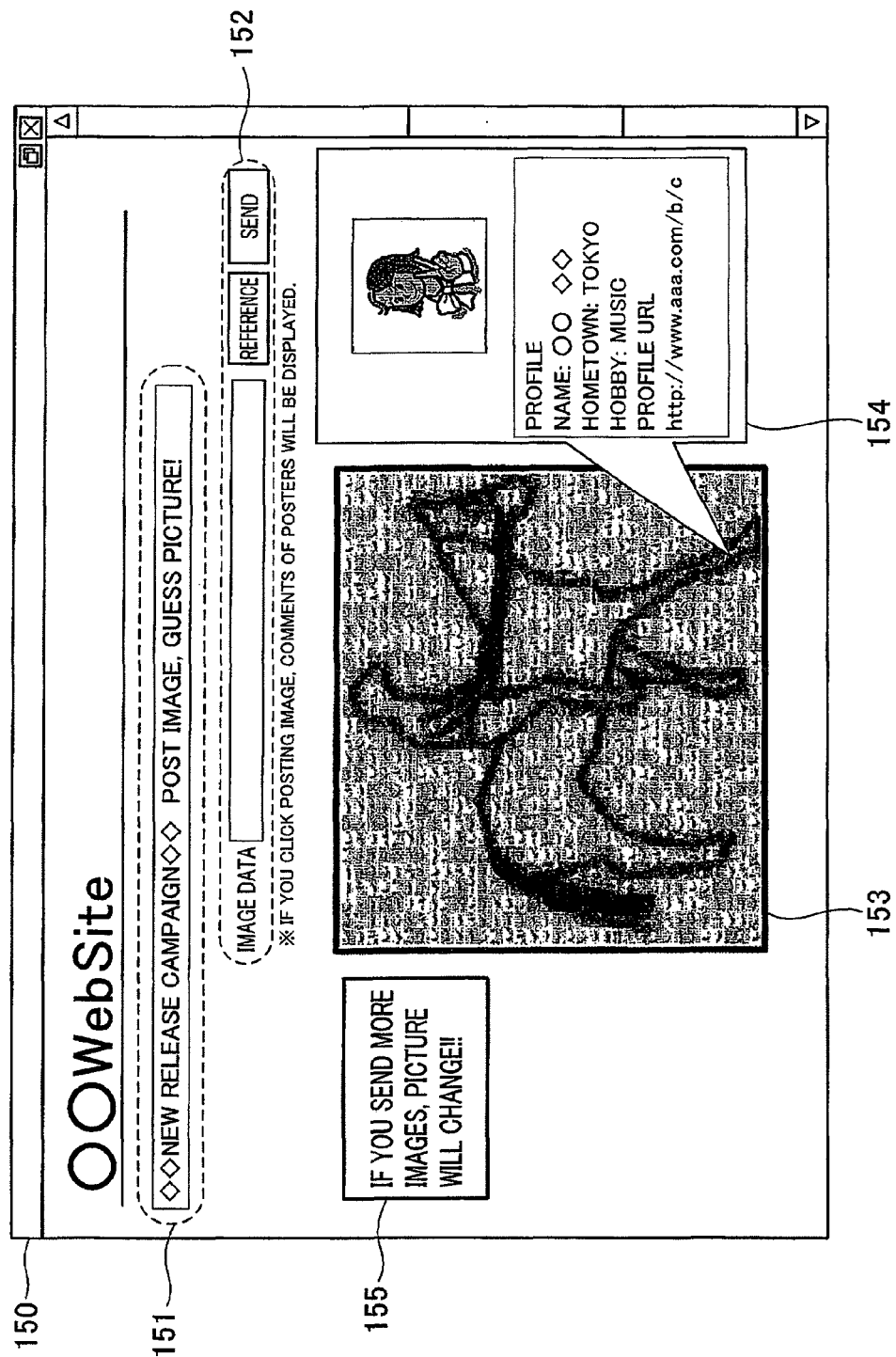
FIG. 27 is a view illustrating a mosaic image shown on the display of the display unit 22.

FIG. 27 is a view illustrating a mosaic image shown on the display of the display unit 22.

As illustrated in FIG. 27, a web page 150 configuring a mosaic image displays an information display portion 151 which shows the content information, a posting image transmitting portion 152 for transmitting a posting image to the information providing device 1, a mosaic image 153 and a posting image related information display portion 154 which displays the posting image and information related to the posting image. In addition, content in the posting image transmitting portion 152 is the same as in the posting image transmitting portion 132 according to the first embodiment. Further, content of the mosaic image 153 is the same as the mosaic image 133 according to the first embodiment. Furthermore, content in the posting image related information display portion 154 is the same as in the posting image related information display portion 134 according to the first embodiment.

Still further, with the first aspect of the present embodiment, the display image information display portion 155 displays a condition that a type of a mosaic image to be displayed changes. With the present embodiment, although, if a posting image is further transmitted to the information providing device 1 based on display of "If you send more images, a picture will change!!", a change of the type of the mosaic image to be displayed is promoted, this display is by no means limited to this. For example, the number of posting images required to change the type of the mosaic image to be displayed may be more specifically displayed.

Further, when the posting image is further transmitted by the user of the user terminal 2-*k* as described above and the quantity of stored posting images and the quantity of posting-images-to-be-stored which is associated with the material image and stored approximate, the system control unit 15 extracts the material image associated with the quantity of posting-images-to-be-stored, allocates the posting images and generates a mosaic image based on the material image.

Back to description of FIG. 26, when an operation unit 21 of the user terminal 2-*k* performs an operation of selecting a predetermined posting image in the mosaic image 153 (for example, this posting image is clicked) (step S25: YES), a system control unit 27 transmits a HTTP request to the information providing device 1 (step S26). This HTTP request requests distribution of a web page which displays the posting image and information associated with the posting image and related to the posting image, to a user terminal.

The system control unit 15 which receives this HTTP request acquires the web page which displays the posting image and information associated with the posting image and related to the posting image (step S27), and distributes the web page to the user terminal 2-*k* (step S28). In addition, specific processing content of the system control unit 15 in this case is the same as in the first embodiment.

Further, the system control unit 27 of the user terminal 2-*k* displays the web page which displays the posting image and information associated with the posting image and related to the posting image, in the window (an above posting image related information display portion 184) shown on the display of the display unit 22 (step S29).

Further, when the system control unit 27 transmits the HTTP request to the information providing server 1 (step S31) and the quantity of posting images stored in the posting image DB 141 and the quantity of posting-images-to-be-stored which is associated with the material image and stored approximate, the system control unit 15 extracts the material image associated with the quantity of posting-images-to-be-stored.

Furthermore, the system control unit 15 allocates the posting image to each divided area of the extracted material image to generate a mosaic image based on the extracted material image as described above, generates a web page configuring a mosaic image based on the material image (step S32) and distributes the web page to the user terminal 2-*k* (step S33).

Hereinafter, a mosaic image shown on the display of the display unit 22 will be described using FIG. 28.

Figure 28:
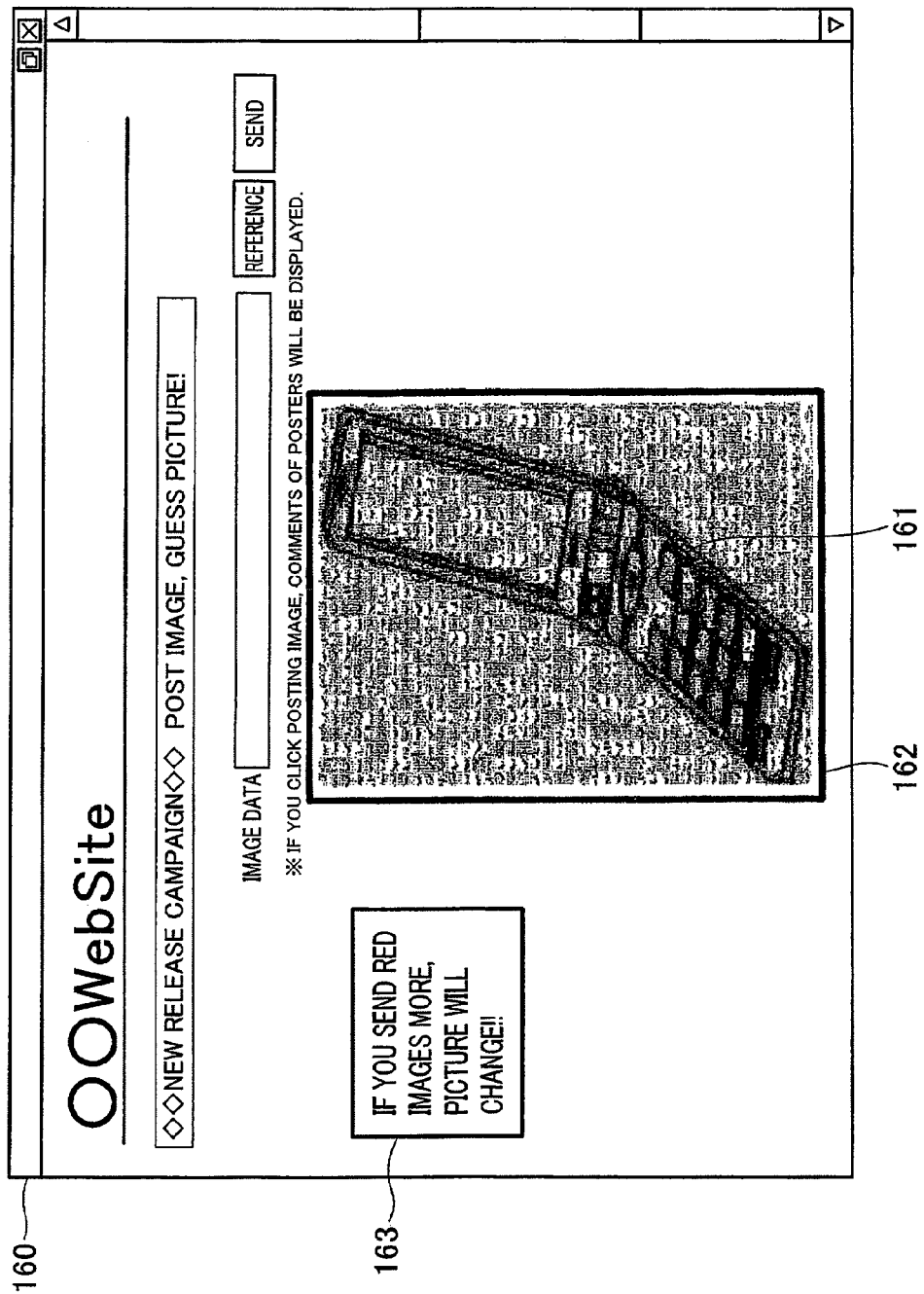
FIG. 28 is a view illustrating an example where, when the number of posting images stored in the posting image DB 141 increases according to a condition displayed in a display image information display portion 85 and approximates to the quantity of posting-images-to-be-stored which is associated with a material image and stored, a mosaic image based on a material image associated with the quantity of the posting images-to-be-stored is displayed on the display unit 22.

FIG. 28 is a view illustrating an example where, when the number of posting images stored in the posting image DB 141 increases according to a condition displayed in a display image information display portion 185 and approximates to the quantity of posting-images-to-be-stored which is associated with a material image and stored, a mosaic image based on a material image associated with the quantity of the posting images-to-be-stored is displayed on the display unit 22.

As illustrated in FIG. 28, a web page 160 configuring a mosaic image displays, for example, a mosaic image 162 based on a material image of a mobile telephone 161, and the display image information display portion 163.

With an example illustrated in FIG. 28, the system control unit 15 first decides that the user of the user terminal 2-$k$ further transmits a posting image, and the quantity of posting images stored in the posting image DB 141 and the quantity of posting-images-to-be-stored which is associated with the mobile telephone 161 and stored approximate.

Further, the system control unit 15 extracts the mobile telephone 161 which is the material image associated with the quantity of the posting-images-to-be-stored, allocates posting images and generates the mosaic image 162 based on the mobile telephone 161.

Furthermore, a mosaic image displayed on the display of the display unit 22 when a posting image having red as representative color information of the posting image is further transmitted by the user of the user terminal 2-$k$ according to a comment "if you send more red images, a picture will change!!" displayed in the display image information display portion 163 will be described using FIG. 29.

Figure 29:
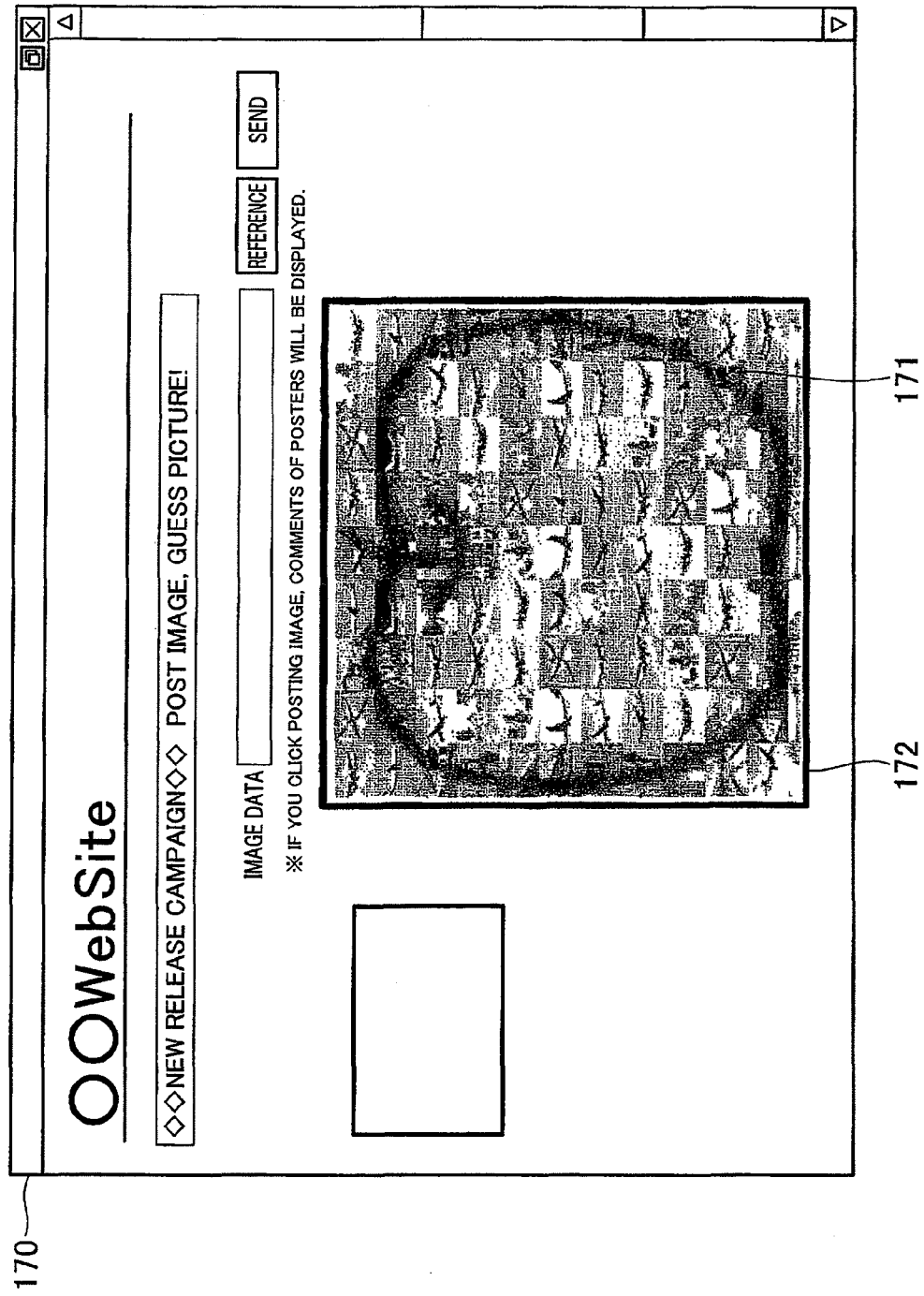
FIG. 29 is a view illustrating an example where the number of posting images stored in the posting image DB 141 increases according to a condition displayed on a display image information display portion 93, a stored material image is extracted according to the quantity and representative color information of specific posting-images-to-be-stored which is associated with the material image and stored, and a mosaic image based on the material image is displayed on the display unit 22.

FIG. 29 is a view illustrating an example where the number of posting images stored in the posting image DB 141 increases according to a condition displayed in a display image information display portion 163, a stored material image is extracted according to the quantity and representative color information of specific posting-images-to-be-stored which is associated with the material image and stored, and a mosaic image based on the material image is displayed on the display unit 22.

As illustrated in FIG. 29, a web page 170 configuring a mosaic image displays, for example, a mosaic image 172 based on a material image of an apple 171.

With an example illustrated in FIG. 29, the system control unit 15 first calculates the quantity of posting images per representative color information from the stored posting images and representative color information of the posting images.

Further, when the quantity of posting images calculated per representative color information approximates to the quantity of posting-images-to-be-stored which is associated with a material image and stored, and representative color information shown by the posting image and representative color information shown by the material image match, the system control unit 15 extracts the material image associated with the representative color information and the quantity of posting-images-to-be-stored and stored.

In this case, when the quantity of posting images including red as representative color information and the quantity of posting-images-to-be-stored which is associated with the material image and stored approximate, the system control unit 15 extracts the apple 171 which is the material image associated with representative color information of red shown by the material image and stored, allocates the posting images and generates the mosaic image 172 based on the apple 171.

Next, an operation of an information providing system matching a request of the user terminal 2-$k$ according to the second aspect of the present embodiment will be described using FIGS. 30 to 33. In addition, a basic sequence between the information processing device 1 and the user terminal 2-$k$ may be the same as in the first aspect of the present embodiment (FIG. 26).

Figure 30:
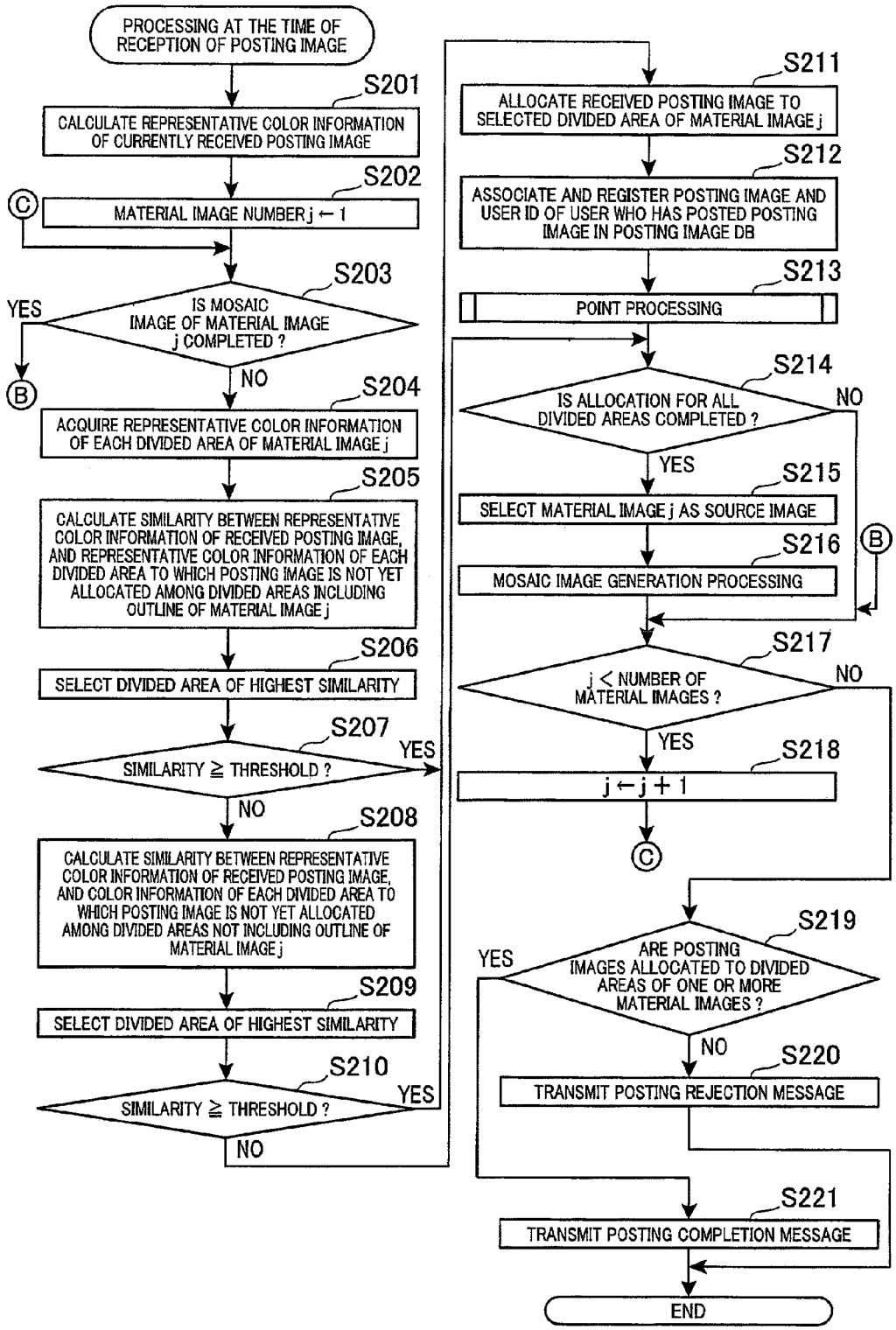
FIG. 30 is a view illustrating a processing example in processing of the system control unit 15 of the information providing device 1 according to an embodiment upon reception of a posting image.

FIG. 30 is a view illustrating a processing example in processing of the system control unit 15 of the information providing device 1 according to the present embodiment upon reception of a posting image. The processing upon reception of a posting image is started when the information processing device 1 receives a posting image from the user terminal 2-$k$ (step S30 in FIG. 26).

As illustrated in FIG. 30, the system control unit 15 calculates representative color information of the currently received posting image (step S201). Next, the system control unit 15 sets 1 to a material area number j (step S202). For ease of description, a material image ID indicates a material image number. This number is referred to as a "material image number". The material image number is allocated in order from the first. Subsequently, a material image having a material image number j is referred to as a "material image j".

Next, the system control unit 15 decides whether or not a mosaic image of the material image j is completed (generated) (step S203). In this case, when deciding that the mosaic image of the material image j is completed (step S203: YES), the system control unit 15 proceeds to step S217.

By contrast with this, when deciding that the mosaic image of the material image j is not completed (step S203: NO), the system control unit 15 acquires representative color information of each divided area of the material image j from the material image DB 142 (step S204). Next, the system control unit 15 acquires outline information of the material image j from the material image DB 142, and specifies divided areas including images showing an outline from divided areas of the material image j based on the acquired outline information. Next, the system control unit 15 calculates the similarity between representative color information of the currently received posting image and representative color information of each divided area to which a posting image is not yet allocated among the divided areas including images showing the outline in the material image j (step S205).

Next, the system control unit 15 selects the divided area of the calculated highest similarity (step S206). Next, the system control unit 15 decides whether or not the similarity calculated for the selected divided area is a threshold set in advance or more (step S207). In this case, when deciding that the similarity calculated for the selected divided area is a threshold or more (step S207: YES), the system control unit 15 allocates the currently received posting image to the selected divided area of the material image j (step S211).

By contrast with this, when deciding that the similarity calculated for the selected divided area is not a threshold or more (step S207: NO), the system control unit 15 calculates the similarity between representative color information of the currently received posting image and representative color information of each divided area to which a posting image is not yet allocated among the divided areas including no image showing the outline in the material image j (step S208).

Next, the system control unit 15 selects the divided area of the calculated highest similarity (step S209). Next, the system control unit 15 decides whether or not the similarity calculated for the selected divided area is a threshold set in advance or more (step S210). In this case, when deciding that the similarity calculated for the selected divided area is not a threshold or more (step S210: NO), the system control unit 15 proceeds to step S217.

By contrast with this, when deciding that the similarity calculated for the selected divided area is a threshold or more (step S210: YES), the system control unit 15 allocates the currently received posting image to the selected divided area of the material image j (step S211). Thus, the system control unit 15 preferentially allocates posting images to divided areas including images showing the outline.

After finishing processing in step S211, the system control unit 15 registers the currently received posting image in the posting image DB 141 (step S212). More specifically, the system control unit 15 generates a new posting image number. Further, the system control unit 15 associates and registers the generated posting image number, the currently received posting image, a currently received user ID and color information and representative color information of the currently received posting image.

Next, the system control unit 15 executes point processing described below (step S213). Next, the system control unit 15 decides whether or not posting images are allocated to all divided areas of the material image j (step S214). In this case, when deciding that there are divided areas to which posting images are not yet allocated among the divided areas of the material image j (step S214: NO), the system control unit 15 proceeds to step S217.

By contrast with this, when deciding that posting images are allocated to all divided areas of the material image j (step S214: YES), the system control unit 15 selects the material image j as a source image of the mosaic image to be displayed on a web page (step S215). Next, the system control unit 15 executes mosaic image generation processing (step S216).

In the mosaic image generation processing, the system control unit 15 generates a mosaic image based on the posting image allocated to each divided area of the material image j selected as the source image, and registers the generated mosaic image in the mosaic image DB 143. Processing content of the mosaic image generation processing is basically the same as in the first embodiment (FIG. 16). Meanwhile, in step S15 of the mosaic image generation processing, the system control unit 15 acquires the number of divisions of the material image j from the material image DB 142. Further, the system control unit 15 generates table part data of a table having cells corresponding to a number indicated by the acquired number of divisions. Furthermore, in step S160, the system control unit 15 decides whether or not the divided area number i is less than a value indicated by the number of divisions of the material image j. After finishing the mosaic image generation processing, the system control unit 15 proceeds to step S217.

In step S217, the system control unit 15 decides whether or not the material image number j is less than a value indicated by the number of material images stored in the material image DB 142. In this case, when deciding that the material image number j is less than a value indicated by the number of the material images (step S217: YES), the system control unit 15 adds 1 to the material image number j and updates the material image number j (step S218). Next, the system control unit 15 proceeds to step S203.

By contrast with this, when deciding that the material image number j is not less than the value indicated by the number of material images (step S217: NO), the system control unit 15 decides whether or not the currently received posting image is allocated to a divided area of one or more material images of the material images stored in the material image DB 142 (step S219). In this case, when deciding that the currently received posting image is not allocated to any divided area of the material images (step S219: NO), the system control unit 15 transmits a posting rejection message to the user terminal 2-*k* which is the transmission source of a posting image (step S220) and finishes processing upon reception of a posting image.

By contrast with this, when deciding that the currently received posting image is allocated to divided areas of one or more material images (step S219: YES), the system control unit 15 transmits a posting completion message to the user terminal 2-*k* which is the transmission source of a posting image (step S221) and finishes processing upon reception of a posting image.

In addition, when the currently received posting image is allocated to a divided area, the system control unit 15 may allocate the currently received posting image to a divided area to which another posting image is already allocated. More specifically, the system control unit 15 calculates for a given divided area the similarity between representative color information of the divided area and representative color information of the posting image which is already allocated to the divided area. Further, the system control unit 15 calculates the similarity between representative color information of the divided area and representative color information of the currently received posting image. Furthermore, when the similarity to representative color information of the currently received posting image is higher than the similarity to representative color information of the posting image which is already allocated, the system control unit 15 allocates the currently received posting image to this divided area. That is, the system control unit 15 allocates a posting image which is more suitable for this divided area than the posting images which are already allocated to the divided areas. Consequently, it is possible to generate a mosaic image which more faithfully imitates a material image used as a source image. Further, in this case, the system control unit 15 may assign points to a user who has posted a posting image which is newly allocated instead of a posting image which is already allocated.

Figure 31:
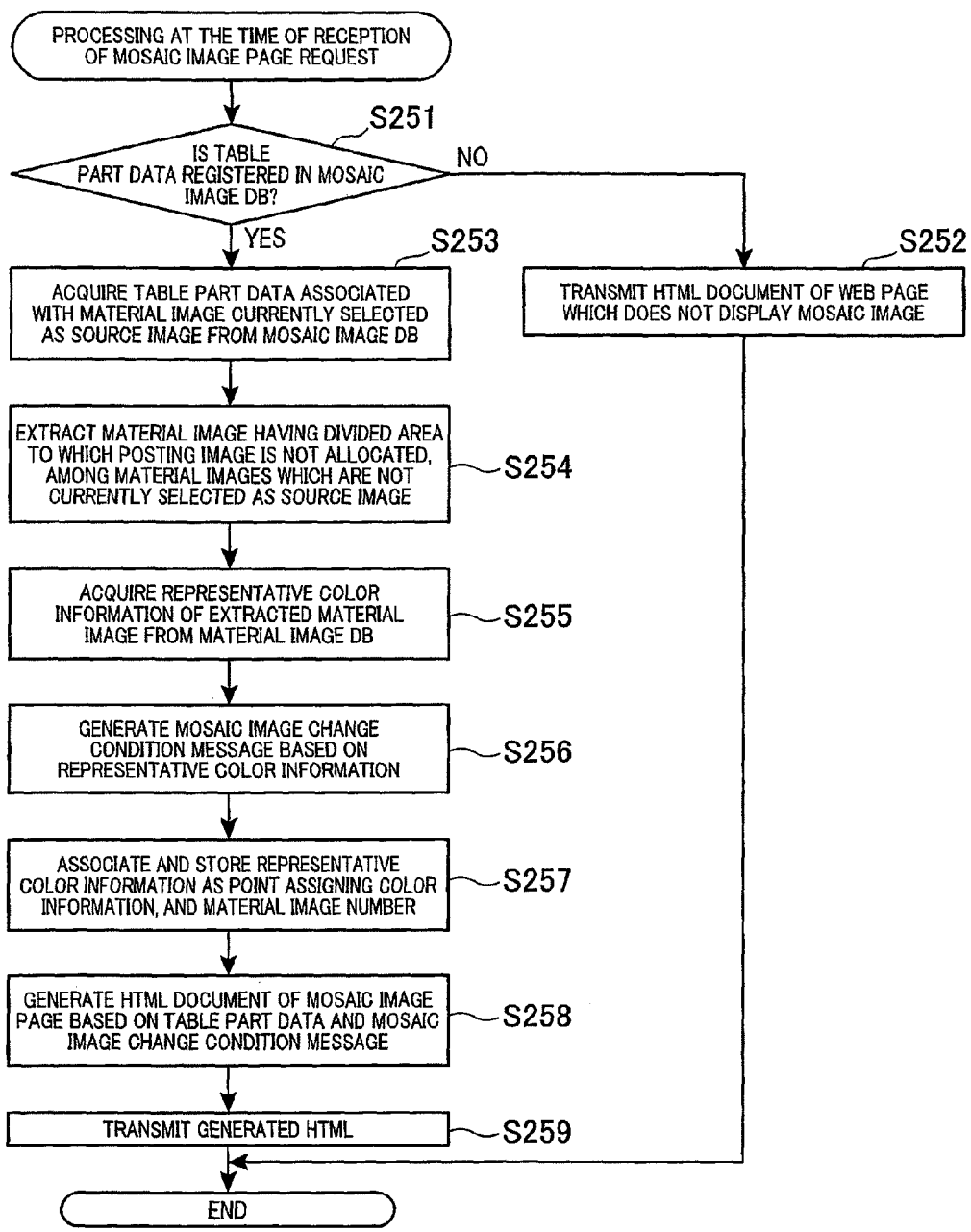
FIG. 31 is a view illustrating a processing example in processing of the system control unit 15 of the information providing device 1 according to an embodiment upon reception of a mosaic image page request.

FIG. 31 is a view illustrating a processing example in processing of the system control unit 15 of the information providing device 1 according to the present embodiment upon reception of a mosaic image page request. Processing upon reception of a mosaic image page request is started when the information providing device 1 receives the mosaic image page request from the user terminal 2-*k* (step S2 in FIG. 26).

As illustrated in FIG. 31, the system control unit 15 decides whether or not mosaic image table part data is stored in the mosaic image DB 143 (step S251). When there is no material image in which posting images are allocated to all divided areas among material images stored in the material image DB 142, even one table part data is not generated. In this case, when deciding that the mosaic image table part data is not stored in the mosaic image DB 143 (step S251: NO), the system control unit 15 transmits HTML document of a web page which does not display a mosaic image, to the user terminal 2-*k* which is the transmission source of the mosaic image page request (step S252), and finishes processing upon reception of the image page request.

By contrast with this, when deciding that the mosaic image table part data is stored in the mosaic image DB 143 (step S251: YES), the system control unit 15 acquires mosaic image table part data matching a material image selected as a current source image, from the mosaic image DB 143 (step S253).

Next, the system control unit 15 extracts a material image which is not selected as a current source image among the material images stored in the material image DB 142, and in which there are divided areas to which posting images are not yet allocated (step S254). Next, the system control unit 15 acquires representative color information of the extracted material image from the material image DB 142 (step S255).

Next, the system control unit 15 generates a text of a mosaic image change condition message based on the acquired representative color information (step S256). The mosaic image change condition message indicates a condition that a source image of a mosaic image displayed on a web page changes. For example, the mosaic image change condition message shows "If you send more 0 images, a picture will change!!" Meanwhile, "o" represents a character indicating a representative color of a material image. The mosaic image change condition message is displayed in a web page which displays a mosaic image.

For example, a material image which is not selected as a current source image is an apple image, and the representative color of the apple image is red. In this case, the system control unit 15 generates a text of a message showing "If you send more red images, a picture will be change!!" When a user who has browsed the web page reads this message and posts a posting image including red as a representative color, the posting image is highly likely to be allocated to divided areas of an apple material image accordingly. Further, when posting images are allocated to all divided areas of the apple material image, an apple mosaic image is generated and is displayed on a web page. In addition, when there are a plurality of corresponding material images, the system control unit 15 may generate a text of a mosaic image change condition message based on each representative color information (for example, "If you send red or yellow images, a picture will change!!").

Next, the system control unit 15 associates and stores the representative color information acquired from the material image DB 142 as point assigning color information, and a material image number of a corresponding material image in the memory unit 14 (step S257). In this case, when old point assigning color information is stored in the memory unit 14, the system control unit 15 deletes this old point assigning color information from the memory unit 14. When the representative color information of the posting image received from the user terminal 2-*k* matches with the point assigning color information, points are assigned to the user who has posted the posting image. That is, when the user posts a posting image required to change a source image of a mosaic image, points are assigned to this user.

Next, the system control unit 15 generates a web page which displays a mosaic image, based on the table part data acquired from the mosaic image DB 143 and the text of the generated mosaic image change condition message (step S258). Next, the system control unit 15 transmits the generated HTML document to the user terminal 2-*k* which is the transmission source of the mosaic image page request (step S259), and finishes the processing upon reception of the mosaic image page request.

When, for example, a mosaic image for which a mobile telephone material image is used as a source image first is completed, as illustrated in FIG. 28, a web page which displays the mosaic image 162 based on the mobile telephone 161 is displayed on the display unit 22 of each user terminal 2-*k*. Further, there is an apple material image including red as a representative color, a mosaic image change condition message "If you send more red images, a picture will change!!" is displayed in the display image information display portion 163.

Subsequently, when a mosaic image for which an apple material image is used as a source image first is completed, as illustrated in FIG. 29, a web page which displays the mosaic image 172 based on the apple 171 is displayed on the display unit 22 of each user terminal 2-*k*.

In addition, even when, for example, a period (the time and a number of days) set in advance passes after the first posting image is received and registered in the posting image DB 141, if even one mosaic image is not completed, the system control unit 15 may display an incomplete mosaic image on a web page. In this case, for example, the system control unit 15 selects a material image which is used as a source image for a mosaic image, from material images stored in the material image DB 142. For example, the system control unit 15 may select the material image of the highest completion rate of the mosaic image. The completion rate of the mosaic image is found by, for example, dividing the number of divided areas to which posting images are allocated, by the number of divisions of a material image.

Then, when receiving a posting image from the user terminal 2-*k* and allocating the received posting image to a material image selected as a source image, the system control unit 15 updates a mosaic image based on the allocated posting image. By this means, a mosaic image displayed on a web page is gradually completed.

Figure 32:
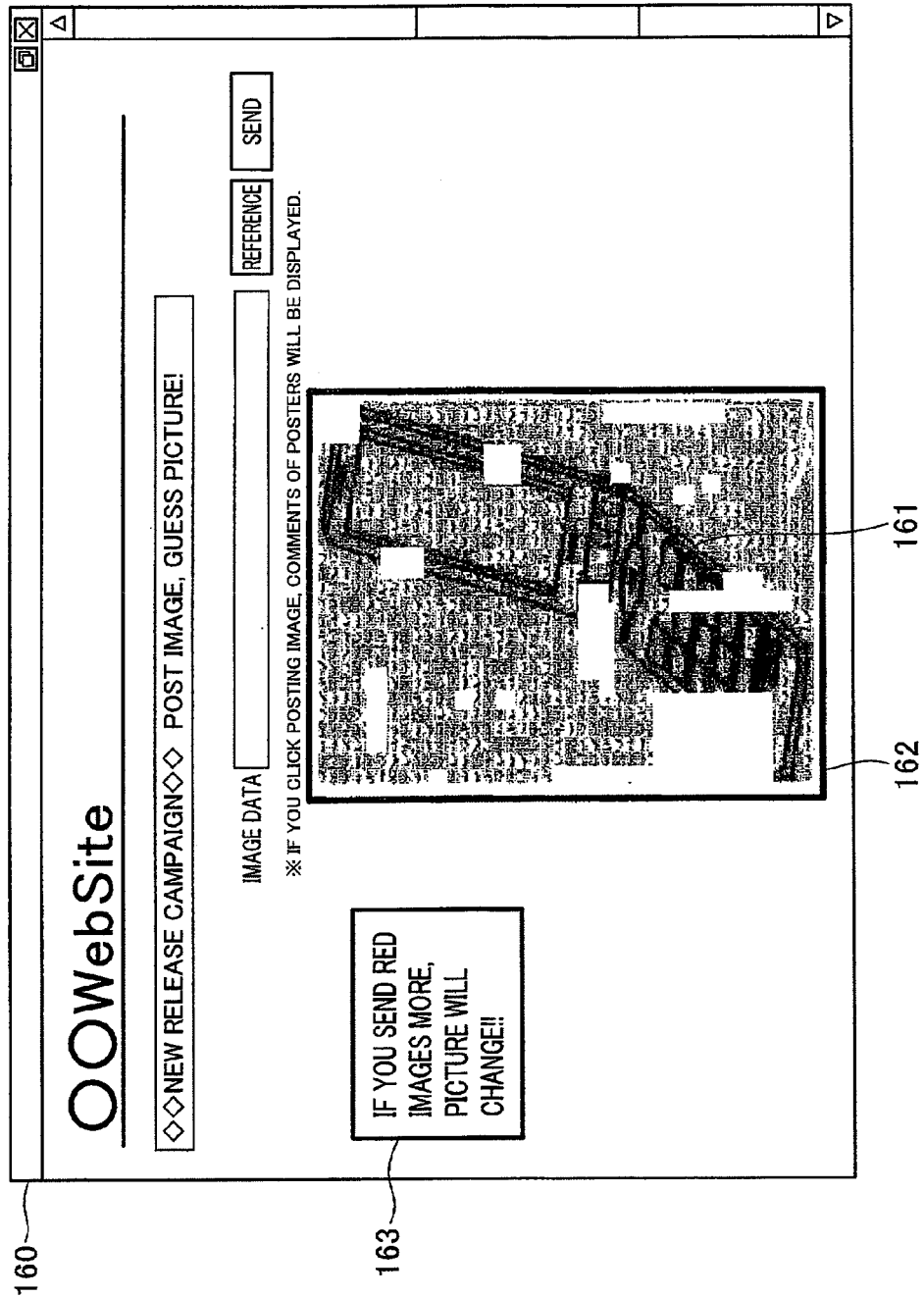
FIG. 32 is a view illustrating a mosaic image shown on the display of the display unit 22.

FIG. 32 is a view illustrating a mosaic image shown on the display of the display unit 22. In FIG. 32, the same elements as in FIG. 28 will be assigned the same reference numerals. For example, the system control unit 15 selects a mobile telephone material image as a source image of an incomplete mosaic image. In this case, as illustrated in FIG. 32, a web page which displays a mosaic image 165 based on the mobile telephone 161, is displayed on the display unit 22 of each user terminal 2-*k*. With the mosaic image 165, posting images are not embedded in part of cells.

In addition, in some cases, posting images are allocated to all divided areas of a material image which is not selected as a source image in a state where an incomplete mosaic image is displayed in a web page. That is, a mosaic image corresponding to a material image which is not selected as a source image is completed in some cases. In this case, the material image which is used as a source image for a mosaic image displayed on the web page is changed. In this case, there are various timings to change the material image. When, for example, a mosaic image currently displayed on the web page is completed, the system control unit 15 may change the material image which is a source image. Further, when the completion rate of the mosaic image currently displayed on the web page is a completion rate set in advance or more, the system control unit 15 may change the material image which is a source image. Furthermore, when a period set in advance passes after the first posting image is received and registered in the posting image DB 141, the system control unit 15 may change a material image which is a source image.

Still further, when an incomplete mosaic image is displayed on a web page, there are various conditions of displaying a mosaic image change condition message on the web page. When, for example, posting images which correspond to a number of images set in advance or more and which cannot be allocated to divided areas of a material image selected as a source image of the mosaic image currently displayed on the web page are transmitted, the system control unit 15 may display a mosaic image change condition message. Further, when an incomplete mosaic image is completed or the completion rate of the incomplete mosaic image is the completion rate set in advance or more, the system control unit 15 may display a mosaic image change condition message. Furthermore, when a period set in advance passes after the first posting image is received and registered in the posting image DB 141, the system control unit 15 may display a mosaic image change condition message.

When, for example, after an incomplete mosaic image which is a source image of a mobile telephone material image is displayed on a web page, posting images which correspond to a number of images set in advance or more and which cannot be allocated to divided areas of the mobile telephone material image are transmitted, as illustrated in FIG. 32, a mosaic image change condition message "If you send more red images, a picture will change!!" is displayed in the display image information display portion 163.

Figure 33:
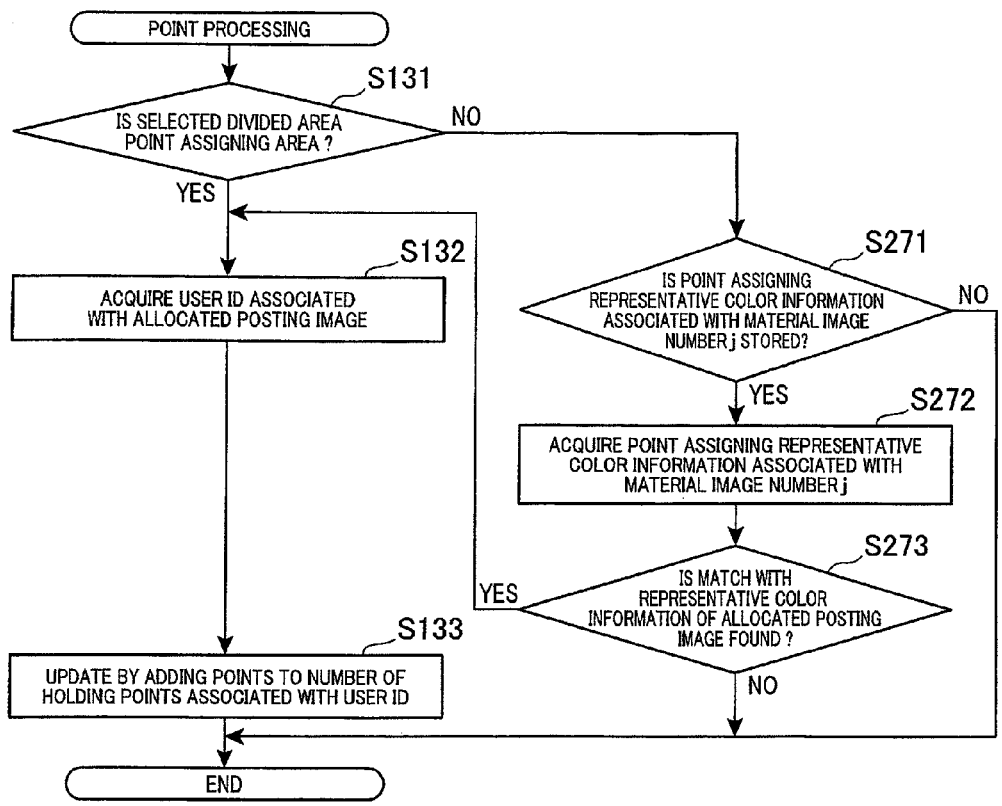
FIG. 33 is a view illustrating a processing example in point processing of the system control unit 15 of the information providing device 1 according to an embodiment.

FIG. 33 is a view illustrating a processing example in point processing of the system control unit 15 of the information providing device 1 according to the present embodiment. In FIG. 33, the same processing as in FIG. 15 will be assigned the same reference numeral.

As illustrated in FIG. 33, the system control unit 15 decides whether or not a selected divided area is a point assigning area based on point assigning area information of the material image j (step S131). In this case, when deciding that the selected divided area is a point assigning area (step S131: YES), the system control unit 15 acquires a user ID associated with the posting image allocated to the selected divided area, from the posting image DB (step S132). Next, the system control unit 15 updates the number of holding points associated with the acquired user ID (step S133), and finishes point processing.

When deciding in step S131 that the selected divided area is not a point assigning area (step S131: NO), the system control unit 15 decides whether or not point assigning color information associated with the material image number j is stored in the memory unit 14 (step S271). In this case, when deciding that the point assigning color information associated with the material image number j is not stored (step S271: NO), the system control unit 15 finishes point processing.

By contrast with this, when deciding that the point assigning color information associated with the material image number j is stored (step S271: YES), the system control unit 15 acquires the point assigning color information associated with the material image number j from the memory unit 14 (step S272). Next, the system control unit 15 decides whether or not representative color information of a posting image allocated to the selected divided area and the acquired point assigning color information match (step S273). In this case, when deciding that representative color information of the posting image and the point assigning color information do not match (step S273: NO), the system control unit 15 finishes point processing.

By contrast with this, when deciding that representative color information of the posting image and the point assigning color information match (step S273: YES), the system control unit 15 executes processings in steps S132 and S133 and finishes point processing. That is, the system control unit 15 assigns points to a user who has posted a posting image having a representative color indicated by a mosaic image change condition message displayed on a web page which displays a mosaic image.

In addition, even when a period passes after the first posting image is received and registered in the posting image DB 141 while an incomplete mosaic image is displayed on a web page, if the incomplete mosaic image is not completed, the system control unit 15 may use as point assigning areas all divided areas to which posting images are not yet allocated among divided areas of a material image which is currently selected as a source image. That is, when the posting images allocated to incomplete portions (cells) in a mosaic image displayed on a web page are posted, the system control unit 15 may assign points. In this way, the system control unit 15 sets in advance the areas through which points are assigned to users.

As described above, according to the present embodiment, the system control unit 15 of the information providing device 1 generates a mosaic image by acquiring a posting image from the user terminal 2-k through the network, storing the acquired posting image in the posting image DB 141, and allocating the acquired posting image to one divided area based on representative color information of the acquired posting image and representative color information of each divided area of a material image which is used as a source image, and generates a new mosaic image by, after generating the mosaic image, changing at least a material image of the number of divided areas and the material image in response to an increase in the number of posts.

By this means, the resolution of the newly generated mosaic image and the material image imitated using the newly generated mosaic image change from the previously generated mosaic image. Consequently, it is possible to encourage user's motivation of continuously browsing the mosaic image.

Further, the system control unit 15 generates a mosaic image for which one material image is used as a source image by acquiring representative color information of divided areas of each of a plurality of material images, allocating the acquired posting image to divided areas of one material image based on the acquired representative color information of a posting image and the acquired representative color information of the divided areas and allocating divided areas to one material image, and generates a mosaic image by, after generating the mosaic image, using as a new source image a material image different from the material image used as the source image in response to an increase in the number of posts.

Hence, the material image imitated by the mosaic image changes to another material image in response to an increase in the number of posts. Consequently, it is possible to encourage user's motivation of continuously browsing the mosaic image.

Further, the system control unit 15 generates a mosaic image using as a source image the material image in which posting images are allocated to all divided areas, in response to an increase in the number of posts.

Consequently, when the material image imitated by the mosaic image changes to another material image, it is possible to generate a mosaic image without defect portions. Consequently, it is possible to encourage user's motivation of continuously browsing the mosaic image.

Further, even when the posting image acquired from the user device 2-k is not suitable for any divided areas, this image is not used to generate a mosaic image. Consequently, a mosaic image which more faithfully imitates the material image is generated, so that it is possible to encourage user's motivation of continuously browsing the mosaic image.

Further, posting images are preferentially allocated to divided areas including images showing the outline, so that the user can learn the material image imitated by the mosaic image at a comparatively early stage.

Furthermore, when a posting image is allocated to a point assigning area, points are assigned to a user who has posted this image. Consequently, it is possible to encourage user's motivation of posting images. Consequently, the resolution of a mosaic image and a material image imitated by the mosaic image are expected to change quickly, so that it is possible to encourage user's motivation of continuously browsing the mosaic image.

Further, the user who browses the mosaic image can browse a profile of a user who has posted the posting image included in the displayed mosaic image. Consequently, it is possible to encourage user's motivation of browsing the mosaic image.

Further, the system control unit 15 acquires a plurality of posting images from a plurality of user terminals 2-*k* connected through the network, stores a plurality of acquired posting images in the posting image DB 141, divides a plurality of material images of different types into predetermined divided areas according to a type of the material image, associates and stores the number which is set in advance as the number of images-to-be-stored and the divided material images of different types per quantity in the material image DB 142, extracts the stored material images according to the quantity of the stored posting images, applies RGB conversion to each posting image stored in the posting image DB 141 and to the interior of each divided area of the material image, compares a RGB conversion result of each posting image and a RGB conversion result in each divided area of the material image, when deciding that the RGB conversion result of the divided areas and the RGB conversion result of the posting images approximate, allocates posting images indicated by the RGB conversion result of the posting images, to the divided areas indicated by the RGB conversion result of the divided areas, generates the mosaic image based on the material image, generates a web page which displays the mosaic image, and distributes the generated web page to the user terminal 2-*k* which made an access request.

Consequently, the type of a mosaic image to be displayed changes in response to an increase of the quantity of posting images to be acquired, so that it is possible to encourage user's motivation of repeatedly and continuously browsing a mosaic image, and provide an effect of attracting guests.

Further, the system control unit 15 calculates representative color information of a color shown by each posting image stored in the posting image DB 141 and representative color information of a color shown by each material image stored in the material image DB 142, further associates and stores the representative color information of the color shown by the material image and each stored material image, and extracts the stored material image according to the quantity of posting images showing specific representative color information among the stored posting images.

Consequently, the type of a mosaic image to be displayed changes according to an increase of the quantity of posting images to be acquired and the type of the representative color of the posting image, so that it is possible to encourage user's motivation of repeatedly and continuously browsing a mosaic image, and provide an effect of attracting guests.

Further, the system control unit 15 displays a condition that a type of a mosaic image to be displayed changes.

Consequently, it is possible to give an expectation to users that the type of a mosaic image to be displayed is likely to change based on posting images transmitted by the users, so that it is possible to encourage users' motivation of repeatedly and continuously browsing a mosaic image, and provide an effect of attracting guests.

Further, the system control unit 15 may allocate the posting images to the divided areas according to a predetermined priority set in advance, and generate the mosaic image based on the material image.

With this configuration, the user who browses this web page can browse the mosaic image which is completed from specific portions set according to the priority while visually enjoying the mosaic image.

In addition, a display order may be allocated to each material image stored in the material image DB 142. Meanwhile, the display order of a material image indicates an order of displaying the material image in a time domain. Hence, in order from a material image of an earlier display order, a web page displays a mosaic image for which the material image is used as a source image.

In this case, as illustrated in FIG. 34, in the material image DB 142, a material image ID, a material image, the number of divisions, representative color information of the material image, outline information, color information of each divided area, representative color information of each divided area and, in addition, a display order of a material image are stored. The display order of each material image is set in advance by, for example, an administrator.

An example is assumed where material images in which zodiac animals are drawn are stored in the material image DB 142. More specifically, twelve material images including a mouse material image, a cow material image, a tiger material image, . . . and a boar material image are stored in the material image DB 142. Further, the first is assigned to the mouse material image as a display order. Furthermore, the second is assigned to the cow material image as a display order. Still further, the third is assigned to the tiger material image as a display order. Moreover, the twelfth is assigned to the boar material image as a display order. Thus, the display orders from the first to the twelfth are assigned to the twelve material images.

The system control unit 15 refers to the display orders stored in the material image DB 142, and transmits HTML documents for displaying mosaic images for which the material images are used as source images, to the user terminal 2-*k* according to the order matching the display orders of the material images used as source images. More specifically, the system control unit 15 transmits HTML documents for displaying mosaic images in order from a mosaic image for which a material image of an earlier display order is used as a source image. Hence, even when a mosaic image for which a given material image is used as a source image is completed, if a mosaic image based on a material image of a display order earlier than the material image is not completed, the system control unit 15 does not transmit HTML document for displaying a mosaic image for which the material image is used as a source image. By this means, that a mosaic image is displayed on a web page according to a display order of a material image is guaranteed.

Even when, for example, a cow mosaic image is completed in case of the zodiac animals, the cow mosaic image is not displayed on the web page until a mouse mosaic image is completed. Further, even when a tiger mosaic image is completed, the tiger mosaic image is not displayed on the web page until the mouse mosaic image and the cow mosaic image are completed.

In addition, similar to the above case, in some cases, even one mosaic image is not completed even when a period set in advance passes after the first posting image is received and registered in the posting image DB 141. In this case, the system control unit 15 may generate a mosaic image based on a material image of the first display order, and display the generated mosaic image on the web page. Further, when, for example, the completion rate of a mosaic image currently displayed on a web page is a completion rate set in advance or more, the system control unit 15 may display on the web page a mosaic image for which a material image of the display order next to the material image which is the source image of the mosaic image is used as a source image.

Third Embodiment

With the present embodiment, a mosaic image displayed on a web page is generated by allocating images to some divided areas of one material image from a plurality of material images. Further, with the present embodiment, a display order is allocated to each material image. Meanwhile, the display order of a material image indicates an order of displaying the material image in a time domain. Hence, in order from a material image of an earlier display order, a web page displays a mosaic image for which the material image is used as a source image.

Further, with the present embodiment, a difference between material images of preceding and following display orders is specified. Meanwhile, the difference between material images is a set of pixels having differences in colors in the same coordinate. In other words, the difference refers to a range in which there is a difference between expressed patterns, figures or colors in material images. The difference between these material images is acknowledged in divided area units. A divided area for which the difference is acknowledged is referred to as a "difference area". For example, the difference area is acknowledged between a material image of the first display order and a material image of the second display order. Further, the difference area is acknowledged between a material image of the second display order and a material image of the third display order. Each divided area in the difference area is an example of a differing area according to the present invention.

When posting images are allocated to all divided areas of the material image of the first display order, a mosaic image for which this material image is used as a source image is completed, and the complete mosaic image is displayed on a web page. By contrast with this, when posting images are allocated to all divided areas in a difference area between a material image of a material image of the second or subsequent display order and a material image of a previous display order, a mosaic image is generated using the posting images allocated in the difference area and posting images allocated to divided areas other than in the difference area in the material image of the previous display order. More specifically, the posting images allocated in the difference area are replaced with the posting images in the difference area in the material image of the previous display order. That is, by allocating posting images only in the difference area in the material image of the second or subsequent display order, a mosaic image for which the material image is used as a source image is completed.

By this means, even when posting images are not allocated to all divided areas, it is possible to display a complete mosaic image as a mosaic image which imitates a material image unlike the mosaic image displayed so far. Consequently, a mosaic image including a less number of divided areas included in a difference area between material images can quickly change.

Hereinafter, a material image of the first or subsequent display order is referred to as a "first material image". Further, a material image of the second or subsequent display order is referred to as a "second material image".

In addition, a configuration of a system, a configuration of an information providing device 1 and a configuration of a user terminal 2-$k$ according to the present embodiment are basically the same as in the first embodiment.

FIG. 35 illustrates tables indicating information stored in a posting image DB 141, a material image DB 142 and a mosaic image DB 143 constructed in a memory unit 14. Content of information stored in the posting image DB 141 and the mosaic image DB 143 may be the same as in the first embodiment or the second embodiment.

In the material image DB 142, the first material image and the second material image related to the first material image are associated and stored (FIG. 35B).

Meanwhile, the first material image and second material image related to the first material image are generated to express a mode where an outlook of a display target changes based on, for example, a function (or certain performance) which the display target shown in an image has. When the second material image is such an image, the number of divided areas included in a difference area is likely to be a little. In addition, the second material image does not need to satisfy this condition. The second material image also includes, for example, a material image related to the first material image in advance by an administrator irrespectively of the type and content of the material image. Further, the second material image may not be a material image related to the first material image. That is, a material image of the first display order among material images stored in the material image DB 142 may be the first material image, and a material image of the second or subsequent display order may be the second material image.

A case will be described as an example where the display target is a flip mobile telephone.

With the flip mobile telephone, the mobile telephone has a foldable function (mechanism) of changing an outlook of the mobile telephone from the closed state to the opened state. Hence, to express the mode where the outlook of the mobile telephone changes, the closed state of the mobile telephone is expressed in the first material image, and the opened state (completely opened state) of the mobile telephone is expressed in the second material image. Further, each material image showing a state where a mobile telephone is opened a little by little, which is an intermediate state of the closed state of the mobile telephone and the completely opened state of the mobile telephone is also prepared for the second material image. Furthermore, the first material image and the second material image may be stored in the material image DB 142 in advance or read from the material images stored in an information recording medium such as a USB memory through an interface unit which is not illustrated. Still further, the material images transmitted from the user terminal 2-$k$ may be acquired through a communication unit 11 and stored.

Moreover, although described below, in the material image DB 142, the number set in advance as the number of images-to-be-stored (hereinafter, simply "the quantity of posting-images-to-be-stored"), and the material image divided into predetermined divided areas according to the material image and the second material image are associated and stored (FIG. 35B). Meanwhile, the quantity of posting-images-to-be-stored refers to the number of divisions.

In addition, in the material image DB 142, representative color information of the material image is associated with the quantity of posting-images-to-be-stored and the material image divided into predetermined divided areas according to the material image and the second material image, and stored (FIG. 35B).

FIG. 36A illustrates a specific example of information stored in the material image DB 142 for a material image of the first display order. When the display order of the material image is the first, as illustrated in FIG. 36A, in the material image DB 142, a material image ID, a material image (first material image), a display order indicating the first, the number of divisions, representative color information of the material image, outline information, color information of each divided area, representative color information of each divided area, point assigning area information and second material image information are stored.

The second material image information indicates the second material image related to the first material image. For example, a material image ID of each second material image is set in each second material image information. In addition, when only one first material image and the second material image related to the first material image are stored in the material image DB 142, the second material image information is not required.

FIG. 36B illustrates a specific example of information stored in the material image DB 142 for a material image of the second or subsequent display order. When the display order of a material image is the second or subsequent order, as illustrated in FIG. 36B, in the material image DB 142, a material image ID, a material image (second material image), a display order indicating one of the second and subsequent orders, the number of divisions, representative color information of a difference area, outline information, color information of each divided area, representative color information of each divided area and point assigning area information are stored.

The representative color information of a difference area indicates a representative color of the entire difference area between a material image of a given display order and a material image of the previous display order. The point assigning area information indicates a divided area which is set as a point assigning area among divided areas included in a difference area.

Hereinafter, an example of material images stored in the material image DB 142 will be described.

FIG. 37 is a schematic diagram illustrating a mode where a first material image is divided into 986 divided areas when the first material image shows "a closed state of a flip mobile telephone". As illustrated in FIG. 37, an image 3-1 of the first material image showing the closed state of the flip mobile telephone is divided into 986 divided areas 30-1. When a color on an outer side of the mobile telephones in material images 3-1 to 3-$n$ is blue, a representative color of the material image 3-1 is acknowledged as blue.

FIG. 38 is a schematic diagram illustrating a mode where one of second material images is divided into 986 divided areas when the second material image shows "a closed state of a flip mobile telephone changes to a slightly opened state". As illustrated in FIG. 38, the image 3-2 of the second material image showing a slightly opened state of the flip mobile telephone is divided into 986 divided areas 30-2.

Figure 39:
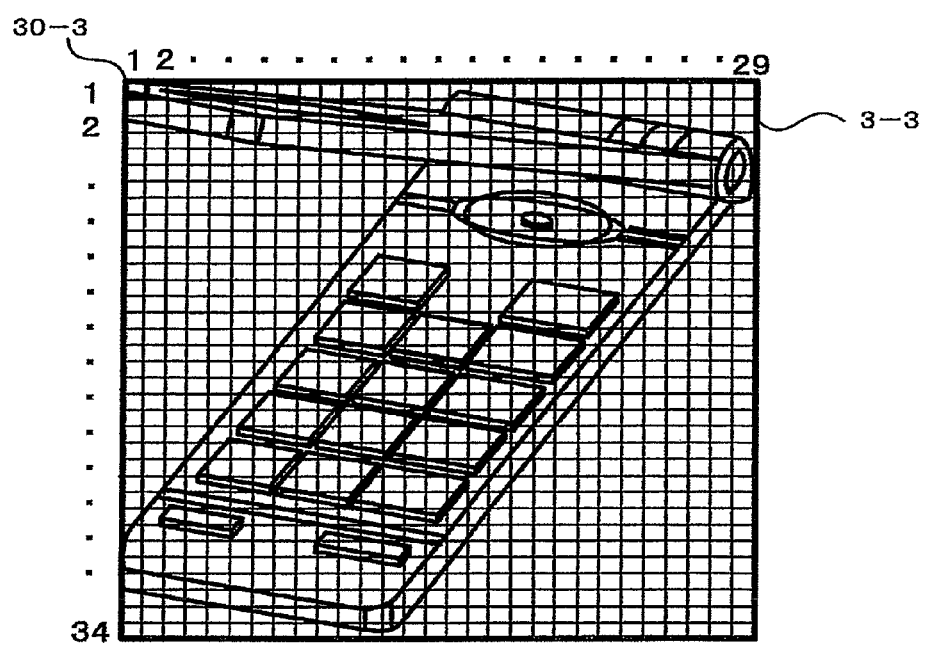
FIG. 39 is a schematic diagram illustrating a mode where one of second material images is divided into 986 divided areas when the second material image shows "a slightly opened state of a flip mobile telephone changes to a more opened state".

FIG. 39 is a schematic diagram illustrating a mode where one of second material images is divided into 986 divided areas when the second material image shows "a slightly opened state of a flip mobile telephone changes to a more opened state". As illustrated in FIG. 39, the image 3-3 of the second material image showing a more opened state of the flip mobile telephone is divided into 986 divided areas 30-3.

Figure 40:
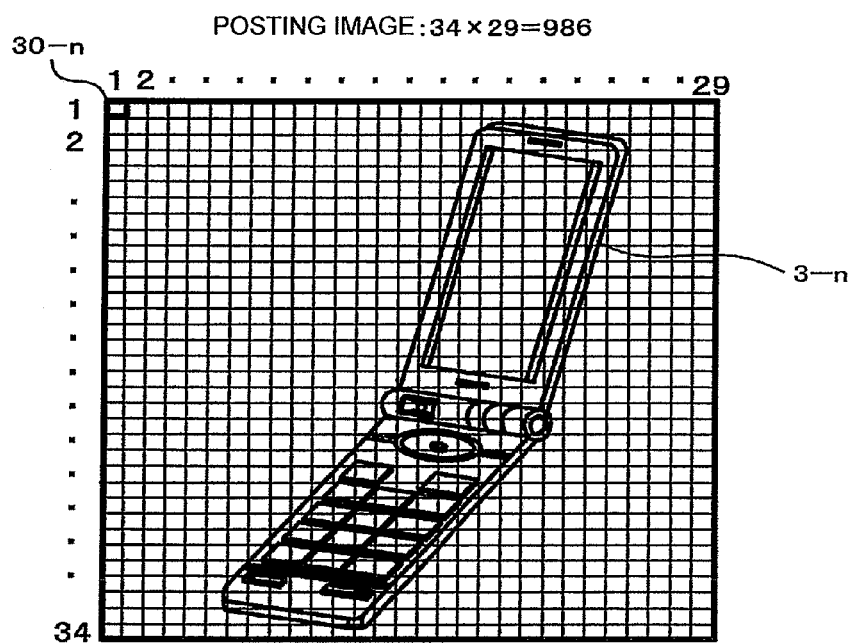
FIG. 40 is a schematic diagram illustrating a mode where one of second material images is divided into 986 divided areas when the second material image shows "an opened state of a flip mobile telephone".

FIG. 40 is a schematic diagram illustrating a mode where one of second material images is divided into 986 divided areas when the second material image shows "an opened state of a flip mobile telephone". As illustrated in FIG. 40, the image 3-$n$ of the second material image showing an opened state of the flip mobile telephone is divided into 986 divided areas 30-$n$. Meanwhile, n is the number of material images of flip mobile telephones stored in the material image DB 142.

Thus, each material image 3-$m$ (m=1, 2, 3, . . . and n) is divided into 986 divided areas 30-$m$. In addition, a material image 3-4 to a material image 3-$(n-1)$ will not be illustrated.

Figure 41:
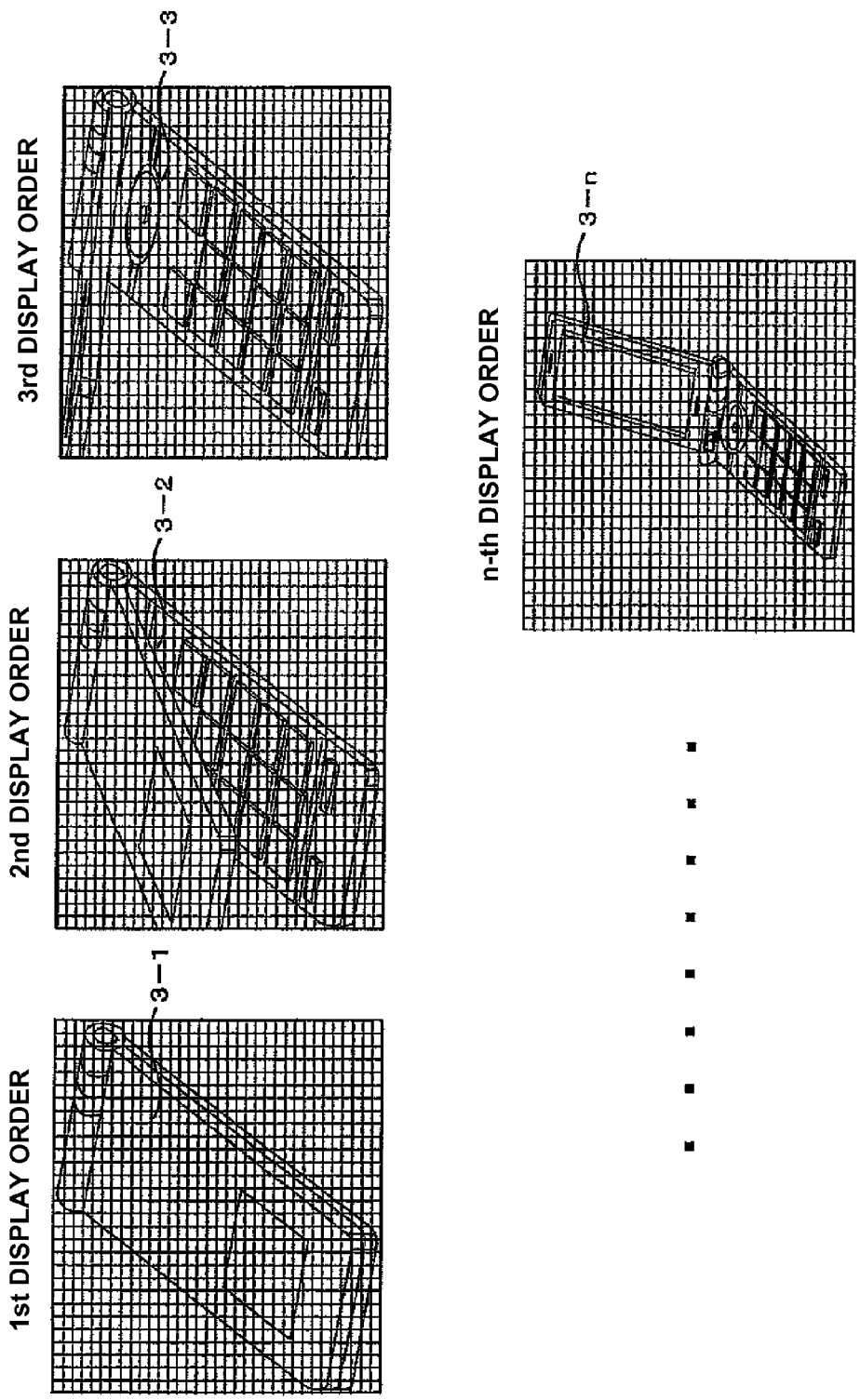
FIG. 41 is a view illustrating an example of a display order of each material image 3-*m*.

FIG. 41 is a view illustrating an example of a display order of each material image 3-$m$. As illustrated in FIG. 41, m is allocated to each material image 3-$m$ as a display order. Hence, a web page which displays a mosaic image displays mosaic images in order of a mosaic image imitating the material image 3-1, a mosaic image imitating the material image 3-2 and a mosaic image imitating the material image 3-3. Further, a mosaic image imitating the material image 3-$n$ is finally displayed. That is, the flip mobile telephone changes from the closed state to the opened state.

Figure 42:
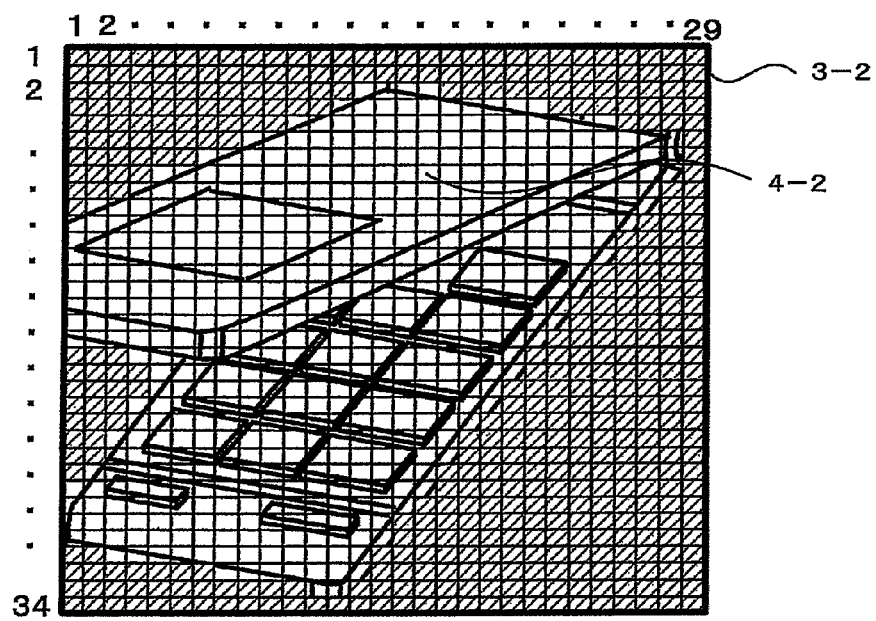
FIG. 42 is a view illustrating a difference area 4-2 in a material image 3-2.

FIG. 42 is a view illustrating a difference area 4-2 in the material image 3-2. The difference area 4-2 illustrated in FIG. 42 is an area in which there is a difference in image between the material image 3-2 and the material image 3-1. Colors of keys of mobile telephones in the material images 3-1 to 3-$n$ are red. In the difference area 4-2 of the material image 3-2, an area which displays the outer side of the mobile telephone is larger than an area which displays keys. In this case, a representative color of the difference area 4-2 of the material image 3-2 is acknowledged as blue.

Figure 43:
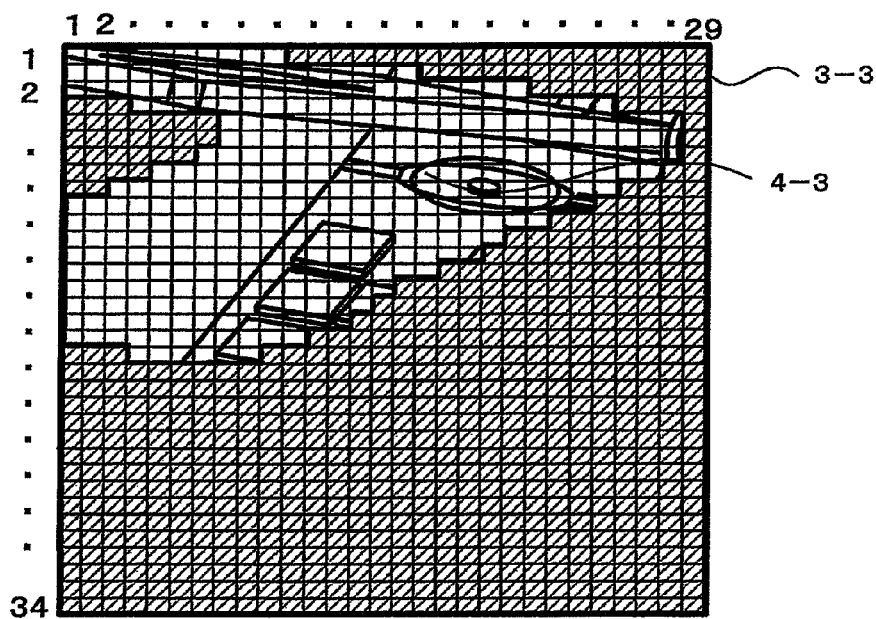
FIG. 43 is a view illustrating a difference area 4-3 in a material image 3-3.

FIG. 43 is a view illustrating the difference area 4-3 in the material image 3-3. The difference area 4-3 illustrated in FIG. 43 is an area having a difference in image between the material image 3-2 and the material image 3-3. In the difference area 4-3 of the material image 3-3, an area which displays keys is larger than an area which displays the outer side of the mobile telephone. In this case, a representative color of the difference area 4-3 of the material image 3-3 is acknowledged as red.

Thus, a difference area between a material image of a given display order and a material image of the previous display order is acknowledged for the material images 3-2 to material image 3-$n$. Further, difference area information indicating the difference area is stored in the material image DB 142. In addition, the system control unit 15 may acknowledge the difference area, and acknowledge a difference area in advance.

Figure 44:
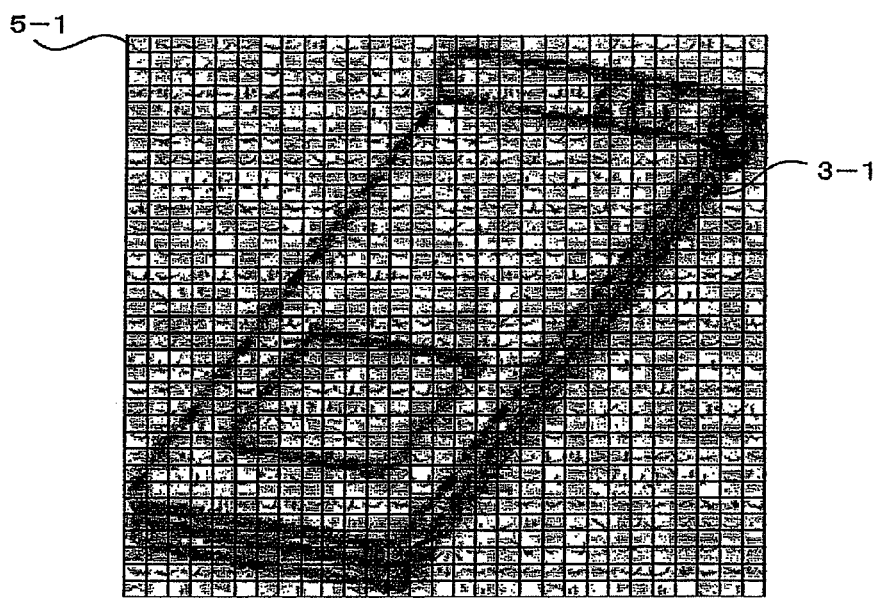
FIG. 44 is a view illustrating an example of a mosaic image 5-1 when the material image 3-1 showing the closed state of the flip mobile telephone is a source image.

Hereinafter, an operation of a system control unit 15 according to the present embodiment will be described in detail with reference to FIGS. 44 to 46.

The system control unit 15 according to the present embodiment first divides material images and second material images stored in the material image DB 142 into a plurality of divided areas a size of which is set according to the type of the material image.

In addition, the divided areas according to the present embodiment are provided such that the material image is divided by the quantity matching the type of the material image and the size of each divided area is equal. Hence, the size of these divided areas decreases in inverse proportion to an increase in the quantity matching, for example, the type of the material image. Further, the quantity of the divided areas increases in proportion to an increase of the quantity matching, for example, the type of the material image. For example, this quantity is indicated by the number of divisions stored in the material image DB 142.

Hence, the system control unit 15 prepares 986 divided areas in which posting images need to be embedded when the type of the material image is "a closed state of a flip mobile telephone", and 986 divided areas in which the posting images need to be embedded when the type of the material image is "an opened state of a flip mobile telephone".

Further, the system control unit 15 associates and stores the quantity of posting-images-to-be-stored, and the divided material images and second material images (see FIGS. 37 and 40) in the material image DB 142 (FIG. 35B).

More specifically, the system control unit 15 associates and stores 986 which is the quantity of posting-images-to-be-stored and "a closed state of a flip mobile telephone" which is the type of the material image when the type of the material image is "a closed state of a flip mobile telephone". Further, the system control unit 15 associates and stores 986 which is the quantity of posting-images-to-be-stored and "an opened state of a flip mobile telephone" which is the type of the material image when the type of the second material image is "an opened state of a flip mobile telephone".

In addition, the system control unit 15 may associate and store the representative color information of a color shown in each material image, and the quantity of posting-images-to-be-stored associated and stored in the material image DB 142, the divided material images of different types and the second material image.

More specifically, when the type of the material image is "a closed state of a flip mobile telephone", if this material image is RGB-converted, the RGB-converted pixel data has a B value much higher than R and G values. In this case, when the difference between the B value, and the R and G values is a threshold set in advance or more, the representative color information of the posting image may be defined as B and stored. In this case, representative color information of "a closed state of a flip mobile telephone" of a material image is defined as blue and stored.

Further, when the type of the second material image is "an opened state of a flip mobile telephone", and a display unit of the mobile telephone is filled with red, "red" is defined and stored as a result of this RGB conversion.

Furthermore, a user of the information providing device 1 may define random representative color information.

Next, the system control unit 15 extracts a material image (hereinafter, simply "stored material image") stored in the material image DB 142. Further, the system control unit 15 extracts the second material image following extraction of the material image. More specifically, the system control unit 15 refers to the material image DB 142, and extracts the second material image associated with the material image and stored. In addition, the first material image and the second material image are extracted by specifying, for example, a series of material images which are source images of mosaic images. Hence, the system control unit 15 may specify each material image stored in the material image DB 142 as the first material image and the second material image as is. With examples in FIGS. 37 to 40, n material images of the material image 3-1 to the material image 3-n are specified.

Hereinafter, a mosaic image generating method will be described.

The system control unit 15 allocates posting images to some divided areas of one or a plurality of material images based on color information of the posting images and color information of each divided area of a plurality of material images. In this case, for a material image of the second or subsequent material image (second material image), for example, posting images may be allocated only to a difference area. In addition, a method of allocating posting images to divided areas is the same as in the second embodiment.

When posting images are allocated to all divided areas for the material image of the first display order, the system control unit 15 generates a mosaic image using the material image as a source image. Further, the system control unit 15 displays the generated mosaic image on the web page transmitted to the user terminal 2-k. FIG. 44 is a view illustrating an example of a mosaic image 5-1 when the material image 3-1 showing the closed state of the flip mobile telephone is a source image.

The system control unit 15 then allocates a posting image to a difference area of each material image of the second or subsequent display order every time a posting image is received from the user terminal 2-k. Further, when posting images are allocated to all divided areas in the difference area in the material image of the second display order, posting images allocated in a difference area between a material image of the first display order and a material image of the second display order among the posting images allocated to divided areas in the material image of the first display order are replaced with posting images allocated in the difference area of the material image of the second display order. In other words, posting images allocated to divided areas of a difference area other than the difference area of the material of the first display order are allocated as is to divided areas of the material image of the second display order. Further, the system control unit 15 generates a mosaic image using the material image of the second display order as a source image. In other words, the system control unit 15 updates the mosaic image using posting images allocated to a difference area. The system control unit 15 performs the same processing for material images of the third and subsequent display orders.

Figure 45:
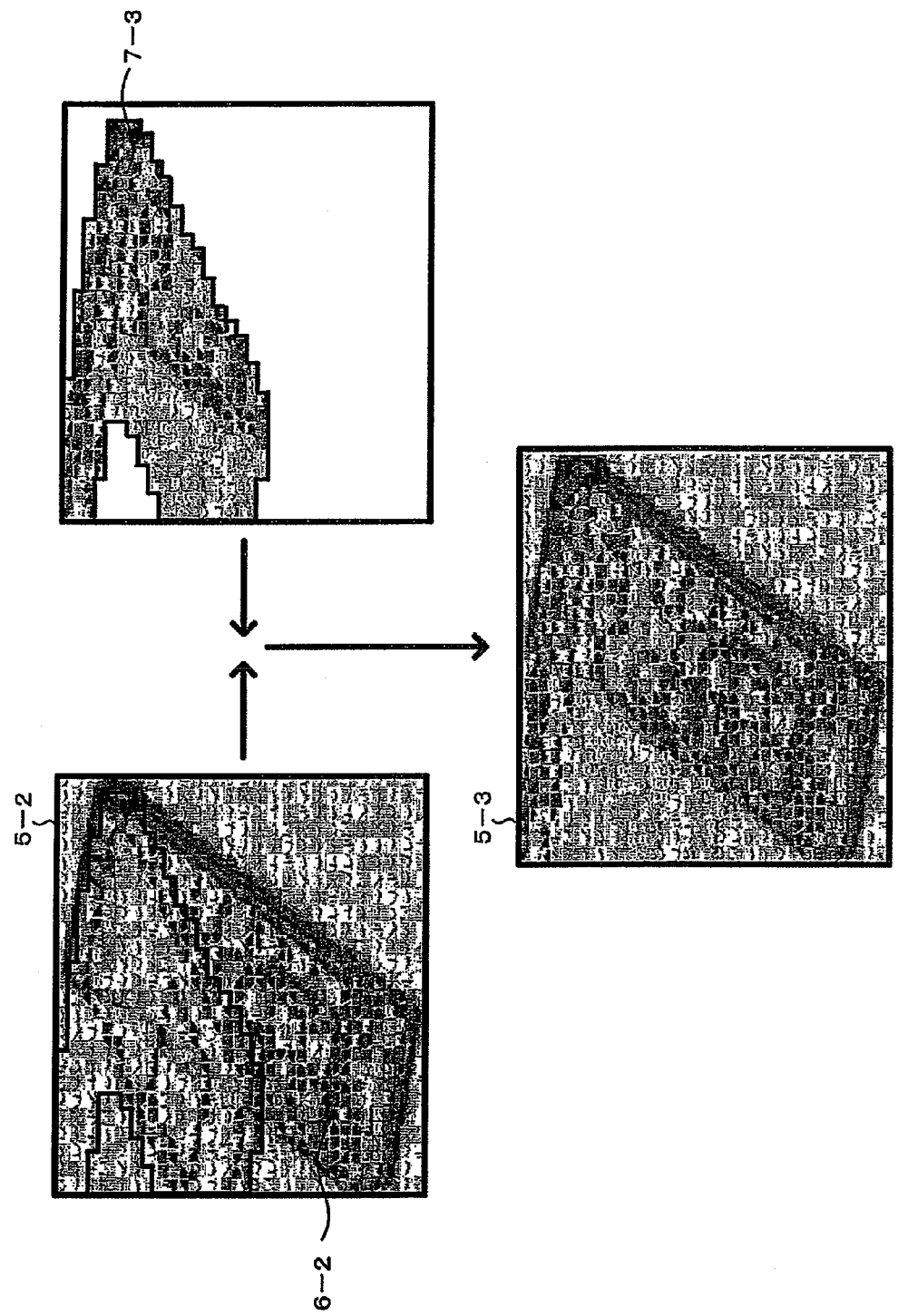
FIG. 45 is a view illustrating an example where mosaic images are updated.
Figure 46:
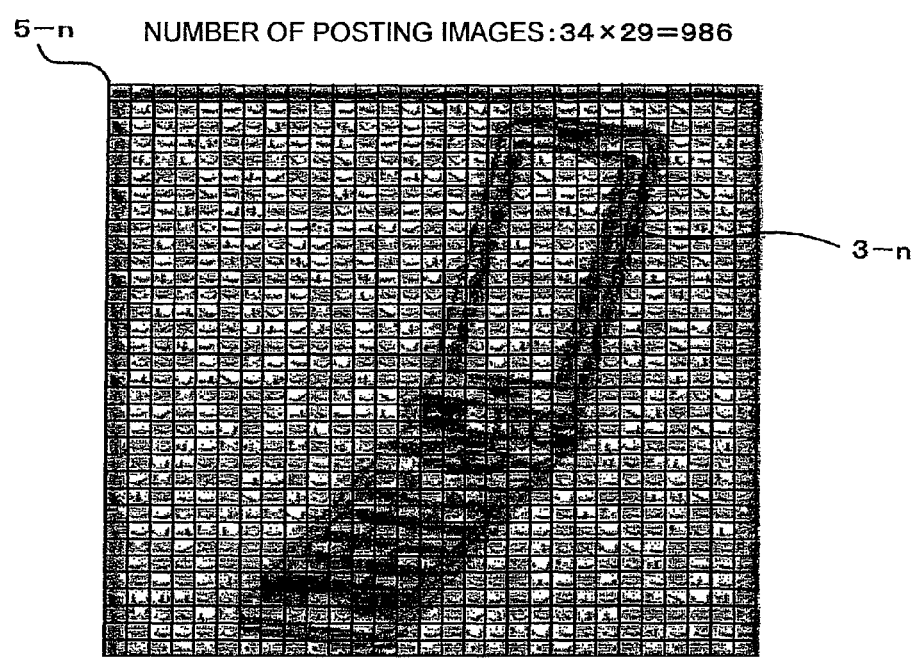
FIG. 46 is a view illustrating an example of a mosaic image 5-*n* for which the material image 3-*n* showing the opened state of the flip mobile telephone is used as a source image.

FIG. 45 is a view illustrating an example where mosaic images are updated. As illustrated in FIG. 45, for example, a mosaic image 5-2 for which the material image 3-2 showing a slightly opened state of a flip mobile telephone is completed. Further, posting images are allocated to all divided areas 7-3 of the material image 3-3 showing a more opened state of the flip mobile telephone. Then, a complete mosaic image 5-3 is generated using posting images allocated to areas 6-2 other than a difference area and posting images allocated to a difference area 7-3 in the material image 3-2.

The system control unit 15 finally generates a mosaic image using the material image of the last display order as a source image. FIG. 46 is a view illustrating an example of a mosaic image 5-n for which the material image 3-n showing the opened state of the flip mobile telephone is used as a source image.

In addition, even when posting images are allocated to all divided areas in a difference area of a material image of a given display order, in some cases, a mosaic image is not completed for which a material image of a previous display order is used as a source image. In this case, after the mosaic image is completed for which the material image of the previous display order is used as a source image, a mosaic image is generated for which the material image of this display order is used as a source image. By this means, that a mosaic image is displayed on a web page according to a display order of a material image is guaranteed, and the mosaic image is adequately updated based on a difference.

Next, an operation of an information providing system matching a request of the user terminal 2-k according to the present embodiment will be described. In addition, a basic sequence between the information processing device 1 and the user terminal 2-k may be the same as in the second embodiment.

Figure 47:
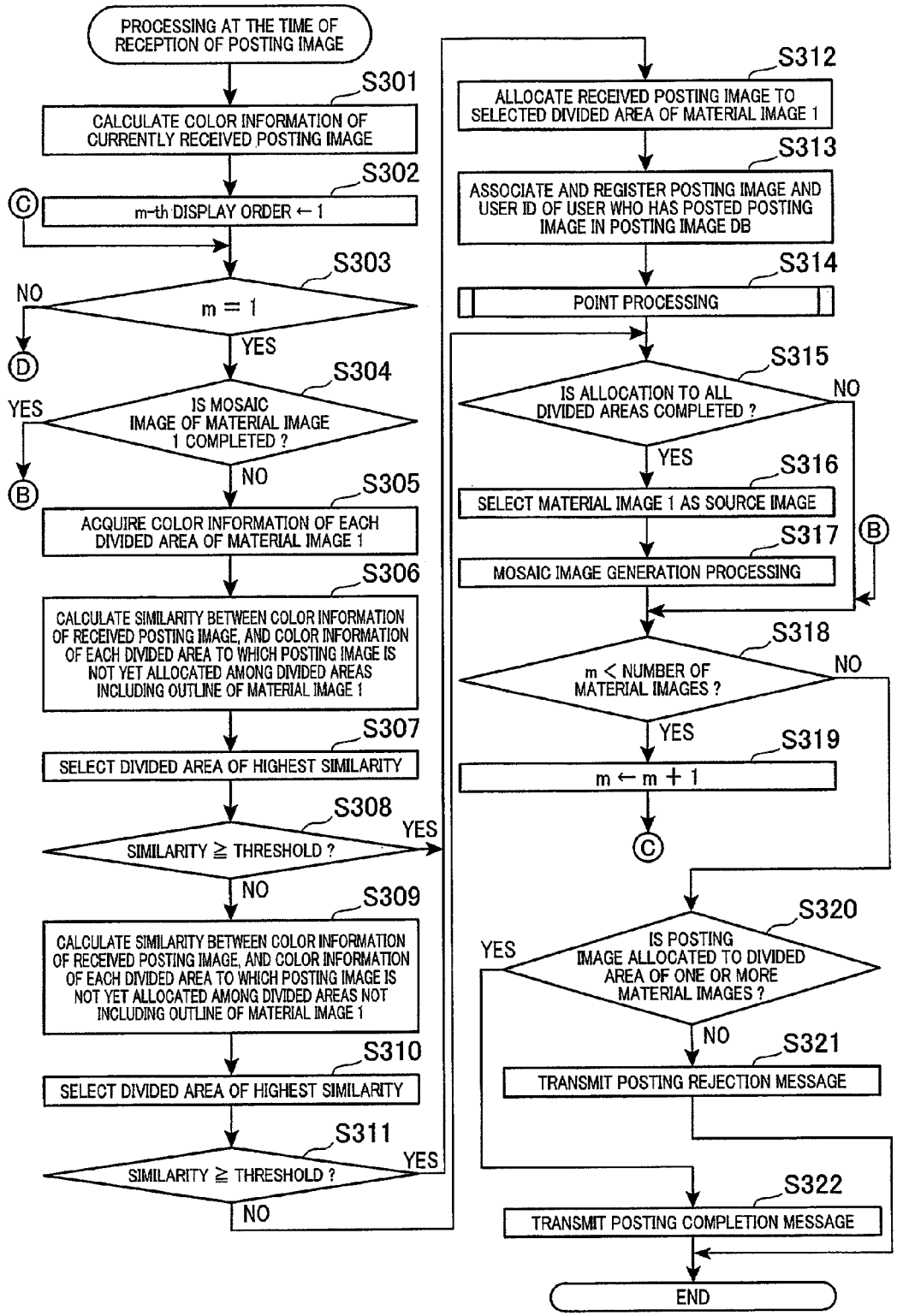
FIG. 47 is a view illustrating a processing example in processing of the system control unit 15 of the information providing device 1 according to an embodiment upon reception of a posting image.

FIG. 47 is a view illustrating a processing example in processing of the system control unit 15 of the information providing device 1 according to the present embodiment upon reception of a posting image. The processing upon reception of a posting image is started when the information processing device 1 receives a posting image from the user terminal 2-k (step S30 in FIG. 26).

As illustrated in FIG. 47, the system control unit 15 calculates color information of the currently received posting image (step S301). Next, the system control unit 15 sets 1 to a m-th display order (step S302). Subsequently, a material image of a m-th display order is referred to as a "material image m". Next, the system control unit 15 decides whether or not the m-th display order is 1 (step S303). In this case, when deciding that the m-th display order is not 1 (step S303: NO), the system control unit 15 proceeds to step S341.

By contrast with this, when deciding that the m-th display order is 1 (step S303: YES), the system control unit 15 allocates posting images to divided areas of a material image 1. First, the system control unit 15 decides whether or not a mosaic image of the material image 1 is completed (generated) (step S304). In this case, when deciding that the mosaic image of the material image 1 is completed (step S304: YES), the system control unit 15 proceeds to step S318.

By contrast with this, when deciding that the mosaic image of the material image 1 is not completed (step S304: NO), the system control unit 15 acquires representative color information of each divided area of the material image 1 from the material image DB 142 (step S305). Next, the system control unit 15 acquires outline information of the material image 1 from the material image DB 142, and specifies divided areas including images showing an outline from the divided areas of the material image 1 based on the acquired outline information. Next, the system control unit 15 calculates the similarity between representative color information of the currently received posting image and representative color information of each divided area to which a posting image is not yet allocated among the divided areas including images showing the outline in the material image 1 (step S306).

Next, the system control unit 15 selects the divided area of the calculated highest similarity (step S307). Next, the system control unit 15 decides whether or not the similarity calculated for the selected divided area is a threshold set in advance or more (step S308). In this case, when deciding that the similarity calculated for the selected divided area is a threshold or more (step S308: YES), the system control unit 15 allocates the currently received posting image to the selected divided area of the material image 1 (step S312).

By contrast with this, when deciding that the similarity calculated for the selected divided area is not a threshold or more (step S308: NO), the system control unit 15 calculates the similarity between color information of the currently received posting image and color information of each divided area to which a posting image is not yet allocated among the divided areas including no image showing the outline in the material image 1 (step S309).

Next, the system control unit 15 selects the divided area of the calculated highest similarity (step S310). Next, the system control unit 15 decides whether or not the similarity calculated for the selected divided area is a threshold set in advance or more (step S311). In this case, when deciding that the similarity calculated for the selected divided area is not a threshold or more (step S311: NO), the system control unit 15 proceeds to step S318.

By contrast with this, when deciding that the similarity calculated for the selected divided area is a threshold or more (step S311: YES), the system control unit 15 allocates the currently received posting image to the selected divided area of the material image 1 (step S312).

After finishing processing in step S312, the system control unit 15 registers the currently received posting image in the posting image DB 141 (step S313). More specifically, the system control unit 15 generates a new posting image ID. Further, the system control unit 15 associates and registers a generated posting image ID, the currently received posting image, a currently received user ID, and color information and representative color information of the currently received posting image.

Next, the system control unit 15 executes point processing (step S314). Processing content of point processing is basically the same as in the second embodiment. Meanwhile, in steps S271 and S272 illustrated in FIG. 33, when point assigning color information associated with the material image ID of the material image of the m-th display order is stored, the system control unit 15 acquires this point assigning color information.

After finishing point processing, the system control unit 15 decides whether or not posting images are allocated to all divided areas of the material image 1 (step S315). In this case, when deciding that there are divided areas to which posting images are not yet allocated among the divided areas of the material image 1 (step S315: NO), the system control unit 15 proceeds to step S318.

By contrast with this, when deciding that posting images are allocated to all divided areas of the material image 1 (step S315: YES), the system control unit 15 selects the material image 1 as a source image of the mosaic image to be displayed on a web page (step S316). Next, the system control unit 15 executes mosaic image generation processing (step S317).

In the mosaic image generation processing, the system control unit 15 generates a mosaic image based on the posting image allocated to each divided area of the material image 1 selected as the source image, and transfers the generated mosaic image in the mosaic image DB 143. Processing content of the mosaic image generation processing is basically the same as in the second embodiment (FIG. 16). Meanwhile, in step S151 of the mosaic image generation processing, the system control unit 15 acquires the number of divisions of the material image 1 from the material image DB 142. Further, the system control unit 15 generates table part data of a table having cells corresponding to a number indicated by the acquired number of divisions. Furthermore, in step S160, the system control unit 15 decides whether or not the divided area number i is less than a value indicated by the number of divisions of the material image 1. After finishing the mosaic image generation processing, the system control unit 15 proceeds to step S318.

When deciding in step S303 that the m-th display order is not 1 (step S303: NO), the system control unit 15 allocates posting images in a difference area of the material image m.

Figure 48:
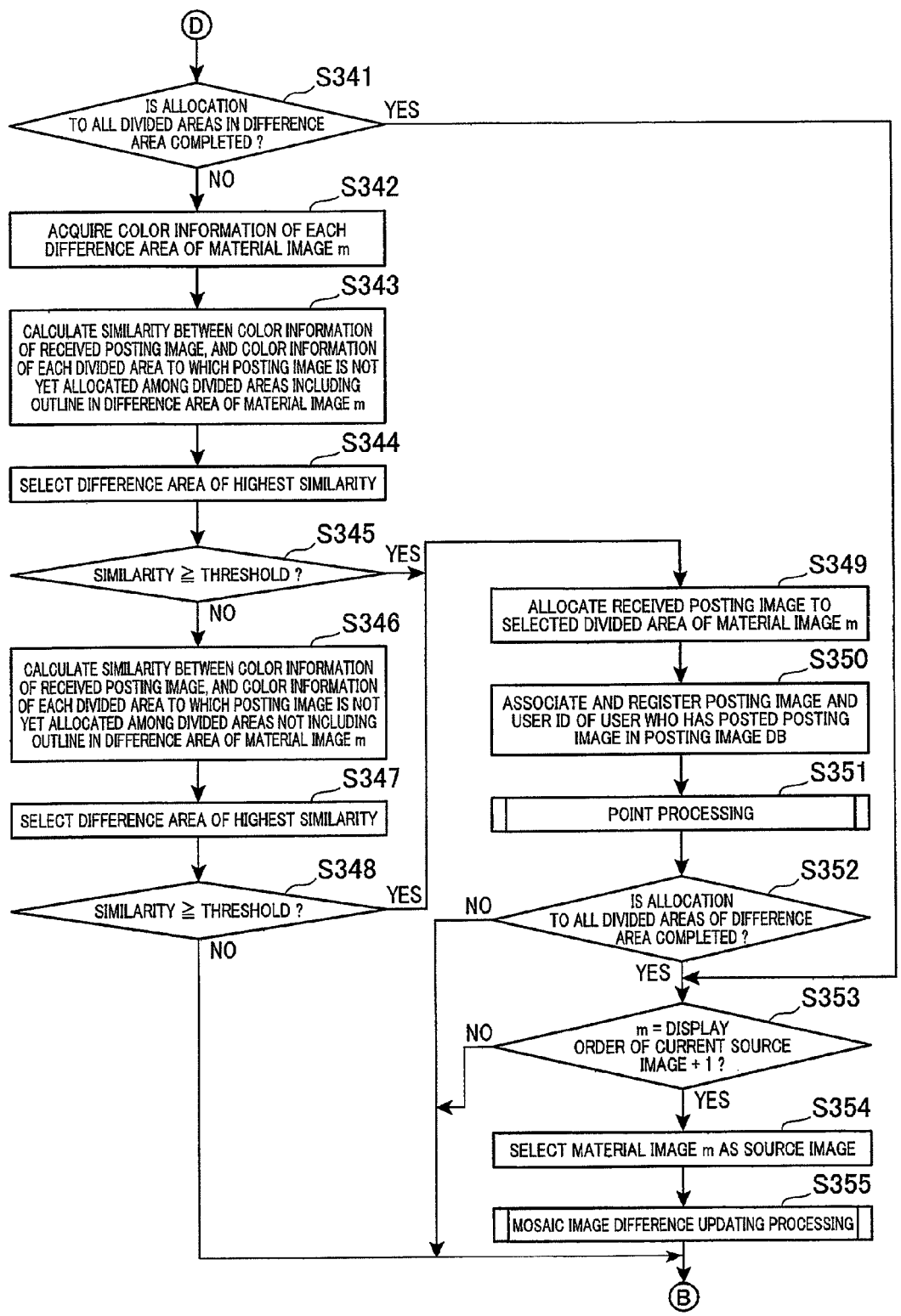
FIG. 48 is a view illustrating a processing example in processing of the system control unit 15 of the information providing device 1 according to an embodiment upon reception of a posting image.

As illustrated in FIG. 48, the system control unit 15 first decides whether or not posting images are allocated to all divided areas in the difference area of the material image m (step S341). In this case, when deciding that posting images are allocated to all divided areas in the difference area of the material image m (step S341: YES), the system control unit 15 proceeds to step S353.

By contrast with this, when deciding that there are divided areas to which posting images are not allocated in the difference area of the material image m (step S341: NO), the system control unit 15 acquires color information of each divided area in the difference area of the material image m from the material image DB 142 (step S342). Next, the system control unit 15 acquires outline information of the material image m from the material image DB 142, and specifies divided areas including images showing an outline from the divided areas in the difference area of the material image m based on the acquired outline information. Next, the system control unit 15 calculates the similarity between color information of the currently received posting image and color information of each divided area to which a posting image is not yet allocated among the divided areas including images showing the outline in the difference area of the material image m (step S343).

Next, the system control unit 15 selects the divided area of the calculated highest similarity (step S344). Next, the system control unit 15 decides whether or not the similarity calculated for the selected divided area is a threshold set in advance or more (step S345). In this case, when deciding that the similarity calculated for the selected divided area is a threshold or more (step S345: YES), the system control unit 15 allocates the currently received posting image to the selected divided area of the material image m (step S349).

By contrast with this, when deciding that the similarity calculated for the selected divided area is not a threshold or more (step S345: NO), the system control unit 15 calculates the similarity between color information of the currently received posting image and color information of each divided area to which a posting image is not yet allocated among the divided areas including no image showing the outline in the material image m (step S346).

Next, the system control unit 15 selects the divided area of the calculated highest similarity (step S347). Next, the system control unit 15 decides whether or not the similarity calculated for the selected divided area is a threshold set in advance or more (step S348). In this case, when deciding that the similarity calculated for the selected divided area is not a threshold or more (step S348: NO), the system control unit 15 proceeds to step S318.

By contrast with this, when deciding that the similarity calculated for the selected divided area is a threshold or more (step S348: YES), the system control unit 15 allocates the currently received posting image to the selected divided area of the material image m (step S349).

After finishing processing in step S349, the system control unit 15 registers the currently received posting image in the posting image DB 141 (step S350). Next, the system control unit 15 executes point processing (step S351).

Next, the system control unit 15 decides whether or not posting images are allocated to all divided areas in the difference area of the material image m (step S352). In this case, when deciding that there are divided areas to which posting images are not yet allocated in the difference area of the material image m (step S352: NO), the system control unit 15 proceeds to step S318.

By contrast with this, when deciding that posting images are allocated to all divided areas in the difference area of the material image m (step S352: YES), the system control unit 15 decides whether or not the m-th display order matches a display order +1 of a material image currently selected as a source image of a mosaic image displayed on a web page (step S353). That is, the system control unit 15 decides whether or not a target currently displayed on a web page is a mosaic image which imitates the material image of a display order m−1.

In this case, when deciding that the m-th display order does not match with the display order +1 of the material image currently selected as a source image (step S353:NO), the system control unit 15 proceeds to step S318.

By contrast with this, when deciding that the m-th display order matches with the display order +1 of the material image currently selected as a source image (step S353: YES), the system control unit 15 selects the material image m as a source image of a mosaic image displayed on the web page (step S354). That is, when the m-th display order matches with the display order +1 of the material image currently selected as a source image, the target currently displayed on the web page is the mosaic image which imitates the material image of the display order m−1. Further, in this case, the mosaic image which imitates the material image of the display order m−1 is completed. Then, the system control unit 15 executes processing in step S354 to update the mosaic image using posting images allocated in the difference area of the material image of the m-th display order and generate a mosaic image which imitates the material image of the display order m.

For example, with an example illustrated in FIG. 41, a source image of a mosaic image displayed on a web page is the material image 3-2. That is, a mosaic image which imitates the material image 3-2 is displayed on the web page. Then, the mosaic image shown on the web page changes from the mosaic image which imitates the material image 3-2 of the second display order to the mosaic image which imitates the material image 3-3 of the third display order. Hence, as illustrated in FIG. 43, it is necessary to allocate posting images to all divided areas in the difference area 4-3 between the material image 3-2 and the material image 3-3 to change the mosaic image shown on the web page. That is, it is necessary to allocate posting images to all divided areas in a difference area of a material image of a display order next to the display order of the material image currently selected as a source image of the mosaic image displayed on the web page. By this means, it is possible to generate the mosaic image which imitates the material image 3-3. Then, in step S353, the system control unit 15 decides whether or not a display order of a material image in which posting images are allocated to all divided areas in a difference area is next to a display order of a material image selected as a source image of a mosaic image displayed one a web page.

Further, when conditions to change a mosaic image are satisfied in step S353 (step S353: YES), a mosaic image which imitates the material image of the m-th display order is generated according to mosaic image difference updating processing using posting images allocated in the difference area of the material image of the m-th display order and posting images allocated to divided areas in a difference area other than the difference area of the material image of the display order m−1. This generated mosaic image is a mosaic image displayed on a web page. Then, in step S354, the system control unit 15 selects a material image of the m-th display order as a source image. This selection result is used upon decision in step S353 in processing upon reception of a posting image executed when a posting image is received the next or subsequent time.

Next, the system control unit 15 executes mosaic image different updating processing described below (step S355), and proceeds to step S318. The mosaic image difference updating processing is directed to updating a mosaic image.

In step S318 illustrated in FIG. 47, the system control unit 15 decides whether or not the material image m is less than a value indicated by the number of material images stored in the material image DB 142. In this case, when deciding that the m-th display order is less than the value indicated by the number of material images (step S318: YES), the system control unit 15 adds 1 to the m-th display order and updates the m-th display order (step S319), and then the system control unit 15 proceeds to step S303.

By contrast with this, when deciding that the m-th display order is not less than the value indicated by the number of material images (step S318: NO), the system control unit 15 decides whether or not the currently received posting image is allocated to divided areas of one or more material images of the material images stored in the material image DB 142 (step S320). In this case, when deciding that the currently received posting image is not allocated to any divided area of the material images (step S320: NO), the system control unit 15 transmits a posting rejection message to the user terminal 2-$k$ which is the transmission source of a posting image (step S321) and finishes processing upon reception of a posting image.

In this case, when deciding that the currently received posting image is allocated to divided areas of one or more material images (step S320: YES), the system control unit 15 transmits a posting completion message to the user terminal 2-$k$ which is the transmission source of the posting image (step S322) and finishes processing upon reception of the posting image.

In addition, similar to the second embodiment, when the currently received posting image is allocated to a divided area, the system control unit 15 may allocate the currently received posting image to a divided area to which another posting image is already allocated. Further, in this case, the system control unit 15 may assign points to a user who has posted a posting image which is newly allocated instead of a posting image which is already allocated.

Figure 49:
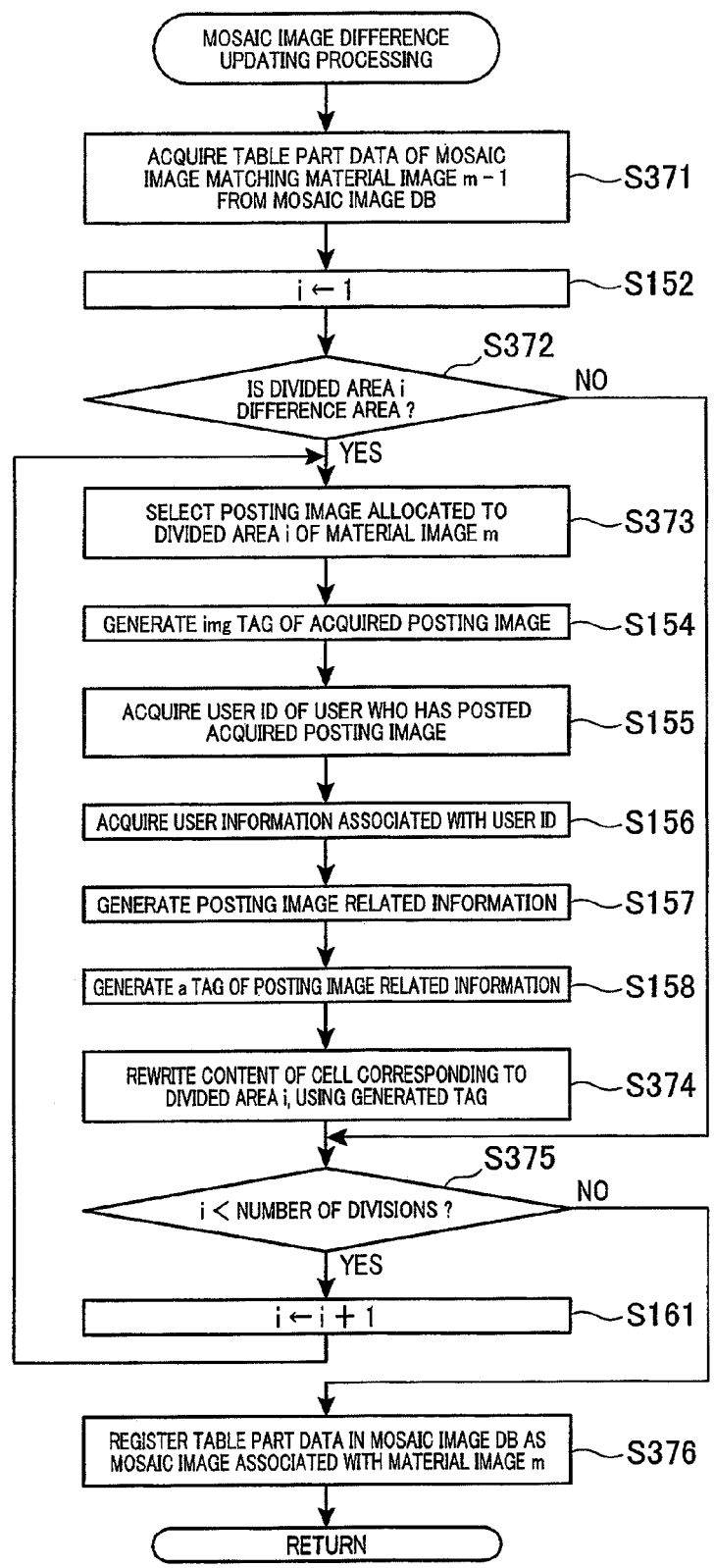
FIG. 49 is a view illustrating a processing example in mosaic image difference updating processing of the system control unit 15 of the information providing device 1 according to an embodiment.

FIG. 49 is a view illustrating a processing example in mosaic image difference updating processing of the system control unit 15 of the information providing device 1 according to the present embodiment. In FIG. 49, the same processing as in FIG. 16 will be assigned the same reference numeral.

As illustrated in FIG. 49, the system control unit 15 acquires table part data matching the material image of the display order m−1, from the mosaic image DB 143 (step 371). That is, the system control unit 15 acquires a mosaic image which imitates the material image of the display order m−1. Next, the system control unit 15 sets 1 to the divided area number (step S152).

Next, the system control unit 15 decides whether or not a divided area i is a divided area in the difference area between the material image of the display order m−1 and the material image m (step S372). In this case, when deciding that the divided area i is not the divided area in the difference area (step S372: NO), the system control unit 15 proceeds to step S375.

By contrast with this, when deciding that the divided area is a divided area in the difference area (step S372: YES), the system control unit 15 selects a posting image allocated to the divided area i (step S373). Next, the system control unit 15 executes processings in steps S154 to S158 similar to the first embodiment.

Next, the system control unit 15 rewrites cell setting content by setting a generated img tag and a tag to a cell corresponding to the divided area i in the table part data acquired in step S371 (step S374).

Next, the system control unit 15 decides whether or not the divided area number i is less than a value of the number of divisions of the material image m (step S375). In this case, when deciding that the divided area number i is less than the value of the number of divisions of the material image m (step S375: YES), the system control unit 15 updates the divided area number i by adding 1 to the divided area number i (step S161). Next, the system control unit 15 proceeds to step S373.

By contrast with this, when deciding that the divided area number i is not less than the value of the number of divisions of the material m (step S375: NO), the system control unit 15 registers table part data in which cell content is rewritten, in the mosaic image DB as a mosaic image (step S376). After finishing processing in step S376, the system control unit 15 finishes mosaic image difference updating processing.

Processing content of processing upon reception of a mosaic image page request started when the information providing device 1 receives the mosaic image page request from the user terminal 2-$k$ is basically the same as in the second embodiment (FIG. 31). Meanwhile, only when there are divided areas to which posting images are allocated in a difference area of a material image of a display order next to a material image currently selected as a source image, the system control unit 15 generates a text of a mosaic image change condition message based on representative color information of the difference area of the material image. Further, only in this case, the system control unit 15 stores representative color information of the difference area of a material image of a display order next to a material image currently selected as a source image, in the memory unit 14 as point assigning color information.

To change a mosaic image displayed on a web page, it is necessary to allocate a posting image to a difference area between a material image used as a current source image and a material image used as a source image next. Then, the system control unit 15 does not include information of a color which is not required for the time being to change a mosaic image displayed on a web page, in a mosaic image change condition message.

In addition, even when a period set in advance passes after the first posting image is received and registered in the posting image DB 141, if the mosaic image for which the material image of the first display order is used as a source image is not completed, the system control unit 15 may display an incomplete mosaic image on a web page using the material image of the first display order as a source image.

Then, when then receiving a posting image from the user terminal 2-$k$ and allocating the received posting image to a material image selected as a source image, the system control unit 15 updates a mosaic image based on the allocated posting image. By this means, a mosaic image displayed on a web page is gradually completed.

Further, when an incomplete mosaic image for which the material image of the first display order is used as a source image is displayed on a web page, there are various conditions of displaying a mosaic image change condition message on the web page. When, for example, posting images which correspond to a number of images set in advance or more and which cannot be allocated to divided areas of a material image selected as a source image of the mosaic image currently displayed on the web page are transmitted, the system control unit 15 may display a mosaic image change condition message. Further, when an incomplete mosaic image is completed or the completion rate of the incomplete mosaic image is the completion rate set in advance or more, the system control unit 15 may display a mosaic image change condition message. Furthermore, when a period set in advance passes after the first posting image is received and registered in the posting image DB 141, the system control unit 15 may display a mosaic image change condition message.

In addition, even when a period set in advance passes after the first posting image is received and registered in the posting image DB 141 while an incomplete mosaic image is displayed on a web page, if the incomplete mosaic image is not completed, the system control unit 15 may use as point assigning areas all divided areas to which posting images are not yet allocated among divided areas of a material image which is currently selected as a source image.

Figure 50:
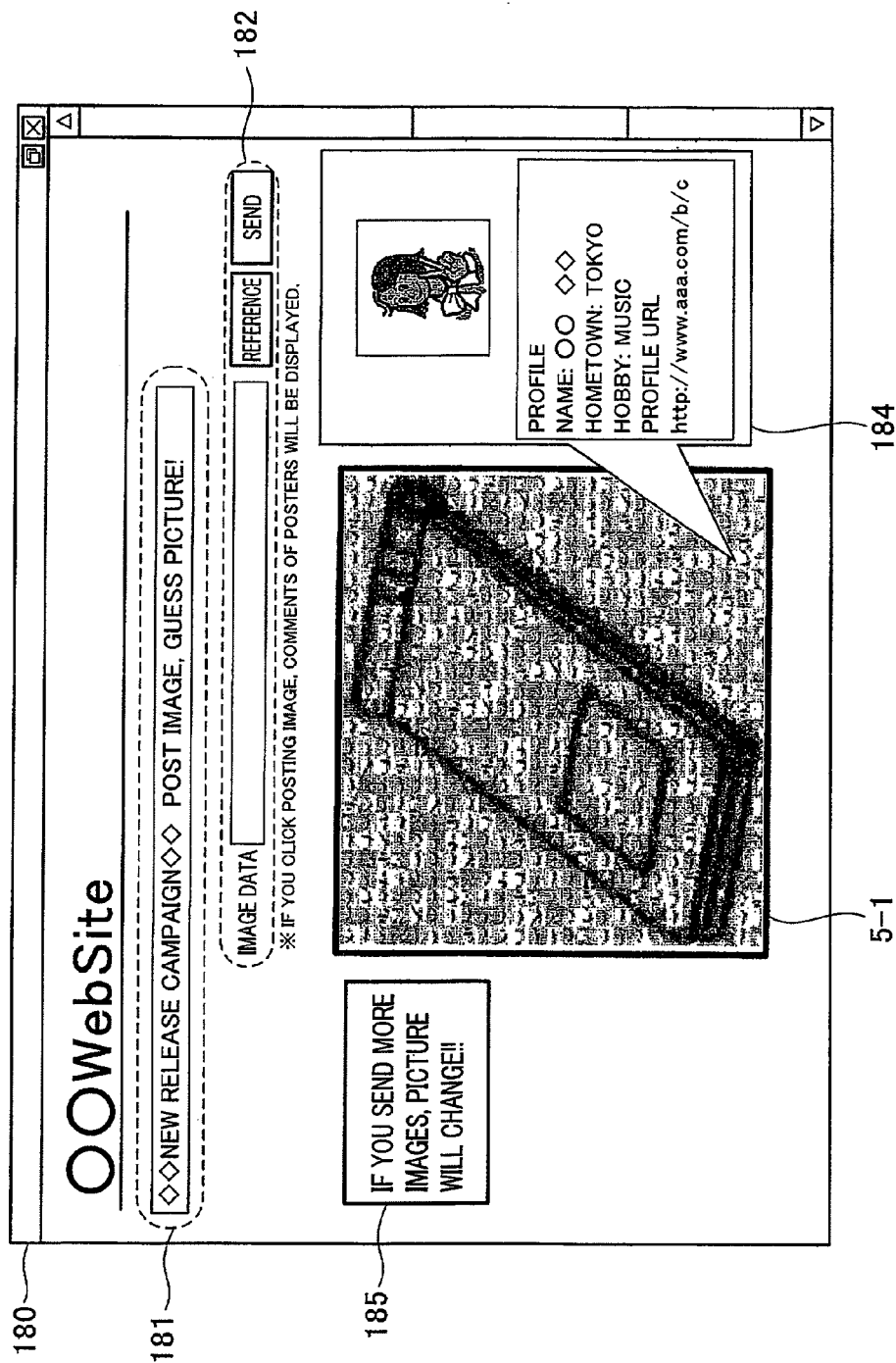
FIG. 50 is a view illustrating a mosaic image shown on the display of the display unit 22.
Figure 51:
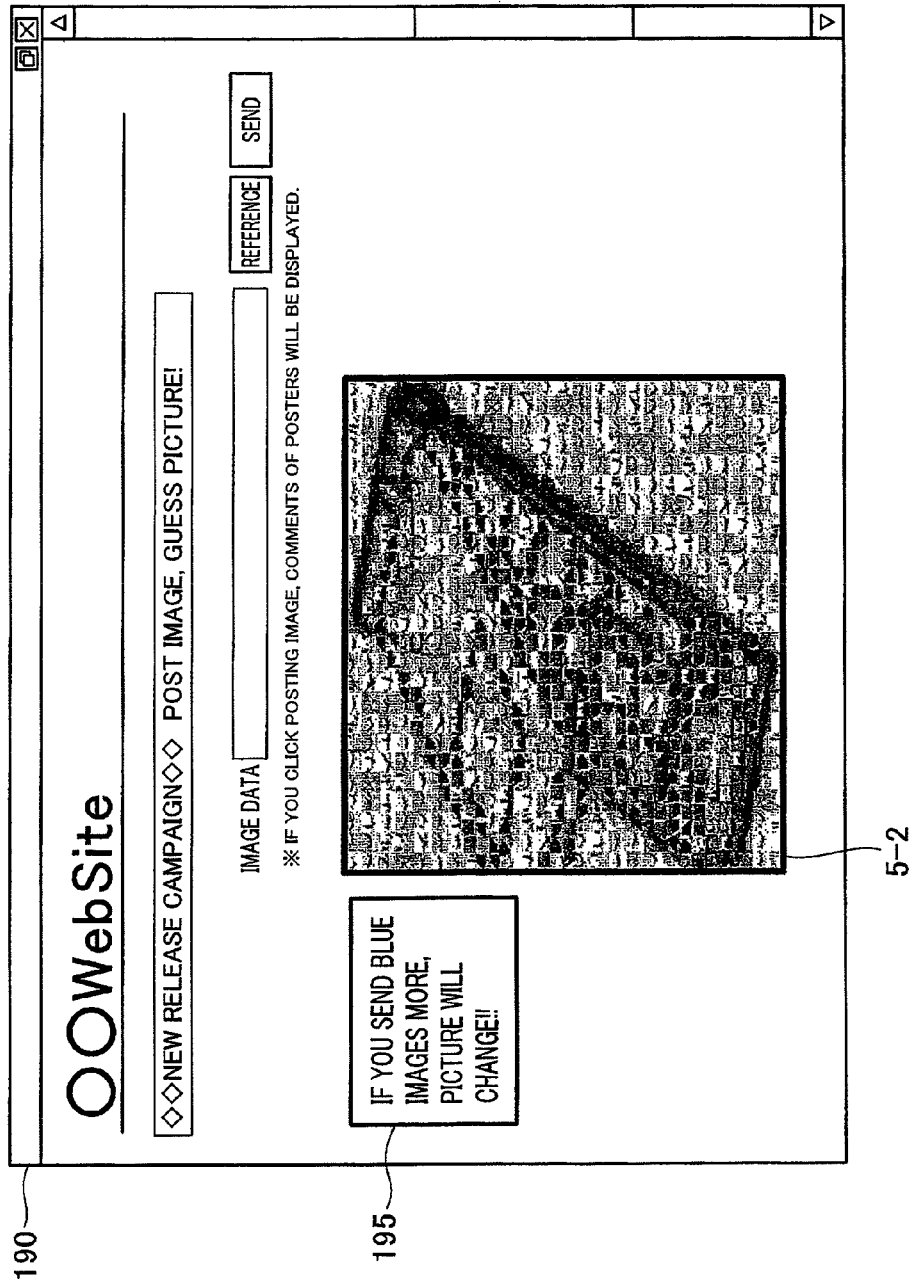
FIG. 51 is a view illustrating a mosaic image shown on the display of the display unit 22.

FIGS. 50 and 51 are views illustrating a mosaic image shown on the display of the display unit 22. FIGS. 50 and 51 illustrate examples where the material images 3-1 to 3-$n$ are stored in the material image DB 142.

The display order of the material image 3-1 showing a closed state of the flip mobile telephone illustrated in FIG. 37 is the first. Hence, when posting images are allocated to all divided areas of the material image 3-1, the mosaic image 5-1 which imitates the material image 3-1 is generated. In this case, a web page 180 configuring a mosaic image is displayed as illustrated in FIG. 50.

The web page 180 displays an information display portion 181, a posting image transmitting portion 182, the mosaic image 5-1, a posting image related information display portion 184 and a display image information display portion 185. In addition, content in the posting image transmitting portion 182 is the same as in the posting image transmitting portion 132 according to the first embodiment. Further, content in the posting image related information display portion 184 is the same as in the posting image related information display portion 134 according to the first embodiment.

The display image information display portion 185 displays a condition that a type of a mosaic image to be displayed changes. The display image information display portion 185 displays a message "If you send more images, a picture will change!!" This is an example of a message when a representative color of the difference area of the material image 3-2 is not taken into account.

Subsequently, when posting images are allocated to all divided areas in the difference area of the material image 3-2 showing a slightly opened state of the mobile telephone illustrated in FIG. 38, in response to an increase in the number of posts, the mosaic image 5-2 which imitates the material image 3-2 is generated. In this case, a web page 190 configuring a mosaic image is displayed as illustrated in FIG. 51.

The web page 190 displays the mosaic image 5-1. Further, the web page 190 displays a display image information display portion 195. Hereinafter, a representative color of the difference area 4-2 in the material image 3-2 illustrated in FIG. 42 is blue. Further, a representative color of the difference area 4-3 in the material image 3-3 showing a more opened state of the mobile telephone illustrated in FIG. 43 is red. Furthermore, there are divided areas to which posting images not allocated in both of the difference area 4-2 and the difference area 4-3. In this case, the display image information display portion 195 displays a mosaic image change condition message "If you send more blue images, a picture will change!!" That is, information showing a representative color of a posting image required in the difference area 4-2 in the material image 3-2 is displayed as a mosaic image change condition message.

As described above, according to the present embodiment, the system control unit 15 of the information providing device 1 generates a mosaic image by acquiring posting image from the user terminal 2-k through the network, storing the acquired posting image in the posting image DB 141, and allocating the acquired posting image to one divided area based on color information of the acquired posting image and color information of each divided area of a material image which is used as a source image, and generates a new mosaic image by, after generating the mosaic image, changing the material image in response to an increase in the number of posts.

Hence, the material image imitated by the newly generated mosaic image changes from the previously generated mosaic image. Consequently, it is possible to encourage user's motivation of continuously browsing the mosaic image.

Further, the system control unit 15 generates a mosaic image for which one material image is used as a source image by acquiring color information of divided areas of each of a plurality of material images, and allocating the acquired posting images to divided areas of one material image based on the acquired color information of the posting images and the acquired color information of the divided areas, and generates a mosaic image by, after generating the mosaic image, using as a new source image a material image different from the material image used as the source image according to an increase in the number of posts.

Hence, the material image imitated by the mosaic image changes to another material image in response to an increase in the number of posts. Consequently, it is possible to encourage user's motivation of continuously browsing the mosaic image.

Further, the system control unit 15 generates a mosaic image for which a non-source image is used as a new source image by acquiring color information of divided areas in a difference area having difference in color between a source image and the non-source image which is a material image which is not used as a source image among a plurality of material images, allocating the acquired posting image to one divided area in the difference area of one non-source image based on the acquired color information of the posting image and the acquired color information of the divided areas in the difference area, and using images allocated in the difference area of the non-source image in which images are allocated to all divided areas in the difference area, and images allocated to divided areas other than the divided areas in the difference area in the source image.

Hence, it is not necessary to allocate images to all divided areas of the material image when the material which is the source image of the mosaic image is changed. Consequently, it is possible to more quickly change a mosaic image than when posting images are allocated to all divided areas of the material image, so that it is possible to encourage user's motivation of continuously browsing the mosaic image.

Further, the system control unit 15 acquires the display order of each material image from the posting image DB 141, generates a mosaic image for which each material image is used as a source image according to the order matching the display order of the material image used as the source image in response to an increase in the number of posts, and transmits HTML document for displaying a mosaic image generated at last, to the user terminal 2-k. That is, the system control unit 15 transmits HTML documents for displaying mosaic images for which the material images are used as source images, to the user terminal 2-k according to the order matching the display orders of the material images used as source images.

Hence, the material image imitated by the mosaic image changes according to the display order of the material image. Consequently, the display order can be determined by, for example, an administrator such that, for example, an image of a flip mobile telephone gradually changes from an image showing the closed state to an image showing the opened state, and an image imitated by a mosaic image gradually changes.

Further, even when the posting image acquired by the user device 2-k is not suitable for any divided areas, this image is not used to generate a mosaic image. Consequently, a mosaic image which more faithfully imitates the material image is generated, so that it is possible to encourage user's motivation of continuously browsing the mosaic image.

Further, posting images are preferentially allocated to divided areas including images showing the outline, so that the user can learn the material image imitated by the mosaic image at a comparatively early stage.

Furthermore, when a posting image is allocated to a point assigning area, points are assigned to a user who has posted this image. Consequently, it is possible to encourage user's motivation of posting images. Consequently, a material image imitated by the mosaic image is expected to change quickly, so that it is possible to encourage user's motivation of continuously browsing the mosaic image.

Further, the user who browses the mosaic image can browse a profile of a user who has posted the posting image included in the displayed mosaic image. Consequently, it is possible to encourage user's motivation of browsing the mosaic image.

Further, a mosaic image showing a related change can be visually checked, so that it is possible to encourage user's motivation of continuously browsing a mosaic image and acquire more unique users and repeaters. Furthermore, it is possible to expect a sufficient effect of attracting guests at, for example, events.

Still further, the system control unit 15 displays a condition that a type of a mosaic image to be displayed changes.

Consequently, it is possible to give an expectation to users that the type of a mosaic image to be displayed is likely to change based on posting images transmitted by the users, so that it is possible to encourage users' motivation of repeatedly and continuously browsing a mosaic image, and provide an effect of attracting guests.

In addition, the system control unit 15 may generate a mosaic image based on the material image by preferentially allocating the images to divided areas showing the outline of the material image.

With this configuration, the user who browses this web page can browse the mosaic image which is completed from specific portions set according to the priority while visually enjoying the mosaic image.

In addition, with each of the embodiments, the system control unit 15 generates table part data as a mosaic image. However, the system control unit 15 may generate image data of a mosaic image by, for example, combining or synthesizing posting images allocated to divided areas.

REFERENCE SIGNS LIST

1 INFORMATION PROVIDING DEVICE
2-k USER TERMINAL
11, 23 COMMUNICATION UNIT
12, 22 DISPLAY UNIT
13, 21 OPERATION UNIT
14, 25 MEMORY UNIT
15, 27 SYSTEM CONTROL UNIT
16, 28 SYSTEM BUS
17, 26 INPUT/OUTPUT INTERFACE UNIT
24 DRIVE UNIT
NW NETWORK

The invention claimed is:

1. An image generation device which generates a mosaic image using a material image as a source image, the material image being divided into a plurality of divided areas, the image generation device comprising:
    an image acquiring device configured to acquire one or more images from a terminal device through a network; and
    a mosaic image generating device configured to generate a first mosaic image by allocating each of the one or more acquired images to one of the plurality of divided areas of said source image based on color information of said each of the one or more acquired images and color information of said one of the plurality of divided areas of said source image,
    wherein, after generating the first mosaic image, the mosaic image generating device further generates a second mosaic image by increasing the number of divided areas of said source image in response to an increase in the number of images acquired by the image acquiring device.

2. The image generation device according to claim 1,
    further comprising a deciding device configured to determine whether or not there are divided areas which are suitable to allocate the one or more images acquired by the acquiring device, based on color information of the one or more images and color information of the divided areas,
    wherein the mosaic image generating device is configured to not use an image for which the deciding device decides that there is no suitable divided area to allocate the image to, and further configured to reduce by one the number of images acquired by the image acquiring device for an acquired image that is not used.

3. The image generation device according to claim 1, wherein the mosaic image generating device is further configured to preferentially allocate the one or more acquired images to the plurality of divided areas corresponding to one or more outlines of one or more objects in the material image.

4. The image generation device according to claim 1,
    wherein the image acquiring device is configured to acquire an image to be posted and identification information of a user who posts the image from the terminal device, and
    the image generation device further comprises an assigning device that, when the mosaic image generating device allocates an image to a divided area, updates a point count associated with the identification information of the user posting the image by incrementing the point count by one or more, said point count and identification being stored in a memory device.

5. The image generation device according to claim 1,
    wherein the image acquiring device is configured to acquire one or more images to be posted by a user from the terminal device, and
    the image generation device further comprises:
    a mosaic image transmitting device configured to transmit display information for displaying the mosaic image generated by the mosaic image generating device to the terminal device through the network,
    a receiving device configured to receive request information transmitted from the terminal device when the user selects an image included in a mosaic image displayed on the terminal device based on the display information, said request information indicates a request for a profile of the user who posts the selected image, and
    a profile information transmitting device configured to transmit to the terminal device profile information which shows the profile of the user matching the request information received by the receiving device.

6. The image generation device according to claim 1,
    further comprising a memory device configured to store the one or more images acquired by the image acquiring device.

7. An image generation method which generates a mosaic image using a material image as a source image, the material image being divided into a plurality of divided areas, the image generation device comprising:
    acquiring one or more images from a terminal device through a network;
    generating a first mosaic image by allocating each of the one or more acquired images to one of the plurality of divided areas of said source image based on color information of said each of the one or more acquired images and color information of said one of the plurality of divided areas of said source image; and after generating the first mosaic image, further generates a second mosaic image by increasing the number of divided areas of said source image in response to an increase in the number of images acquired from the terminal device.

8. A non-transitory, computer-readable recording medium stored therein a computer program which when executed causes a computer to carry out the method of claim 7.

9. An image generation device which generates a mosaic image using one of a plurality of material images as a source image, each of the plurality of material images being divided into a plurality of divided areas, the image generation device comprising:

an image acquiring device configured to acquire one or more images from a terminal device through a network;

a color information acquiring device configured to acquire color information of the plurality of divided areas of each of the plurality of material images;

a mosaic image generating device configured to generate a first mosaic image by allocating each of the one or more images acquired by the image acquiring device to one of the plurality of divided areas of the source image based on color information of said each of the one or more images and the acquired color information of said one of the plurality of divided areas of the source image; and after generating the first mosaic image, the mosaic image generating device further generates a second mosaic image by using another of the plurality of material image as a new source image in response to an increase in the number of images acquired by the image acquiring device.

10. The image generation device according to claim 9, wherein the mosaic image generating device generates the first mosaic image by allocating images to all of the plurality of divided areas of the source image used in generating the first mosaic image.

11. The image generation device according to claim 9, wherein the color information acquiring unit is further configured to acquire color information of divided areas to identify differing areas, which are divided areas of the new source image that have color information different from the corresponding divided areas of the source image for the first mosaic image, and the mosaic image generating device is configured to generate the second mosaic image using the new source image by allocating each image acquired after the first mosaic image is generated to one of the differing areas of the new source image based on color information of each image acquired after the first mosaic image is generated and the acquired color information of said one of the differing areas while allocating to divided areas that are not differing areas the same images allocated to the respective divided areas at the same locations of the source image for the first mosaic image.

12. The image generation device according to claim 9, further comprising:

an order information acquiring device configured to acquire order information indicating a display order of each of the material images; and a mosaic image transmitting device configured to transmit display information for displaying a mosaic image generated by the mosaic image generating device to the terminal device through the network according to an order matching the display order of the material image used as the source image of the mosaic image to be displayed.

13. The image generation device according to claim 9, further comprising a deciding device configured to determine whether or not there are divided areas which are suitable to allocate the one or more images acquired by the acquiring device, based on color information of the one or more images and color information of the divided areas, wherein the mosaic image generating device is configured to not use an image for which the deciding device decides that there is no suitable divided area to allocate the image to, and further configured to reduce by one the number of images acquired by the image acquiring device for an acquired image that is not used.

14. The image generation device according to claim 9, wherein the mosaic image generating device is further configured to preferentially allocate the one or more acquired images to the plurality of divided areas corresponding to one or more outlines of one or more objects in the material image.

15. The image generation device according to claim 9, wherein the image acquiring device is configured to acquire an image to be posted and identification information of a user who posts the image from the terminal device, and the image generation device further comprises an assigning device that, when the mosaic image generating device allocates an image to a divided area, updates a point count associated with the identification information of the user posting the image by incrementing the point count by one or more, said point count and identification being stored in a memory device.

16. The image generation device according to claim 9, wherein the image acquiring device is configured to acquire one or more images to be posted by a user from the terminal device, and the image generation device further comprises:

a mosaic image transmitting device configured to transmit display information for displaying the mosaic image generated by the mosaic image generating device to the terminal device through the network, a receiving device configured to receive request information transmitted from the terminal device when the user selects an image included in a mosaic image displayed on the terminal device based on the display information, said request information indicates a request for a profile of the user who posts the selected image, and a profile information transmitting device configured to transmit to the terminal device profile information which shows the profile of the user matching the request information received by the receiving device to the terminal device.

17. The image generation device according to claim 9, further comprising a memory device configured to store the one or more images acquired by the image acquiring device, wherein the images, in response to an increase of the number of which the second mosaic image is generated, are stored in the memory device.

18. The image generation device according to claim 9, further comprising a memory device configured to store the one or more images acquired by the image acquiring device.

19. An image generation method in an image generation device which generates a mosaic image using one of a plurality of material images as a source image, each of the plurality of material images being divided into a plurality of divided areas, the image generation method comprising:

acquiring one or more images from a terminal device through a network;

acquiring color information of the plurality of divided areas of each of the plurality of material images;

generating a first mosaic image by allocating each of the one or more acquired images to one of the plurality of divided areas of the source image based on color information of said each of the one or more images and the acquired color information of said one of the plurality of divided areas of the source image; and after generating the first mosaic image, further generates a second mosaic image by using another of the plurality of material image as a new source image in response to an increase in the number of images acquired from the terminal device.

20. A non-transitory, computer-readable recording medium stored therein a computer program which when executed causes a computer to carry out the method of claim 19.

* * * * *